US007856473B2

(12) United States Patent
Horikiri et al.

(10) Patent No.: US 7,856,473 B2
(45) Date of Patent: Dec. 21, 2010

(54) TELECONFERENCE SYSTEM, TELECONFERENCE SUPPORT METHOD, AND COMPUTER PROGRAM

(75) Inventors: Kazunori Horikiri, Tokyo (JP); Yoshiki Watanabe, Tokyo (JP); Makoto Yamazaki, Tokyo (JP); Yasuhiro Ogasawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 831 days.

(21) Appl. No.: 10/694,213

(22) Filed: Oct. 28, 2003

(65) Prior Publication Data

US 2004/0128354 A1 Jul. 1, 2004

(30) Foreign Application Priority Data

Oct. 29, 2002 (JP) ............................. 2002-314913
Oct. 8, 2003 (JP) ............................. 2003-349114

(51) Int. Cl.
*G06F 15/16* (2006.01)
(52) U.S. Cl. ...................... 709/205; 709/204; 709/206; 709/207
(58) Field of Classification Search .......... 709/204–207
See application file for complete search history.

(56) References Cited

U.S. PATENT DOCUMENTS

| 5,627,978 | A | * | 5/1997 | Altom et al. ................. 715/758 |
| 5,819,084 | A | | 10/1998 | Shapiro et al. |
| 5,825,360 | A | * | 10/1998 | Odam et al. ................. 715/807 |
| 5,864,874 | A | | 1/1999 | Shapiro et al. |
| 5,951,642 | A | * | 9/1999 | Onoe et al. ................. 709/224 |
| 6,144,991 | A | * | 11/2000 | England ..................... 709/205 |
| 6,421,733 | B1 | * | 7/2002 | Tso et al. ................... 709/246 |
| 6,493,635 | B1 | * | 12/2002 | Bevc et al. .................. 702/14 |
| 6,624,827 | B1 | * | 9/2003 | Hwang et al. ............... 715/753 |
| 6,950,101 | B2 | * | 9/2005 | Hunt et al. .................. 345/428 |
| 7,020,697 | B1 | * | 3/2006 | Goodman et al. ........... 709/223 |
| 7,146,415 | B1 | * | 12/2006 | Doi ........................... 709/224 |
| 7,213,050 | B1 | * | 5/2007 | Shaffer et al. ............... 709/204 |
| 7,228,507 | B2 | * | 6/2007 | Good et al. ................. 715/778 |

(Continued)

FOREIGN PATENT DOCUMENTS

JP A-7-306875 11/1995

(Continued)

OTHER PUBLICATIONS

N. Ohsuga et al., "A Shared Projector System in Collaboration Work", IPSJ SIG Notes, vol. 2002, No. 97, pp. 119 to 125, Oct. 24-25, 2002.

(Continued)

*Primary Examiner*—Thu Nguyen
*Assistant Examiner*—Hieu Hoang
(74) *Attorney, Agent, or Firm*—Oliff & Berridge, PLC

(57) ABSTRACT

In a shared workspace, a session for managing connection of conference systems, a file used in a conference and created as a record of the conference, reference information to a resource relevant to the conference, and history information of file access made by conference participants are managed. The conference participant can operate a GUI, thereby connecting to the conference system without being aware of the call address of each conference system and easily accessing information in the files relevant to the conference and the like from the conference system.

24 Claims, 53 Drawing Sheets

U.S. PATENT DOCUMENTS

| | | | |
|---|---|---|---|
| 7,298,834 B1* | 11/2007 | Homeier et al. | 379/202.01 |
| 7,330,541 B1* | 2/2008 | Surazski et al. | 379/202.01 |
| 2001/0034646 A1* | 10/2001 | Hoyt et al. | 705/14 |
| 2002/0019853 A1* | 2/2002 | Vange et al. | 709/207 |
| 2002/0049738 A1* | 4/2002 | Epstein | 707/1 |
| 2002/0128907 A1* | 9/2002 | Sato et al. | 705/14 |
| 2003/0014488 A1* | 1/2003 | Dalal et al. | 709/204 |
| 2003/0030670 A1* | 2/2003 | Duarte et al. | 345/758 |
| 2003/0101343 A1* | 5/2003 | Eaton et al. | 713/170 |
| 2003/0101443 A1* | 5/2003 | Kosche et al. | 717/158 |
| 2003/0158745 A1* | 8/2003 | Katz et al. | 705/1 |
| 2003/0174826 A1* | 9/2003 | Hesse | 379/210.01 |
| 2003/0220973 A1* | 11/2003 | Zhu et al. | 709/205 |
| 2004/0003371 A1* | 1/2004 | Coulthard et al. | 717/101 |
| 2004/0107256 A1* | 6/2004 | Odenwald et al. | 709/205 |
| 2004/0117445 A9* | 6/2004 | Lee et al. | 709/205 |
| 2005/0178833 A1* | 8/2005 | Kisliakov | 235/441 |

FOREIGN PATENT DOCUMENTS

| | | |
|---|---|---|
| JP | A 08-70300 | 3/1996 |
| JP | A 08-088843 | 4/1996 |
| JP | A 08-251568 | 9/1996 |
| JP | A-9-054741 | 2/1997 |
| JP | A 2000-076171 | 3/2000 |
| JP | A 2002-041429 | 2/2002 |
| JP | A 2002-132618 | 5/2002 |
| WO | WO 01/89149 A2 | 11/2001 |

OTHER PUBLICATIONS

K. Watanabe, et al., "Multimedia Dispersion Attendance Conference System MERMAID", Transactions of Information Processing Society of Japan, Information Processing Society of Japan, vol. 32, No. 9, p. 1200-1209, Sep. 15, 1991.

* cited by examiner

RELATED ART

TELECONFERENCE SYSTEM, TELECONFERENCE SUPPORT METHOD, AND COMPUTER PROGRAM

BACKGROUND OF THE INVENTION

1. Field of the Invention

The present invention relates to a teleconference system, a teleconference support method, and a computer program for realizing cooperative work of two or more persons through a network and in particular to a teleconference system, a teleconference support method, and a computer program for connecting a plurality of sites and realizing remote cooperative work.

More particularly, the present invention relates to a teleconference system, a teleconference support method, and a computer program for providing a shared workspace for one conference participant to easily connect conference systems with any other conference participant and sharing information among them and in particular to a teleconference system, a teleconference support method, and a computer program for enabling conference participants to smoothly share information of files such as a presentation data file in a plurality of conference systems using multimedia.

2. Description of the Related Art

Nowadays, demand for the network computing technology for connecting computers is growing. Cooperative work can be smoothly conducted in a network connection environment by sharing computer resources and sharing, distributing and exchanging information.

For example, a videoconference system can be named as a system for realizing cooperative work of two or more persons through a network. According to the videoconference system, an image and voice are transferred between conference rooms at distant points and while the participants can see their faces each other displayed on television screens, a conference can be operated. Proceedings can be progressed as if the participants actually existing at remote sites existed in the same conference rooms. Since the participants do not actually move, good use of time can be made and costs of travel expenses can be reduced.

The videoconference system is generally made up of image and voice input and output units such as cameras, microphones, monitors, and loudspeakers, image and voice coders and decoders, and communication units and lines for connecting the sites. To share data between remote conference rooms, electronic whiteboards are provided for writing each other and application software is shared and operated.

Recently, use of a cooperative work system between remote sites by conducting two-way communications including a videoconference has been increasing with the widespread use of continuous connection of the Internet and high-speed communications including XDSL and CATV.

In holding a teleconference at a plurality of sites using a videoconference system, the following are required:

(1) Connecting two systems installed respectively at each of the sites and distributing video and audio recorded at each sites; and (2) sharing materials required in the conference.

In a conventional videoconference system, to connect systems to each other, the conference participants need to perform the following procedure:

(1) In point-to-point connection, the name and address of the connection destination are input to the apparatus installed at the site and the connection destination is called and connected.

(2) To connect three or more sites, the addresses of the systems at the sites are registered in an apparatus called multipoint connection apparatus and the sites are called from the multipoint connection apparatus and are connected.

In a conventional teleconference system, the systems are connected by communication lines of a line switching system such as telephone lines and therefore the systems basically are connected in a point-to-point connection manner.

The multipoint connection apparatus is designed for connecting such three or more systems; the multipoint connection apparatus and the site apparatus installed at the sites are connected, whereby star connection is formed. The multipoint connection apparatus provides functions of manually selecting video of one site distributed to each site and selecting video distributed as audio is input. The multipoint connection apparatus in the related art is mainly used when three or more sites are connected for holding a teleconference, and is positioned as a hub of star connection for realizing connection of all sites by line switching. (See FIG. 56.)

For example, some teleconference systems using multimedia provide a graphical user interface having icons such as a conference table, a conference seat and a telephone, imitating an actual conference room so that even participants unskilled in the conference system procedure can easily use the system, and enable any other conference participant to set a call using multimedia by using the telephone icon. (See JP-A-8-251568.)

On the other hand, "ubiquitous" is proposed as the direction pursuing in the future computers and networks. For example, it is desired to take out all knowledge regardless of the site or time.

The word "ubiquitous" or "ubiquitous computing" was proposed by Mark Weiser in Xerox PARC Laboratory and refers to "environment in which the user can use the capability of a computer having similar performance if the user moves anywhere." Computers are introduced as joined together with routine workspace regardless of whether or not the user possesses a computer machine such as a PC (Personal Computer) or a PDA (Personal Digital Assistance) devices when accessing information, and the computer capabilities of information collection, management, analysis, any other computation processing, information display, information distribution, are provided for the user without being aware of the user.

The ubiquitous technology is applied to the teleconference system, whereby not only formatted information such as information in a computer file, but also individual implicit information, namely, the flexibility of workspace is enhanced, collaboration exceeding the frames of offices, enterprises, nationalities, etc., is realized, and the possibility of business is widened.

For example, as for file sharing, a network system is proposed wherein files held by mobile computers can be shared among the computers on a temporarily configured network. (See JP-8-070300.) In this case, to implement the network system, message communications between the mobile computers are conducted with the transmission source and destination addresses specified and address translation of the fixed addresses on the network and the addresses of the mobile computers connected to the network is performed. However, it is necessary to provide a mechanism for connecting the address translation machine and the mobile computers and previously determine whether or not file sharing is enabled. The conscious preliminary steps for file sharing need to be taken and unformatted information cannot be shared.

A conference system wherein shared materials used for a conference can be easily provided and stored is proposed.

(See JP-A-2002-041429.) In this case, videophone conference service is provided through an Internet portal site and the conference participants use communication terminals to participate in a conference in real time with shared materials through the Internet portal site. However, application software needs to be previously downloaded into the terminals of the conference participants.

SUMMARY OF THE INVENTION

It is an object of the invention to provide an advantageous teleconference system, an advantageous teleconference support method, and an advantageous computer program for making it possible to connect a plurality of sites and realize remote cooperative work.

It is another object of the invention to provide an advantageous teleconference system, an advantageous teleconference support method, and an advantageous computer program for making it possible to provide a shared workspace for one conference participant to easily connect conference systems with any other conference participant and share information among them.

It is a further object of the invention to provide an advantageous teleconference system, an advantageous teleconference support method, and an advantageous computer program for making it possible to realize cooperation call setting and information sharing from a plurality of conference systems using multimedia.

It is a further object of the invention to provide an advantageous teleconference system, an advantageous teleconference support method, and an advantageous computer program for making it possible to smoothly collect, manage, analyze, display and distribute information used in a conference based on easy user operation.

In order to achieve the object of the invention, according to a first aspect of the invention, there is provided a teleconference system for supporting realization of cooperative work among a plurality of conference systems, the teleconference system including: site systems each being installed at a plurality of sites respectively, and each configured to operate the corresponding conference system; and a shared workspace server configured to connect the site systems to each other and to share a workspace of an object for managing and using a task as a cooperation unit among the sites.

According to a second aspect of the invention, there is provided a teleconference support method for supporting realization of cooperative work among a plurality of conference systems, the method including: providing a workspace including one or more sessions; opening the workspace in response to workspace selection of a user; adding the opened workspace to an active workspace; and managing use of the workspace.

According to a third aspect of the invention, there is provided a computer program described in a computer-readable format so as to execute processing for supporting realization of cooperative work among a plurality of conference systems in a computer system, the computer program including: means for providing a workspace including one or more sessions; means for opening the workspace in response to workspace selection of a user; means for adding the opened workspace to an active workspace; and means for managing use of the workspace.

BRIEF DESCRIPTION OF THE DRAWINGS

The above and other objects, features and advantages of the invention will be apparent from the following detailed description of the preferred embodiments of the invention with reference to the accompanying drawings, wherein.

DETAILED DESCRIPTION OF THE PREFERRED EMBODIMENTS

Referring now to the accompanying drawings, a description will be given in detail of preferred embodiments of the invention.

Configuration of Teleconference System

Figure 1:
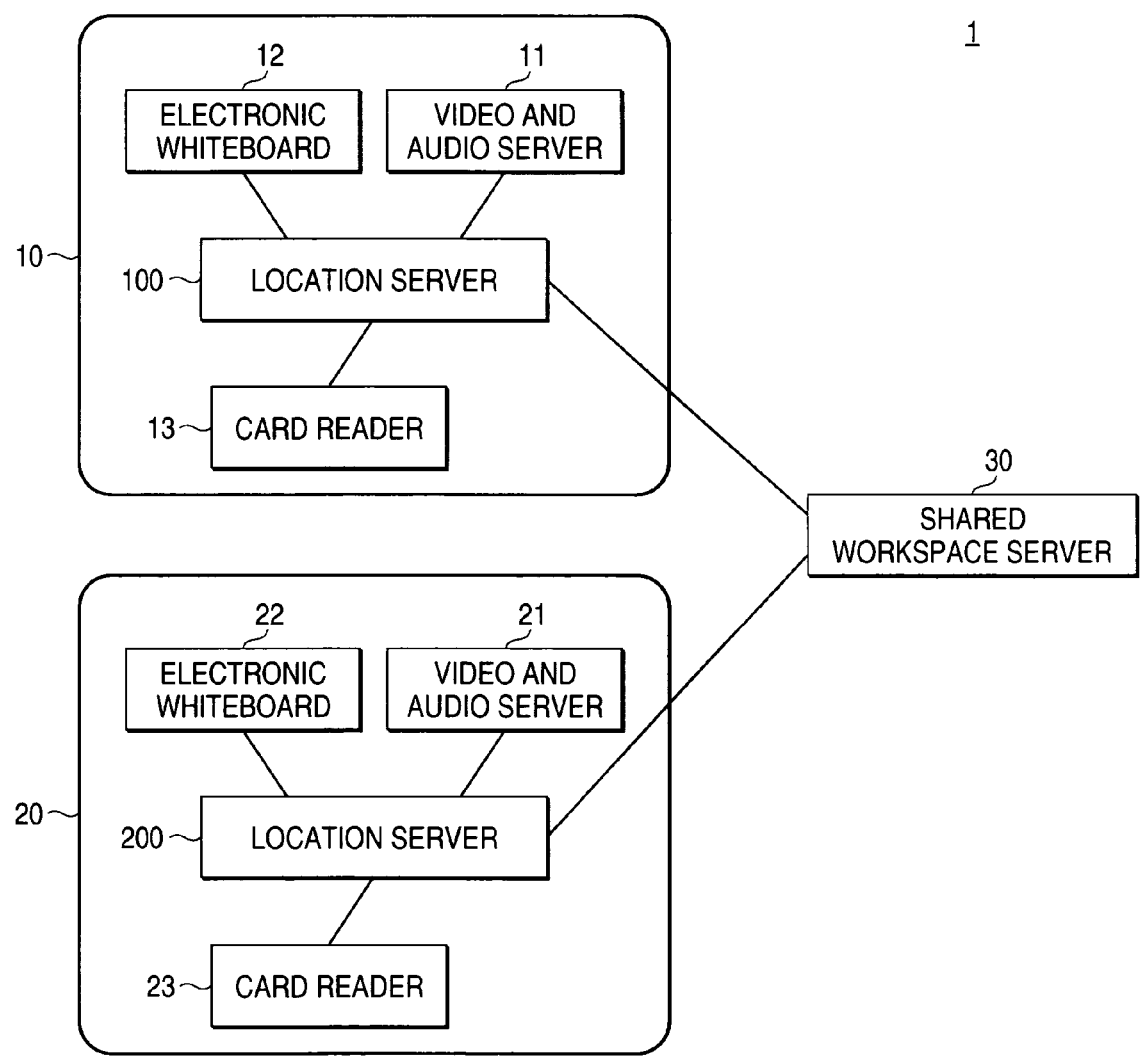
FIG. 1 is a drawing to schematically show a configuration of a teleconference system according to an embodiment of the invention.

FIG. 1 schematically shows the configuration of a teleconference system 1 according to an embodiment of the invention. As shown in the figure, the teleconference system 1 has two site systems 10 and 20 connected by a shared workspace server 30. In the example shown in the figure, the shared workspace server 30 connects the two sites (namely, conference systems) for simplicity of the drawing, but it is to be understood that the shared workspace server 30 is not limited to point-to-point connection and can connect three or more sites.

The shared workspace server 30 differs from a multipoint connection apparatus positioned as a hub of star connection of systems using communication lines of a line switching system such as telephone lines. The shared workspace server 30 manages sessions for managing connection of the conference systems, files used in conferences and created as records of the conferences, reference information to resources relevant to conferences, and history information of file access made by conference participants which will be described later.

The site systems 10 and 20 correspond to separately operating conference systems and a conference is operated for each site. Each of the site systems can be configured based on a videoconference system in a related art. For example, video and audio servers 11 and 21 are provided and images and voice are input and output using cameras, microphones, monitors and loudspeakers and are coded and decoded and then are transmitted to and received from any other site system for sharing motion and behavior of the participants at the sites.

Electronic whiteboards 12 and 22 are also provided for writing at the sites. Application software is shared between the site systems and is operated. In the embodiment, a graphical user interface (GUI) provided by a shared workspace is presented on each of the electronic whiteboards 12 and 22, and enables the conference participant to connect to a multimedia communication conference system and access information in files relevant to the conference and the like (described later).

Each conference participant at each site becomes the user of the teleconference system 1. The conference participant can operate the graphical user interface provided by the shared workspace, thereby connecting to the multimedia communication conference system without being aware of the call address of each multimedia communication conference system and easily accessing information in the files relevant to the conference and the like from the conference system.

An authentication unit for authenticating identification of the conference participants is installed in each of the site systems 10 and 20. In the embodiment, each participant carries an IC card as personal identification medium and the site systems 10 and 20 are provided with card readers 13 and 23 for reading IC cards and can perform authentication processing and checking authorization.

In the teleconference system 1 of shared workspace type as shown in FIG. 1, the following can be realized for supporting the cooperative work between remote sites:

(1) Immediately connecting to the associated party of cooperative work;

(2) immediately taking out a document required for cooperative work; and (3) immediately passing the result of cooperative work to the following step.

The teleconference system 1 according to the embodiment provides modality and a combination of modalities required for cooperative work for each site. For example, presentation materials such as voice and files, electric whiteboard, face video distribution, and remote cooperative edit can be put into a package for use.

In the teleconference system 1, a document relevant to cooperative work is presented and automatic connection to members participating in cooperative work is made, whereby space for cooperative work is individually adapted to each group work (site).

In the teleconference system 1, real-time cooperative work and non-real-time cooperative work are associated with each other. That is, real-time cooperative work is recorded (for example, presentation materials using the electronic whiteboard are saved) and is associated with non-real-time cooperative work, and a document is related to real-time cooperative work to associate non-real-time cooperative work with real-time cooperative work.

The schematic operation procedure of the teleconference system 1 of shared workspace type according to the embodiment is as follows:

(1) To use the conference system, the user selects the shared workspace (logs in to the workspace or accesses with authentication).

For example, the user inputs his or her ID to the system using the IC card corresponding to the shared workspace. Alternatively, the user personally logs in to the system and selects the workspace by performing GUI operation.

(2) The user opens the shared workspace and understands who shares the workspace at present and who is communicating in the conference system at present.

(3) If the user selects "conference" in the shared workspace, the user can participate in a teleconference from the site (a plurality of conferences such as a general conference and a conference in which specific persons participate may be open in the shared workspace).

(4) A document can also be placed in the shared workspace. The document is referenced during the conference and the image on the electronic whiteboard in the conference is saved.

(5) The shared workspaces are hierarchically organized and are liked with each other by hyperlink.

(6) The user can reference subworkspace while participating in shared workspace.

(7) The user operates subworkspace to disclose information in shared workspace (drag and drop from personal workspace).

The user can hold the IC card to the site system 10 to which the user belongs, thereby logging in to the system through predetermined authentication processing. After the user logs in, the workspaces relevant to (authorized for) the user are listed in the site system 10. The workspace mentioned here corresponds to one conference. If another user subsequently holds the IC card to the site system 10 for logging in to the system, when the user is permitted to log in to the system through similar authentication processing, the workspaces common to those for the user previously logging in to the system are listed. If the user selects a specific workspace, shared documents (files) linked with the workspace are listed. On the other hand, if the same workspace is selected in a remote site system, workspace connection is established between the site systems and similar operation to that in the local site system is performed. A history of operation such as file open and edit of the shared documents in the workspace is held for the later use as a search key. Local and remote are not distinguished from each other in activities in the workspace.

Figure 2:
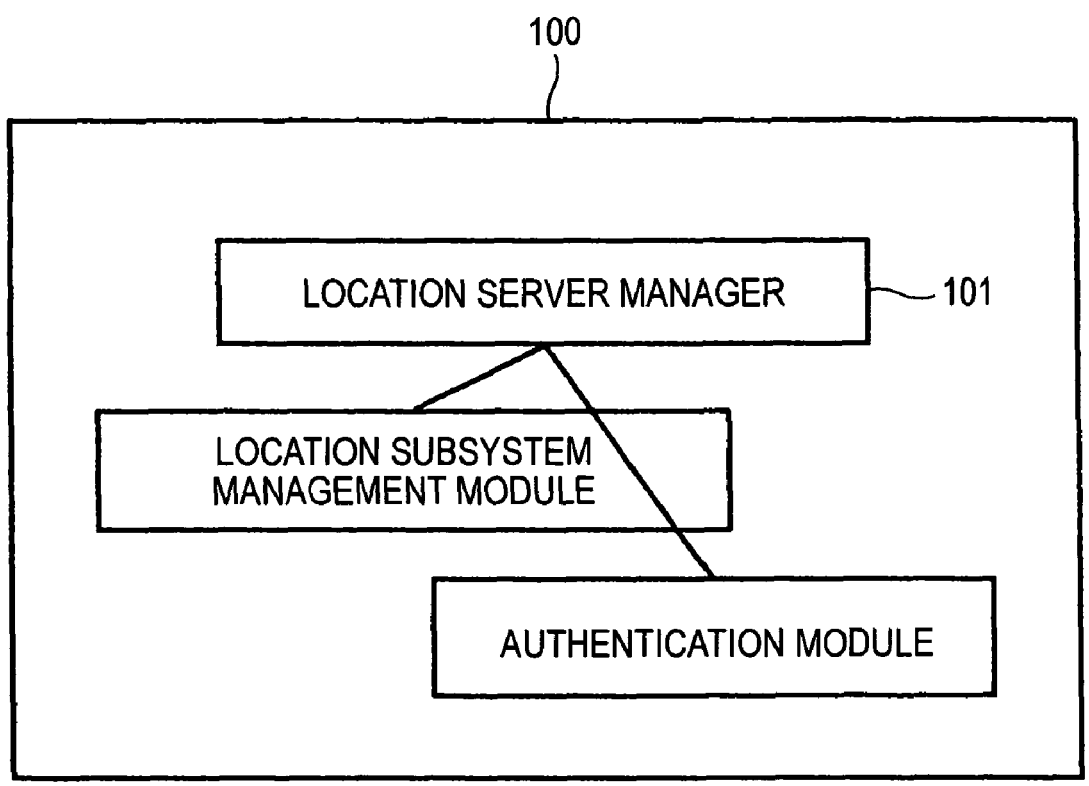
FIG. 2 is a drawing to schematically show a functional configuration of a site server for operating a conference (such as a videoconference) in a site system.

FIG. 2 schematically shows the functional configuration of a site server 100 for operating a conference (such as a videoconference) in the site system 10. It is to be understood that a site server 200 in the site system 20 has a similar configuration although not shown.

The site server 100 includes an authentication module for executing a part of an authentication step at the site, a subsystem management module for managing the network addresses of subsystems making up the site system such as the electronic whiteboard and the video and audio server installed at the site, and a site server manager for managing the modules.

The site server 100 communicates with the shared workspace server 30 for enabling use of workspace based on authentication information and authorization information read from the IC card of the conference participant using the connected card reader 13.

In each workspace, sessions for managing connection of the sites, namely, the conference systems, files used in conferences and created as records of conferences, reference information to resources relevant to conferences, and history information of file access, resource access made by the conference participants are managed.

In the site system 10, the graphical user interface is provided and the conference participants can use the user interface to specify the same session provided in the session, thereby setting a call of cooperative work and sharing information. The resources relevant to each conference, for example, may exist in the site system 10 or may be stored in another storage area in the site or a server outside the site and, for example, are described in URL (Uniform Resource Locator) format. The access history is information such as access occurrence places, access users and access times.

An access control list (ACL) is assigned to the session, file, reference information, and access history information in the workspace. A workspace manager 31 not only can manage or limit use in workspace units, but also can perform access control finely in session units, file units, reference information units, or access history information units in the workspace (which will be described later).

The site server 100 is implemented as predetermined server application is started in a general computer system such as a personal computer (PC) and a workstation (WS) connected through the network.

Figure 42:
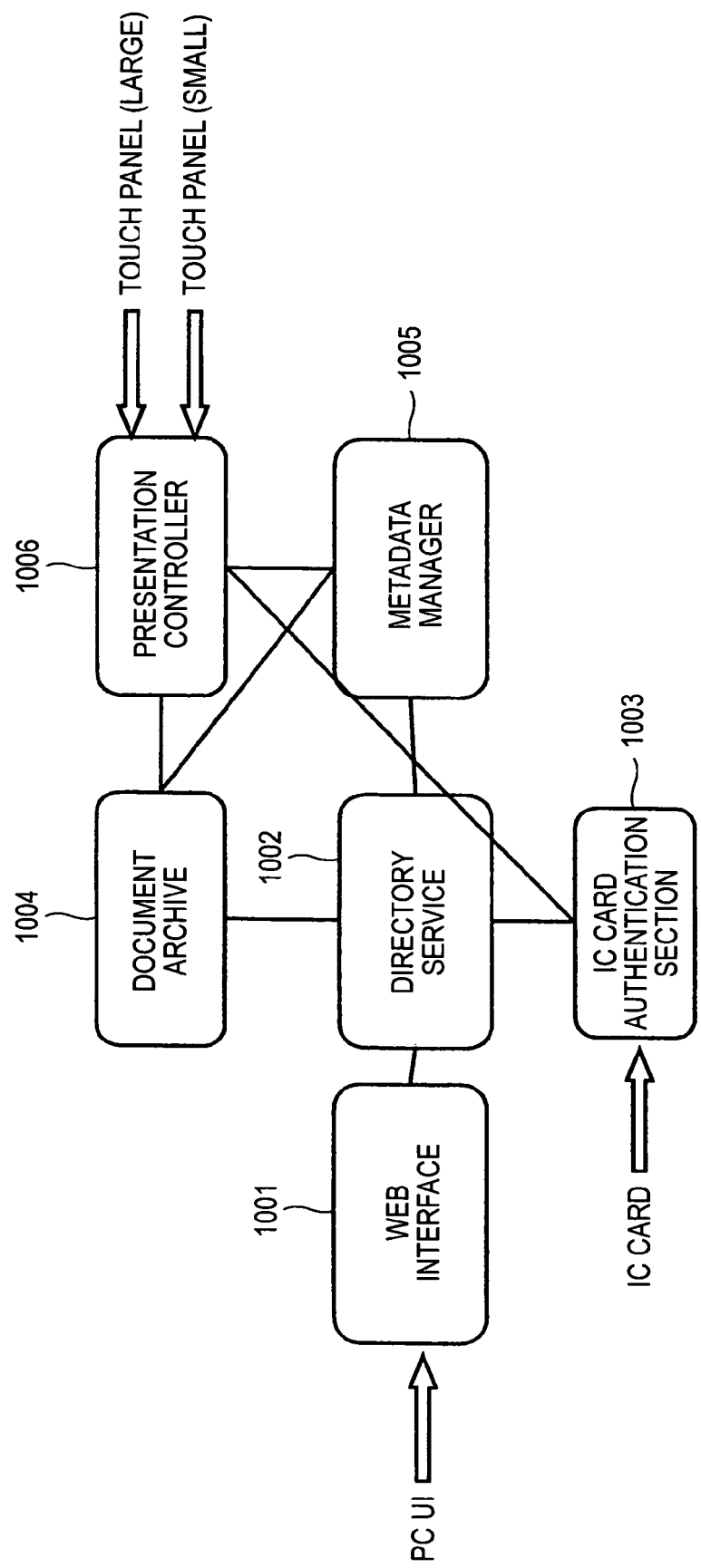
FIG. 42 is a drawing to show an implementation example of the site system.

FIG. 42 shows an implementation example of the site system 10. The site system 10 shown in the figure is made up of a web interface 1001 for the user such as a conference participant to access via a user interface (not shown) of an information terminal, a directory service 1002 for managing personal data, an IC card authentication section 1003 for performing authentication processing when the user logs in to the system or a shared document is distributed, a document archive 1004 for storing shared documents in the site, a metadata manager 1005 for acquiring and managing an access history to the shared documents and a miscellaneous activity history of the users logging in to the system as metadata, and a presentation controller 1006.

The web interface 1001 provides an entry for the user such as a conference participant to access via a user interface (not shown) of an information terminal.

The directory service 1002 manages the personal data about the users (conference participants) in the site.

The IC card authentication section 1003 performs authentication processing when the user logs in to the system or a shared document is distributed using the very short range communication technology of IC cards and tamper-proof authentication technology, which is conventionally well known.

The document archive 1004 stores the shared documents in the site, such as presentation files used in conferences.

The metadata manager 1005 acquires information of an access history to the shared documents, a miscellaneous activity history of the users logging in to the system in the site, distribution (taking back) of the shared documents on the background of the workspace and manages the information as metadata.

Figure 43:
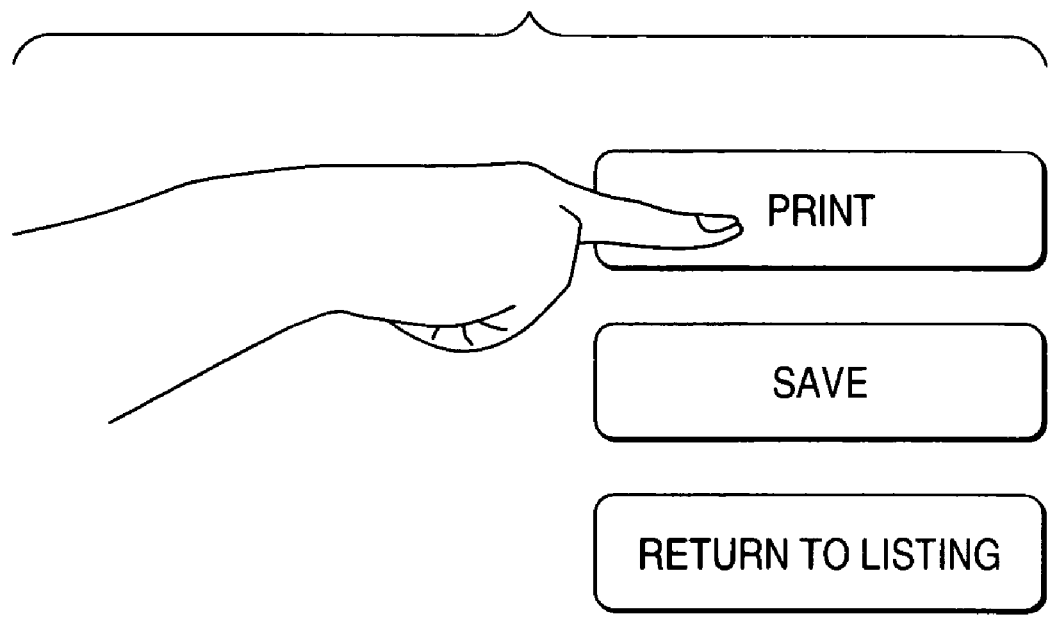
FIG. 43 is a drawing to show disposing of application operation buttons such as print, display, and listing of shared documents on a wall.

The presentation controller 1006 provides an interface for enabling the users (namely, conference participants) to collaborate in the workspace of a conference. The presentation controller 1006 is implemented in various manners. For example, user interfaces of a general computer, such as a display, a keyboard, a mouse, and a tablet may be installed in a conference room as they are. Alternatively, a projection screen onto a wall through a projector, a camera for capturing user operation on the projection screen, and a whiteboard are used in combination to make up a user interface. Application operation buttons such as print, display, and listing of shared documents are disposed on the wall (see FIG. 43). Of course, a probe for detecting a user command without user's consciousness may be disposed in the conference room.

Figure 44:
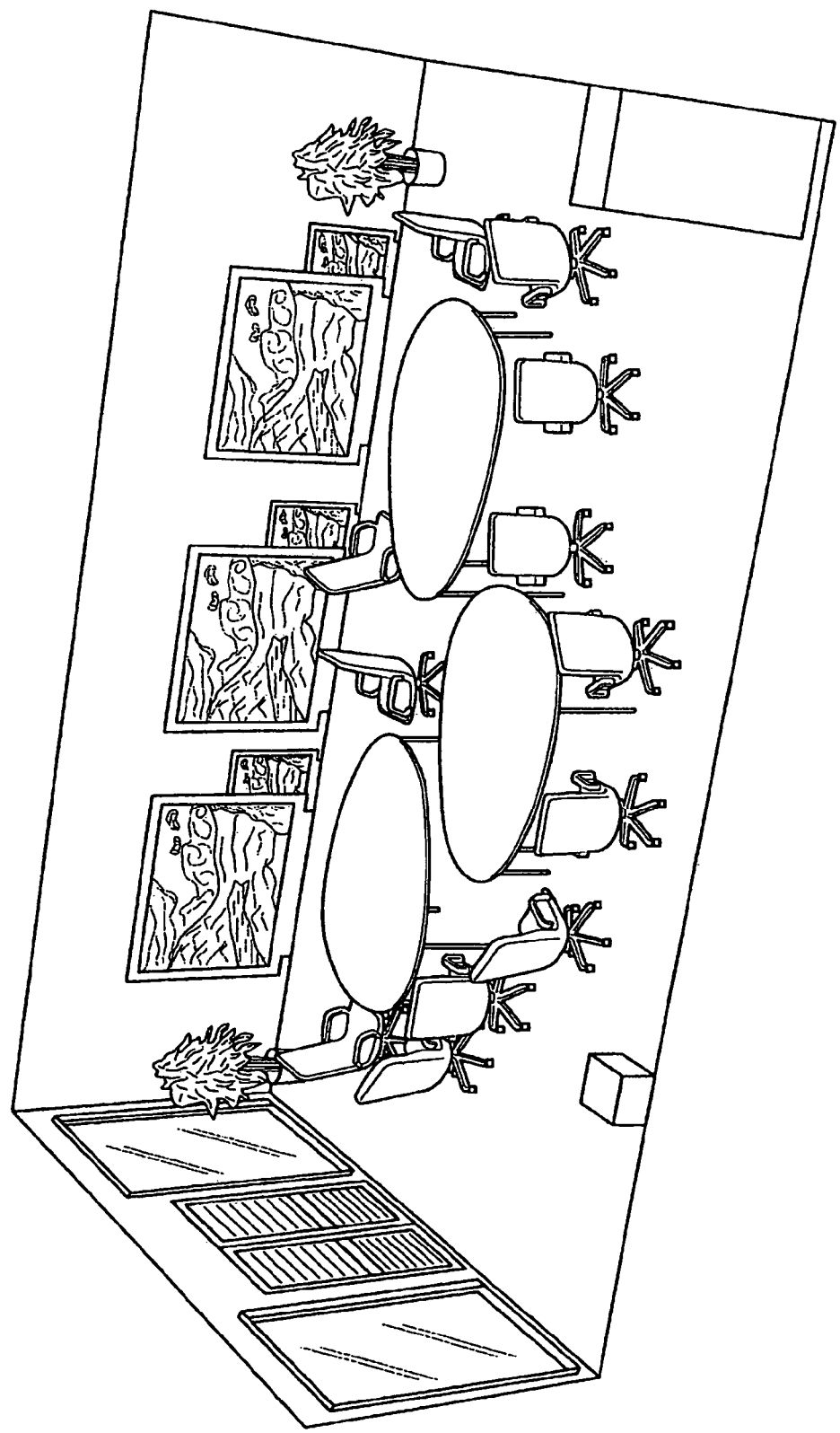
FIG. 44 is a general view of a conference room according to the embodiment of the invention.

Information can be accessed irrespective of whether or not the user possesses a computer machine such as a PC or a PDA device depending on how the presentation controller 1006 is implemented. FIG. 44 is a general view of a conference room according to the embodiment of the invention. Computers are introduced as joined together with the workspace shown in the figure, and the computer capabilities of information collection, management, analysis, any other computation processing, information display and information distribution are provided for the user who is unaware of them. That is, not only formatted information such as information in a computer file, but also individual implicit information, namely, the flexibility of workspace is enhanced, collaboration exceeding the frames of offices, enterprises, nationalities, etc., is realized, and the possibility of business is widened.

Figure 55:
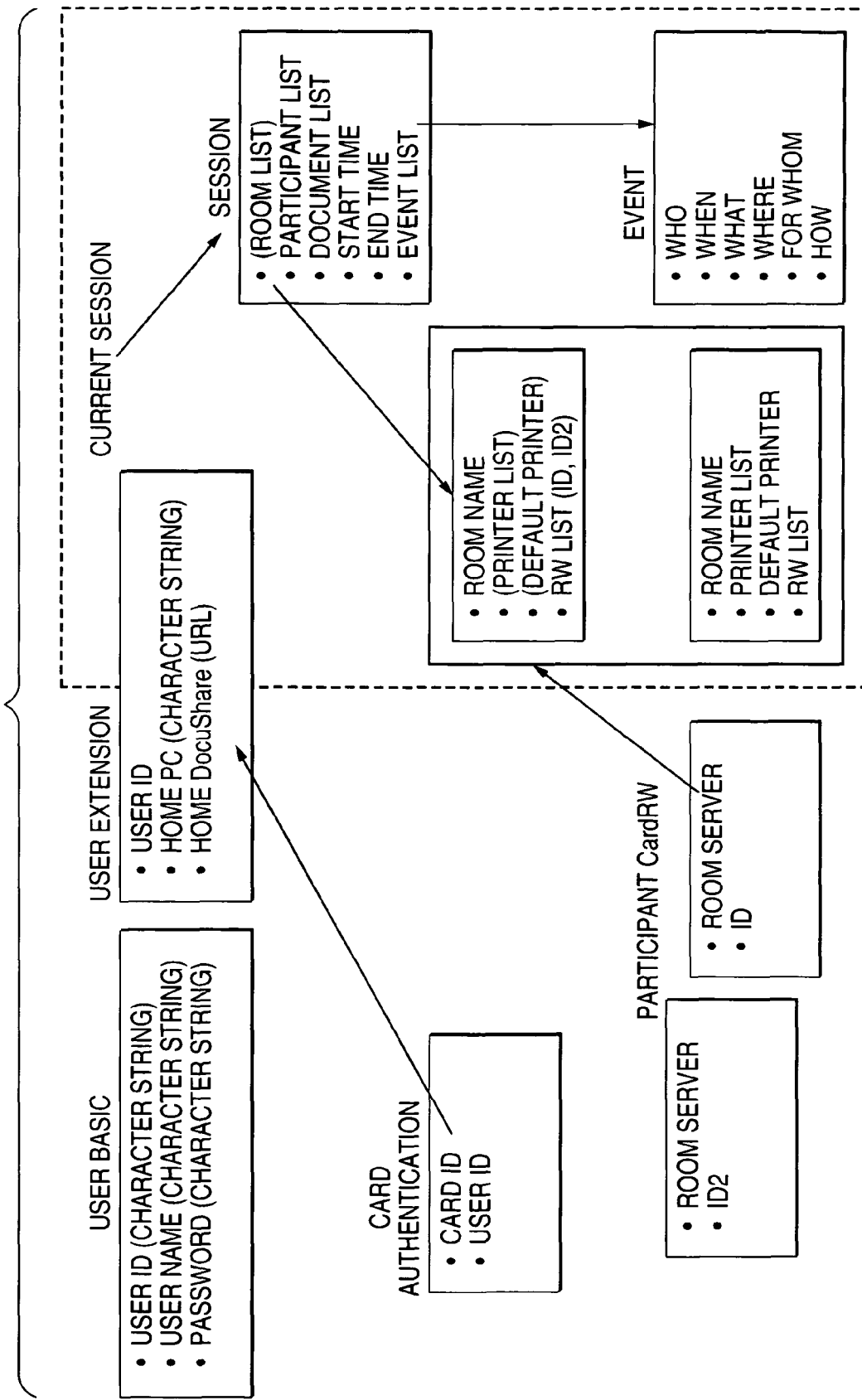
FIG. 55 is a drawing to schematically show the configuration of a metadata schema managed in a metadata manager.
Figure 56:
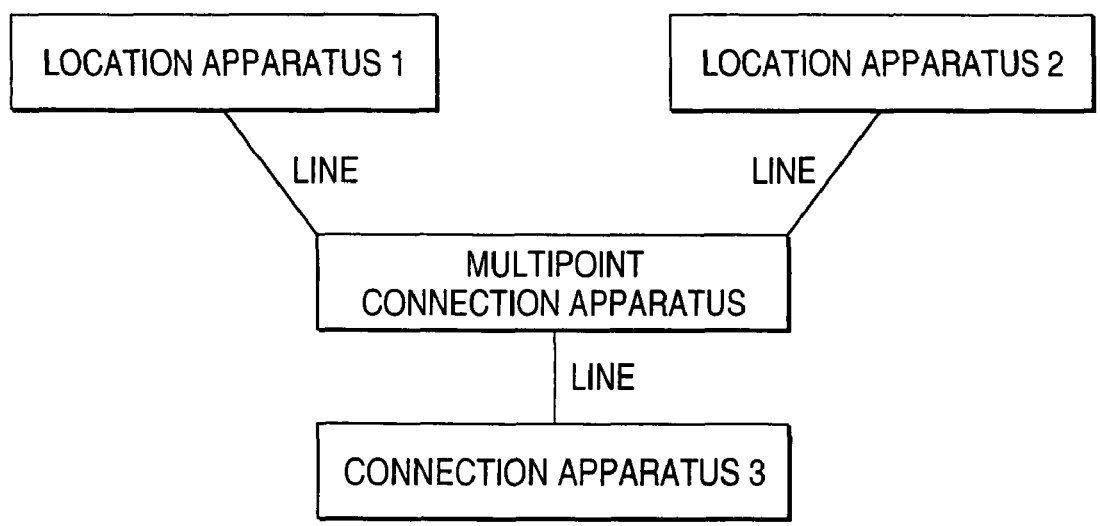
FIG. 56 is a drawing to schematically show the configuration of a system using a multipoint connection apparatus for realizing connection of three or more sites (related art).

FIG. 55 schematically shows the configuration of a metadata schema managed in the metadata manager 1005. The metadata manager 1005 executes log-in management to a user conference (session) according to the following procedure:

(1) The user (such as a conference presenter) logs in to the system by connecting the IC card or any other portable authentication medium storing the user ID to a connection terminal such as a card reader installed in the conference room.

(2) The presentation controller 1006 transmits the presented user ID information to the directory server 1002 storing the user attributes and acquires site information of the object retaining the user information (a pair of the server ID and the information object ID).

(3) The metadata manager 1005 uses terminal information transmitted from the presentation controller 1006 and records "terminal ID, user ID, use start time."

(4) The presentation controller 1006 transmits a request to the server through the network based on the server ID and requests the server to send the session information associated with the user.

(5) The presentation controller 1006 displays a set of information based on the session information transmitted from the server.

(6) The presenter selects the session out of the set of information for connecting the room to the session.

(7) The presentation controller 1006 transmits a request to the server through the network based on the server ID and requests the server to send the set of information (as a hypertext) associated with the user.

(8) The presentation controller 1006 displays the set of information based on the hypertext transmitted from the server.

(9) The user (presenter) selects the file out of the set of information to invoke the corresponding application for displaying a screen.

Figure 3:
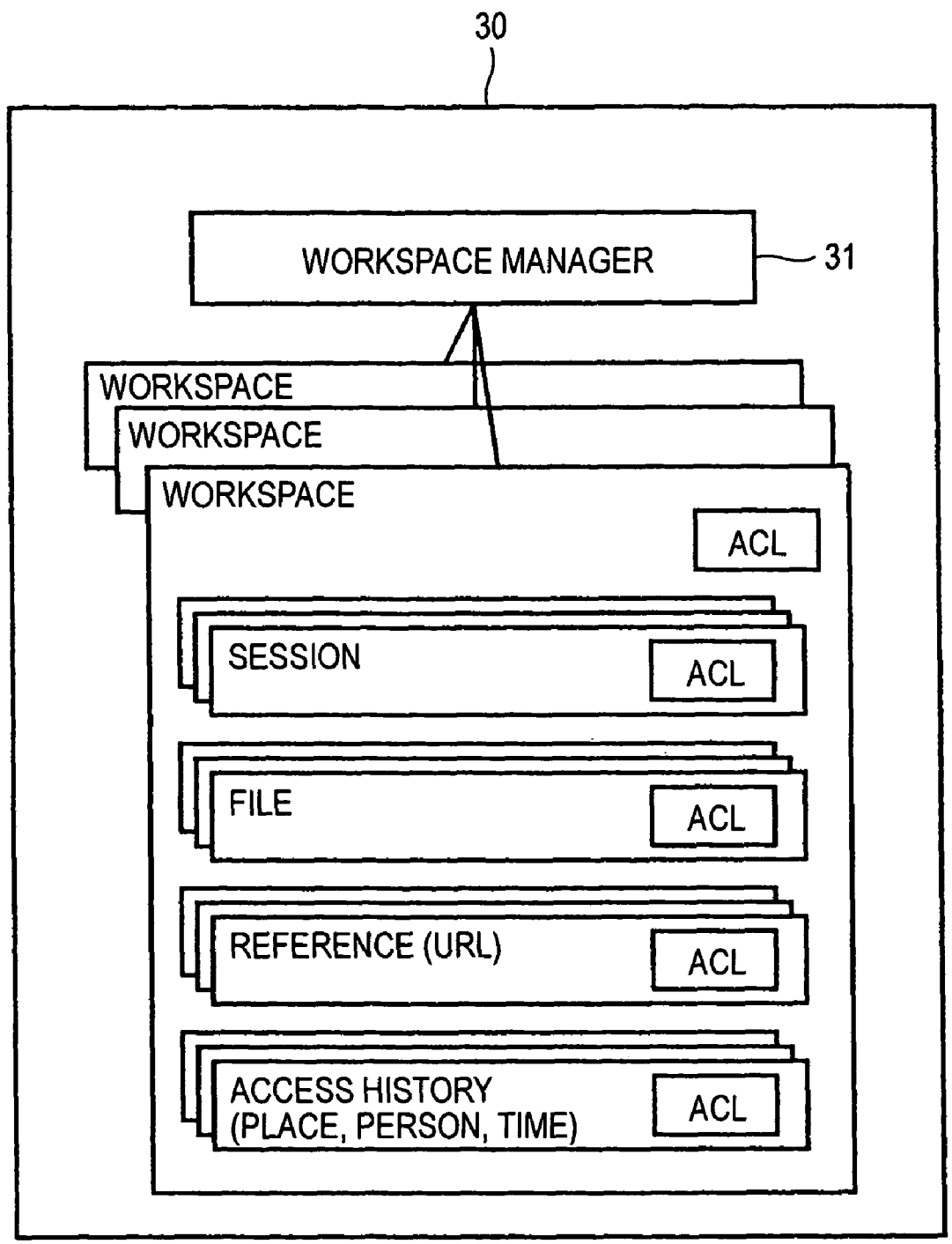
FIG. 3 is a drawing to schematically show a functional configuration of a shared workspace server.

The site systems 10 and 20 are connected to each other by the shared workspace server 30 as previously described with reference to FIG. 1. FIG. 3 schematically shows the functional configuration of the shared workspace server 30.

The shared workspace server 30 is placed for sharing the workspace of the object for managing and using tasks (cooperation units) among the sites.

The workspace manager 31 manages the workspaces generated at the sites in the teleconference system 1.

An access control list (ACL) is provided for each workspace. The workspace manager 31 manages or limits use of workspace across a plurality of sites based on authentication information and authorization information read from the IC card held by each conference participant.

In each workspace, sessions for managing connection of the sites, namely, the conference systems, files used in conferences and created as records of conferences, reference information to resources relevant to conferences, and history information of file access and resource access made by the conference participants are managed.

An access control list (ACL) is assigned to the session, file, reference information, and access history information in the workspace. Therefore, the workspace manager 31 not only can manage or limit use in workspace units, but also can perform access control finely across the sites in session units, file units, reference information units, or access history information units in the workspace (described later).

The shared workspace server 30 is implemented as predetermined server application is started in a general computer system such as a personal computer (PC) and a workstation (WS) connected through the network.

Here, the "site" refers to physical site. In contrast, the "workspace" is a virtual information sharing space. The session is a synchronous work unit. A plurality of workspaces can be placed in one site system. A plurality of sessions are managed in one workspace (see FIG. 3). The specification assumes that one workspace exists in the site system for simplicity of the description. If only one session is established in the workspace, teleconference, session, and workspace are synonymous with each other.

Figure 49:
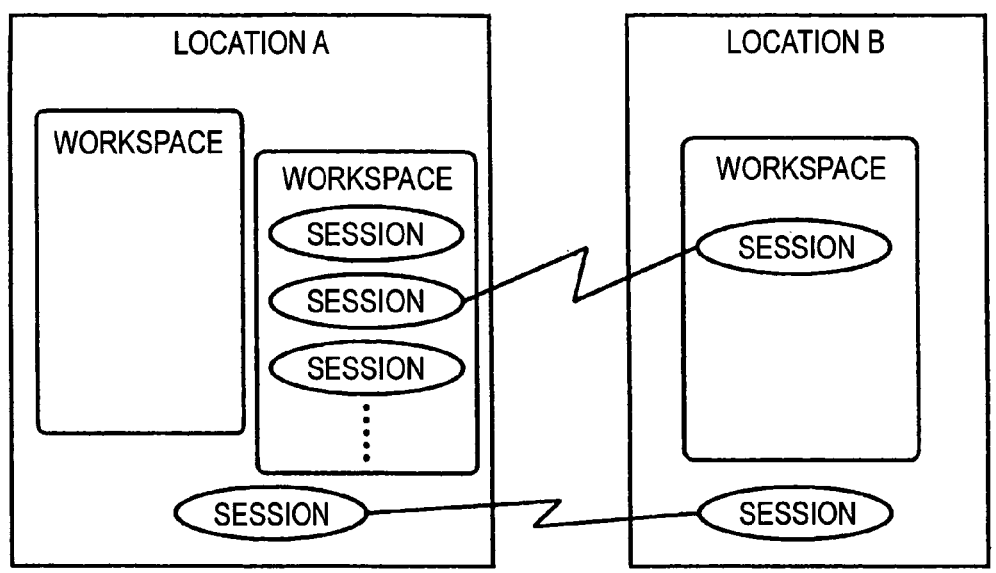
FIG. 49 is a drawing to describe a procedure to establish a session between remote site systems.

A procedure to establish a session between remote site systems will be discussed with reference to FIG. 49.

If one user logs in to the workspace through the authentication procedure via the medium of the IC card, for example, at one site A, the sessions in which the user is authorized to participate (conferences, corresponding to "projects" described later) are listed on the electronic whiteboard or any other display.

If another user logs in to the identical workspace at the identical site A, the sessions common to the two users are listed. If one session is selected, it is started and the shared files in the session are listed.

If the identical session is selected at another site B, the shared workspace server establishes synchronization between the sites. Consequently, file sharing among the users is realized not only in each site, but also between the sites, enabling the users to perform synchronous work of opening and editing each file.

A session can also be established for holding a teleconference outside the workspace.

Subsequently, a file reference method in the workspace will be discussed.

To share a file in the workspace, basically each user previously registers (archives) the shared file in the workspace. The shared workspace server 30 manages the previously registered file based on the access control list (ACL) (see FIG. 3).

Figure 50:
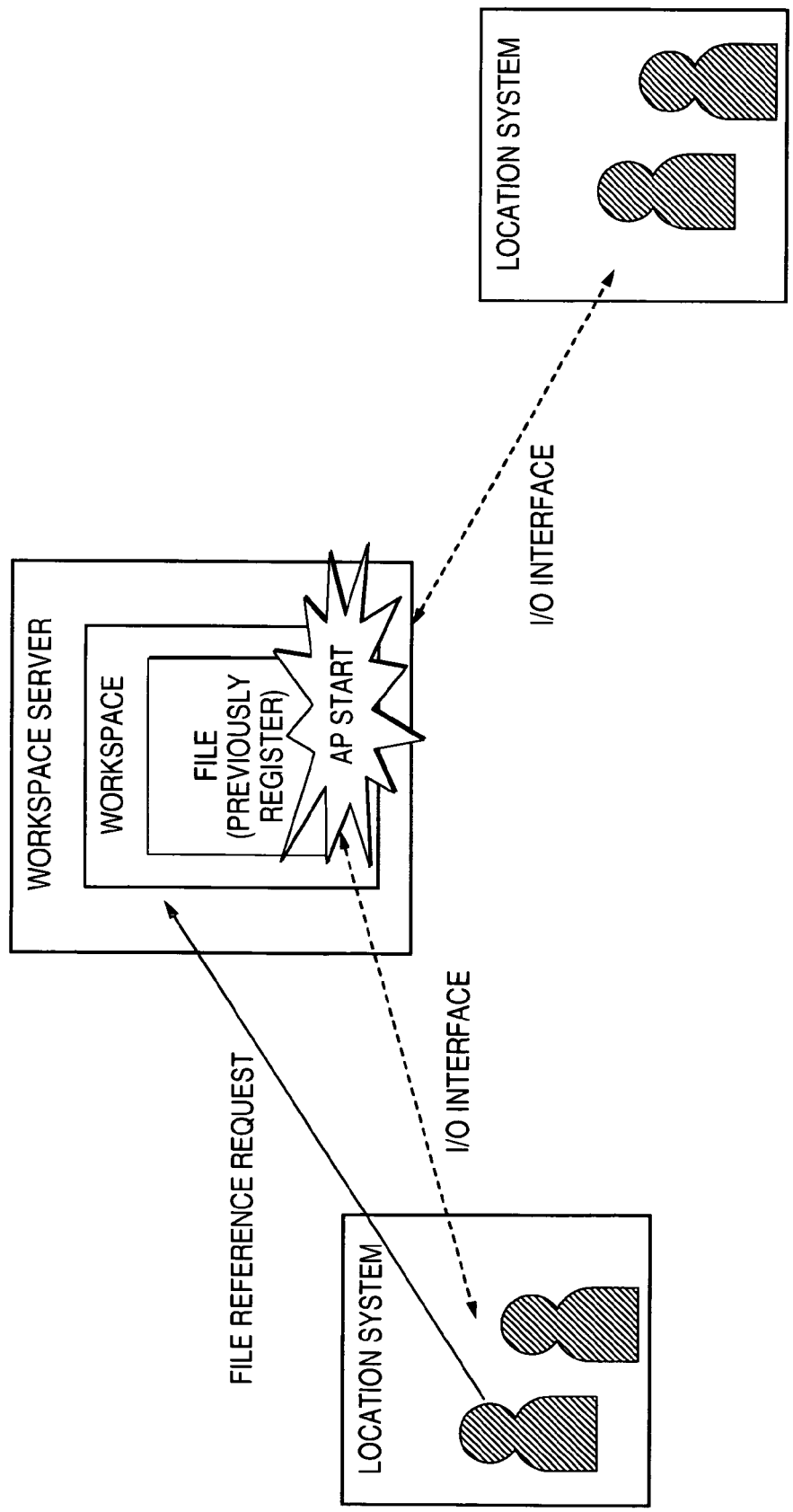
FIG. 50 is a drawing to show the operation to reference a file in a session.

FIG. 50 shows the operation to reference the file in the session.

The user authorized to operate the file sends a file reference request to the shared workspace server 30 through the site server 100 at the site where the user exists.

The shared workspace server 30 responds to the file reference request, takes out the file previously registered in the workspace, and starts application software to open the file.

The shared workspace server 30 provides an input/output interface with the started application for the site server of the file reference requester and another site server with the session established with the site server of the file reference requester. Consequently, file operation of opening and editing the file is shared between the site servers, enabling the users to perform cooperative work between the remote sites.

Figure 51:
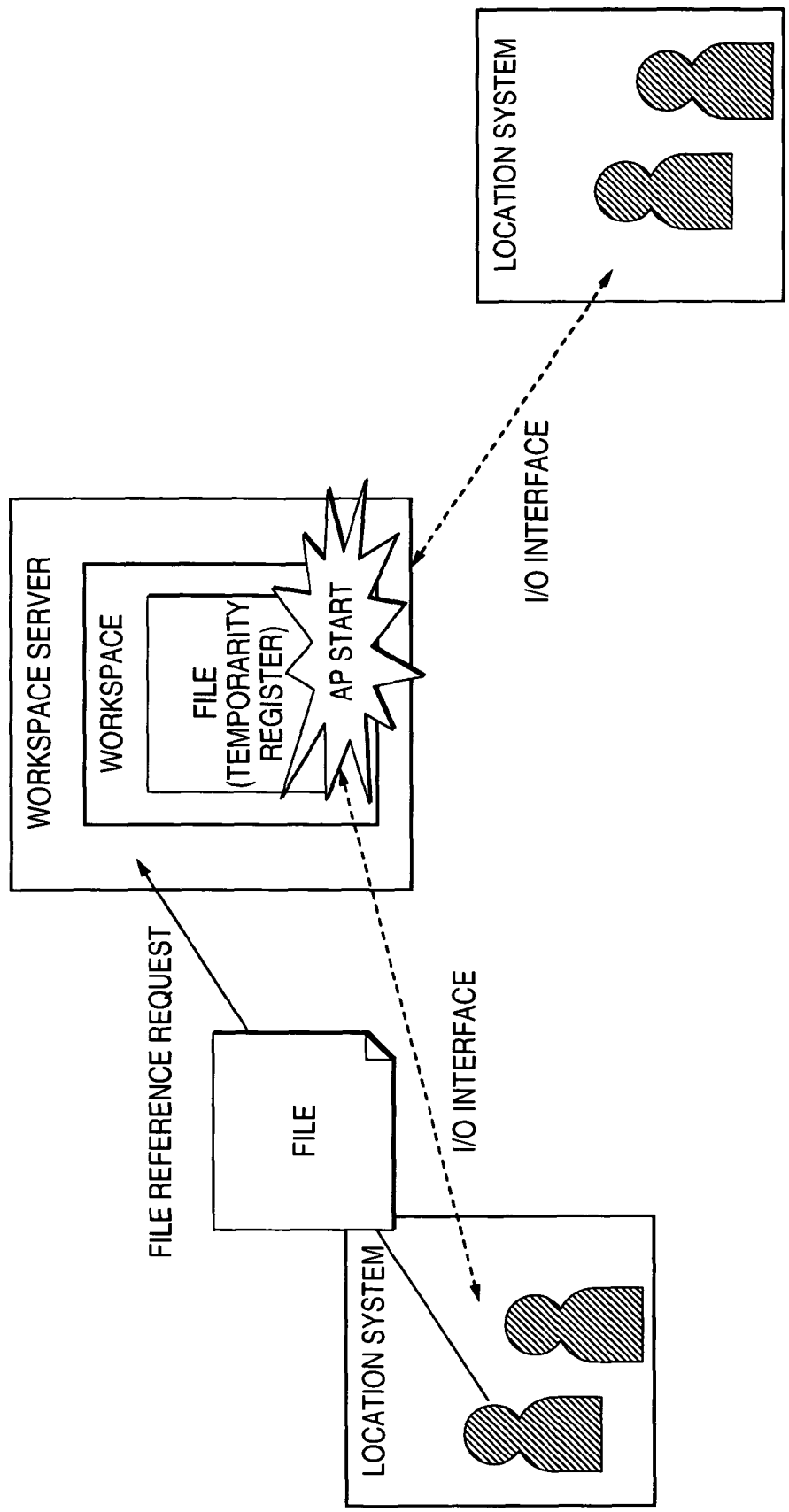
FIG. 51 is a drawing to show the operation to reference a file in a session.

To share a file in the workspace, basically each user needs to previously register (archive) the shared file in the workspace. However, of course, it is also possible to share a file brought into the conference by each user without previously registering the file in the workspace. FIG. 51 illustrates a file reference method applied in this case.

The user authorized to operate the file transfers the file and also sends a request for referencing the file to the shared workspace server 30 through the site server 100 at the site where the user exists.

The shared workspace server 30 responds to the file reference request, temporarily registers the transferred file in the workspace as a temporary file, and starts application software to open the file.

The shared workspace server 30 provides an input/output interface with the started application for the site server of the file reference requester and another site server with the session established with the site server of the file reference requester. Consequently, file operation of opening and editing the file is shared between the site servers, enabling the users to perform cooperative work between the remote sites.

Then, at the termination of the cooperative work using the temporary file, the shared workspace server 30 erases the file from the workspace.

Figure 52:
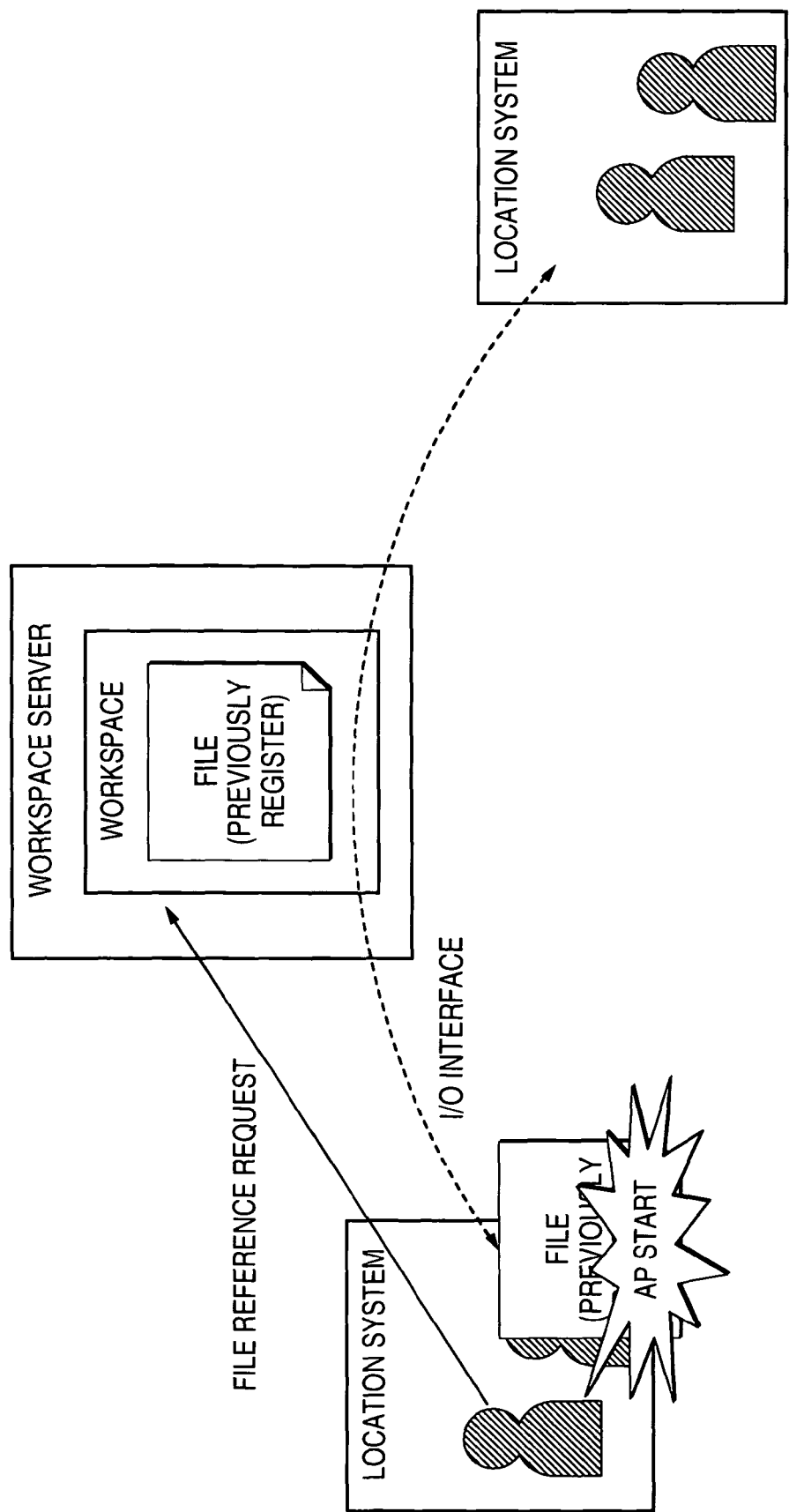
FIG. 52 is a drawing to show the operation to reference a file in a session.

In the examples shown in FIGS. 50 and 51, file sharing is realized through the shared workspace server 30 and thus if the number of sessions established between the site systems and the number of cooperative works (namely, the number of started applications) grow, the processing load on the shared workspace server 30 becomes excessive. Then, the application may be started at the site server of the file reference requester for distributing the load over the whole system. FIG. 52 illustrates a file reference method applied in this case.

The user authorized to operate the file sends a request for referencing the file to the shared workspace server 30 through the site server 100 at the site where the user exists. The file may be or may not be previously registered in the workspace. In the former case, the previously registered file is taken out from the workspace; in the latter case, the file is taken out from the user's local disk.

Next, the site server 100 of the file reference requester takes out the file from the workspace and starts application software to open the file. Alternatively, if the request is a request for referencing the file not previously registered, the site server 100 may temporarily register the file as a temporary file.

The site server 100 provides an input/output interface with the started application for another site server with the session established via the shared workspace server 30. Consequently, file operation of opening and editing the file is shared between the site servers, enabling the users to perform cooperative work between the remote sites.

Figure 53:
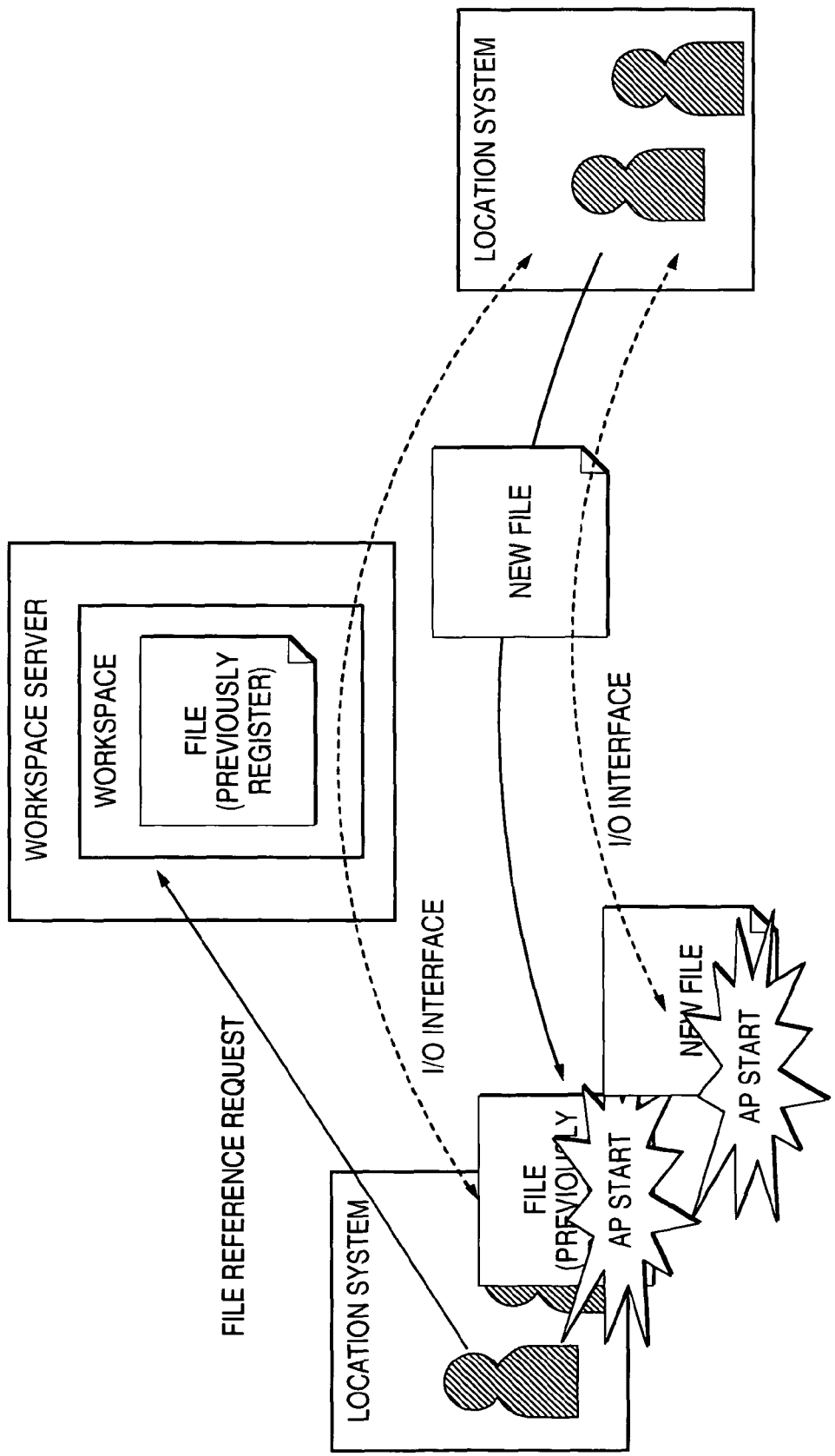
FIG. 53 is a drawing to show the operation to reference a file in a session.

In the associated site server for referencing the file, a request for referencing another file in the session may also occur in the remote cooperative work environment as shown in FIG. 52. In this case, in the site server wherein the application is already started, another application can be started as one method to reference the file. FIG. 53 illustrates a file reference method applied in this case.

At the associated site, the user authorized to operate the file transfers the file and also sends a request for referencing the file to the shared workspace server 30 through the site server 100 at the site where the user exists. The file may be or may not be previously registered in the workspace. In the former case, the previously registered file is taken out from the workspace; in the latter case, the file is taken out from the user's local disk.

The shared workspace server 30 responds to the file reference request and transfers the transferred file to the site server wherein the application is started. Alternatively, if the request is a request for referencing the file not previously registered, the shared workspace server 30 may temporarily register the file as a temporary file.

The site server receiving the file further starts the application for the received file in addition to the current application being started and provides an input/output interface with the started application for another site server with the session established. Consequently, file operation of opening and editing the new file is shared between the site servers, enabling the users to perform cooperative work between the remote sites.

Figure 54:
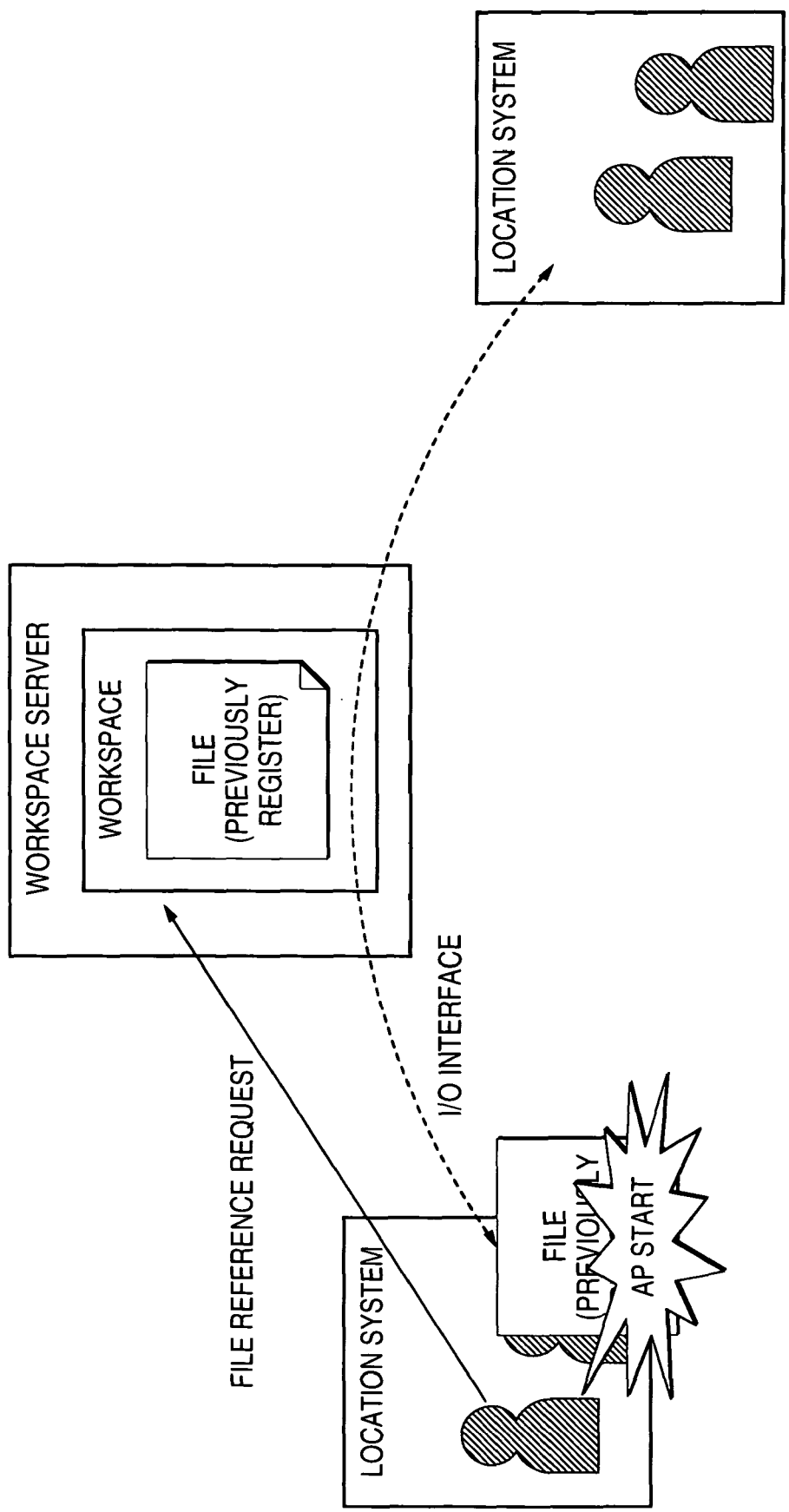
FIG. 54 is a drawing to show the operation to reference a file in a session.

As an alternative file reference method to reference another file in the associated site server for referencing the file in the remote cooperative work environment, the associated site server can start application. FIG. 54 illustrates a file reference method applied in this case.

In the associated site system, a request for referencing the file is sent to the shared workspace server 30 through the site server at the site where the user exists. The file may be or may not be previously registered in the workspace. In the former case, the previously registered file is taken out from the workspace; in the latter case, the file is taken out from the user's local disk.

Next, the site server 100 of the file reference requester takes out the file from the workspace and starts application software to open the file. Alternatively, if the request is a request for referencing the file not previously registered, the shared workspace server 30 may temporarily register the file as a temporary file.

The site server 100 provides an input/output interface with the started application for another site server with the session established via the shared workspace server 30. Consequently, file operation of opening and editing the new file is shared between the site servers, enabling the users to perform cooperative work using the plurality of files between the remote sites.

Operation in Teleconference System

The configuration of the teleconference system according to the embodiment has been described in above. Hereinafter, examples of the operation in the teleconference system will be discussed in detail.

First Example of the Operation (1) The user holds the IC card to the card reader provided in the site system 10 for connecting to the site server 100 for starting user authentication.

(2) The IC card holds reference to the shared workspace server 30 used by the user. The site server 100 connects to the shared workspace server 30 based on the reference. Alternatively, only the user name is held on the IC card and a global directory server (not shown) is installed for managing information concerning each user. The directory server may retain reference to the shared workspace server corresponding to the user.

(3) The site server 100 performs authentication of the user using the IC card for the shared workspace server 30 and logs in. To do this, the information recorded on the IC card may be read for performing authentication of the user for the shared workspace server 30 or the IC card may calculate a part of the authentication protocol message based on the public key cryptography for the shared workspace server 30.

(4) The shared workspace server 30 returns predetermined shared workspace as a response based on the authenticated user information. The shared workspace server 30 extracts necessary information for forming the GUI of the shared workspace based on the information on the specified shared workspace and transfers the extracted information to the site system 10. At this time, the shared workspace server 30 may assign priority using some or all of the following information to select initial shared workspace fitted for the user in addition to the user information:

Network information such as network address and host name of the site server 100;
position information indicating where the site server 100 is installed;
information such as a name of the shared workspace, file name and URL received from the site server 100;
user's schedule information and current time;
company user names; and
information indicating what shared workspaces were used in the past.

Figure 4:
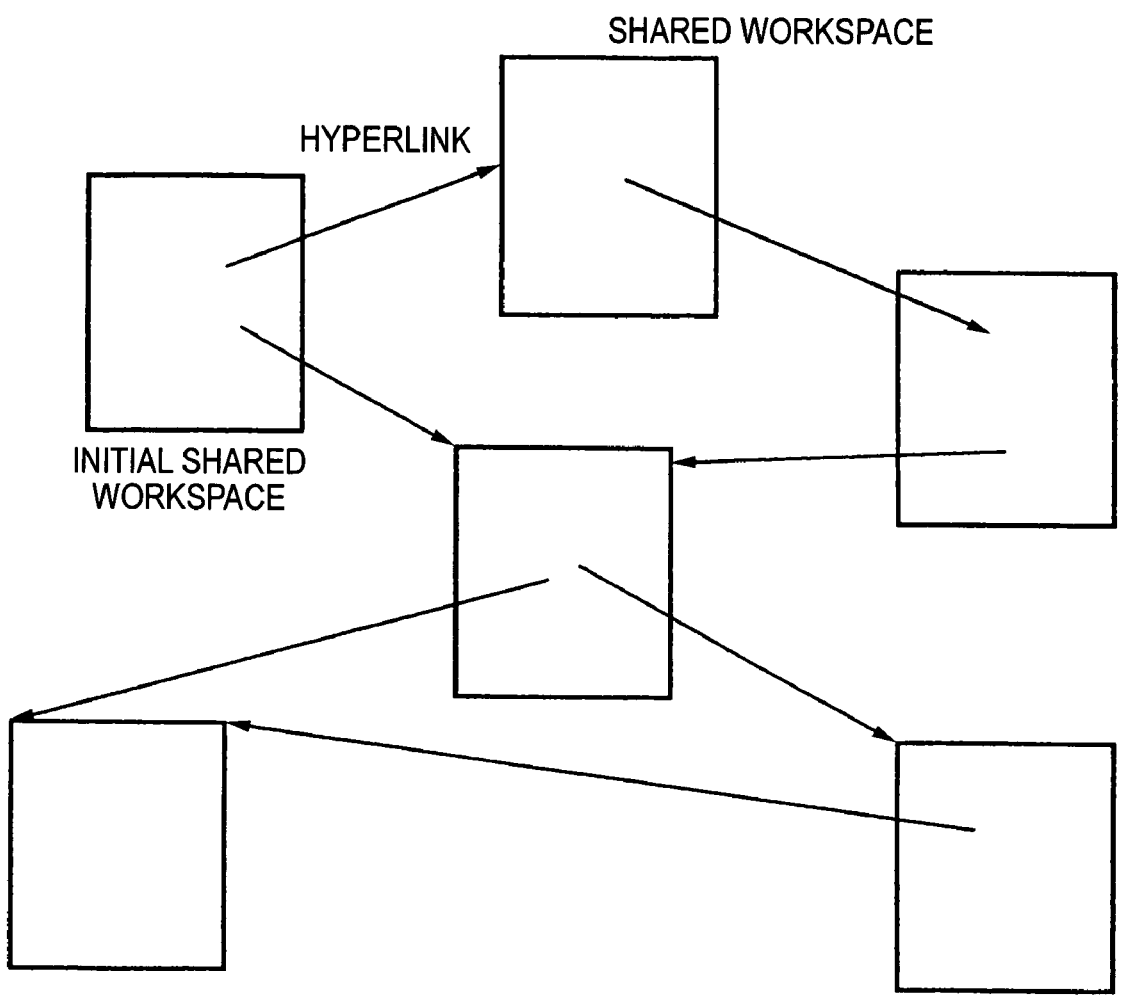
FIG. 4 is a drawing to schematically show how a plurality of shared workspaces are joined by hyperlink.

FIG. 4 schematically shows how a plurality of shared workspaces are joined by hyperlink.

To select the initial shared workspace, the shared workspace server 30 may assign priority to all shared workspaces or may assign priority only to a subset of the shared workspaces previously specified with a bookmark by the user.

To present a plurality of shared workspaces and request the user to select one of the shared workspaces, any, some, or all of the following may be used:

Use of navigation style in usual hypertext;
use of menu;
display of part or all of graph structure formed by shared workspaces (5) The user selects a node as required along the graph structure formed by a plurality of workspaces provided by the shared workspace server 30, thereby moving and selecting any desired shared workspace. At this time, to display a plurality of workspaces, color, size, shape, position, or their combination may be changed in response to the priority as described above for aiding in selecting any shared workspace by the user. This selection step may be skipped if the default shared workspace is the user-desired shared workspace.

(6) The GUI of shared workspace 1 is displayed on the electronic whiteboard 12 in the site system 10.

(7) Here, a first user in the site system 10 selects a first session among a plurality of sessions in the displayed shared workspace. Of course, only one session may exist in the shared workspace. According to this step, information concerning the site system 10 is registered in the first session.

(8) A second user in the site system 20 performs similar operation to that described above. According to this step, information concerning the site system 20 is registered in the first session.

(9) Upon detection of adding of the site system specifying the same session, the shared workspace server 30 requests all registered site systems to connect to any another site system. Consequently, immediate connection can be made with the associated person of cooperative work. In this case, any of the following may be used as the connection form of the site systems:

Hub type;
completely graph type; or
spanning tree type

(10) As the second user selects the same first session as the first user, screen sharing of the electronic whiteboards 12 and 22 in the site systems 10 and 20 is started. The first and second users can access necessary files required for the conference such as presentation materials through the electronic whiteboards 12 and 22. That is, the users can immediately take out the documents required for cooperative work.

(11) Screen sharing is conducted as input/output from/to the application is hooked.

(12) To conduct screen sharing, a mechanism for responding to input requests from a plurality of sites with changing the character or line color depending on which site the request is input from may be provided.

(13) A reference history to the files and resources created by the application started by screen sharing is retained in a first shared workspace (see FIG. 3).

The user connects the IC card storing the user ID and any other authentication information to the IC card authentication section 1003 connected to the conference room, whereby the user can log in to the system, as described above.

When the user logs in to the system, the presentation controller 1006 transmits the user ID information presented via the IC card to the directory service 1002 storing the user attributes and acquires the site information of the object retaining the user information (a pair of the server ID and the information object ID).

The metadata manager 1005 uses terminal information transmitted from the presentation controller 1006 and records the terminal ID, the user ID, and the use start time in association with each other.

The presentation controller 1006 transmits a request to the server through the network based on the server ID and requests the server to send the information (hypertext) associated with the user. The presentation controller 1006 displays the information based on the hypertext of the information returned from the server.

The user selects the file out of the information for starting the corresponding application for displaying a screen.

In the teleconference system according to the embodiment, a history of the activities of the user in the session such as creation of and reference to a file and reference to the resources through the electronic whiteboard, whereby the history can be later referenced for immediately passing the result of the cooperative work to the following step. That is, real-time cooperative work and non-real-time cooperative work can be associated with each other.

The registration process and the referencing process of a history of references to files and resources will be discussed hereinbelow.

Process of registering history in Recently Used:
A computer for providing a plurality of workspaces on the network is provided;
each user selects (a plurality) of workspaces on the electronic whiteboard or any other client terminal;
each user opens a file and retrieves and browses information on a web (or in any other wide-area information retrieval system);
references (URLs) concerning the opened file and the information browsing web page are stored in the client terminal of the user;
of the references stored in the client terminal of the user, those to be registered in the workspaces are selected; and
the selected references are transferred to all workspaces (or selected workspaces), and the received references are registered in the workspaces.

Process of referencing Recently Used:
Each user selects (a plurality) of workspaces on the electronic whiteboard or the client terminal;
each user sees the history of the workspaces on the electronic whiteboard or the client terminal;
a list of the workspaces sorted in "date order," "reference count order," "importance order," or the like is displayed on the electronic whiteboard or the screen of the client terminal;
at this time, the history of the workspaces is displayed in the format of "individual," "union," or "intersection;" and
each user can open a file and browse a web by selecting the reference out of the list.

Second Example of Operation

In a second example of operation which will be described hereinbelow, at a single site, user authentication is performed based on the IC card carried by each user, relevant shared workspaces are listed, and the user logs out using the IC card.

Figure 5:
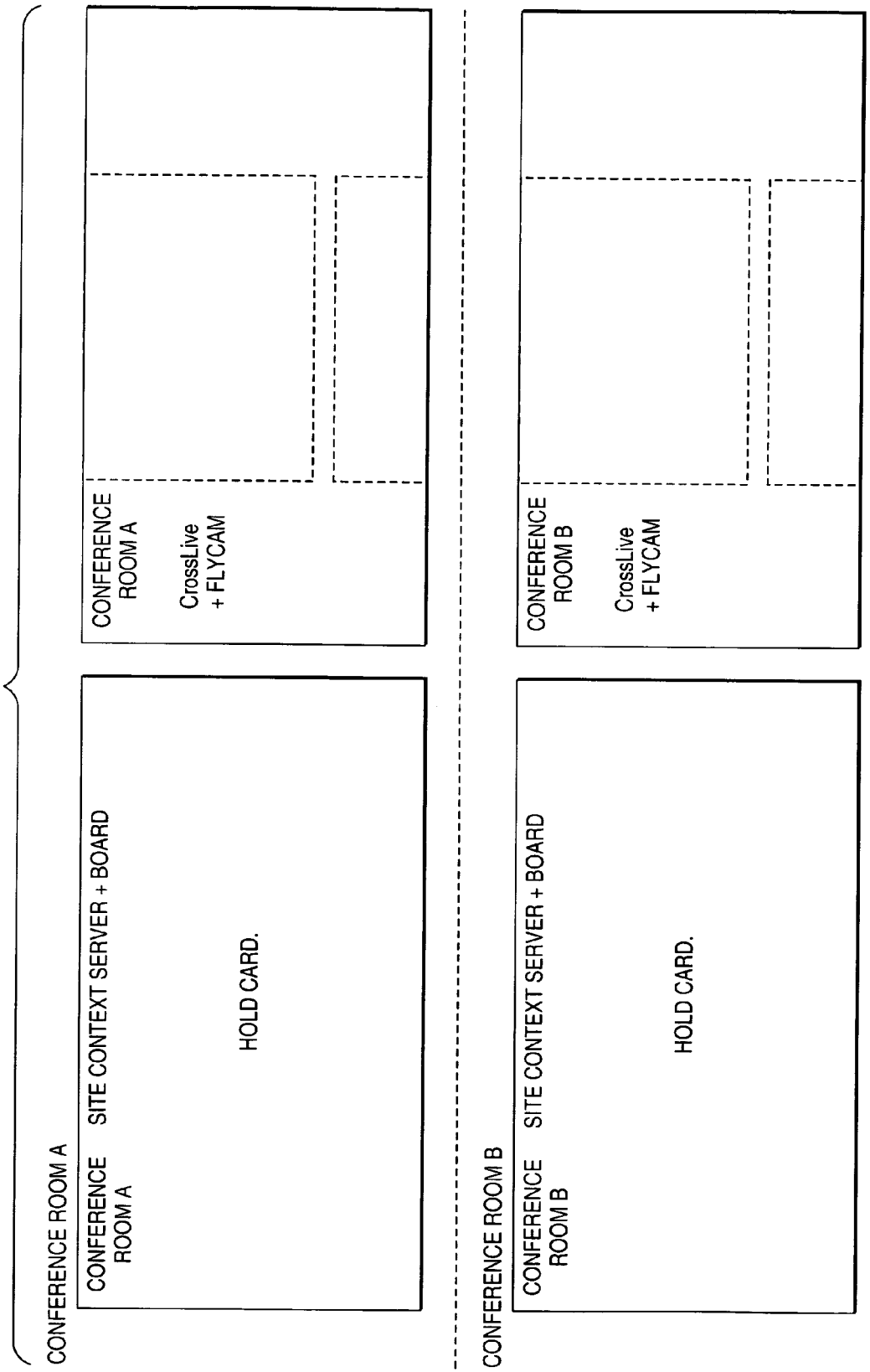
FIG. 5 is a drawing to show a screen display example of prompting the user to log in to the system using IC card.

(1) In the site systems 10 and 20, screens for prompting the user to log in to the system using the IC card are displayed as initial screens on the electronic whiteboards 12 and 22 (or the client terminals of the users) (see FIG. 5).

(2) The user in the site system 10 connects the IC card to the card reader 13 connected to the site server 100 for starting user authentication.

(3) The IC card holds reference to the shared workspace server 30 used by the user. The site server 100 connects to the shared workspace server 30 based on the reference. Alternatively, only the user name may be held on the IC card and a global directory server (not shown) may be installed for managing information concerning each user. In this case, the directory server retains reference to the shared workspace server corresponding to the user.

(4) The site server 100 performs authentication of the user using the IC card for the shared workspace server 30 specified by the IC card and logs in to the workspace. To do this, the information recorded on the IC card may be read for performing authentication of the user for the shared workspace server 30 or the IC card may calculate a part of the authentication protocol message based on the public key cryptography for the shared workspace server 30.

(5) The shared workspace server 30 retrieves a set of the shared workspaces relevant to the user based on the user information authenticated using the IC card, and transmits a list of the retrieval result to the site server 100.

Figure 6:
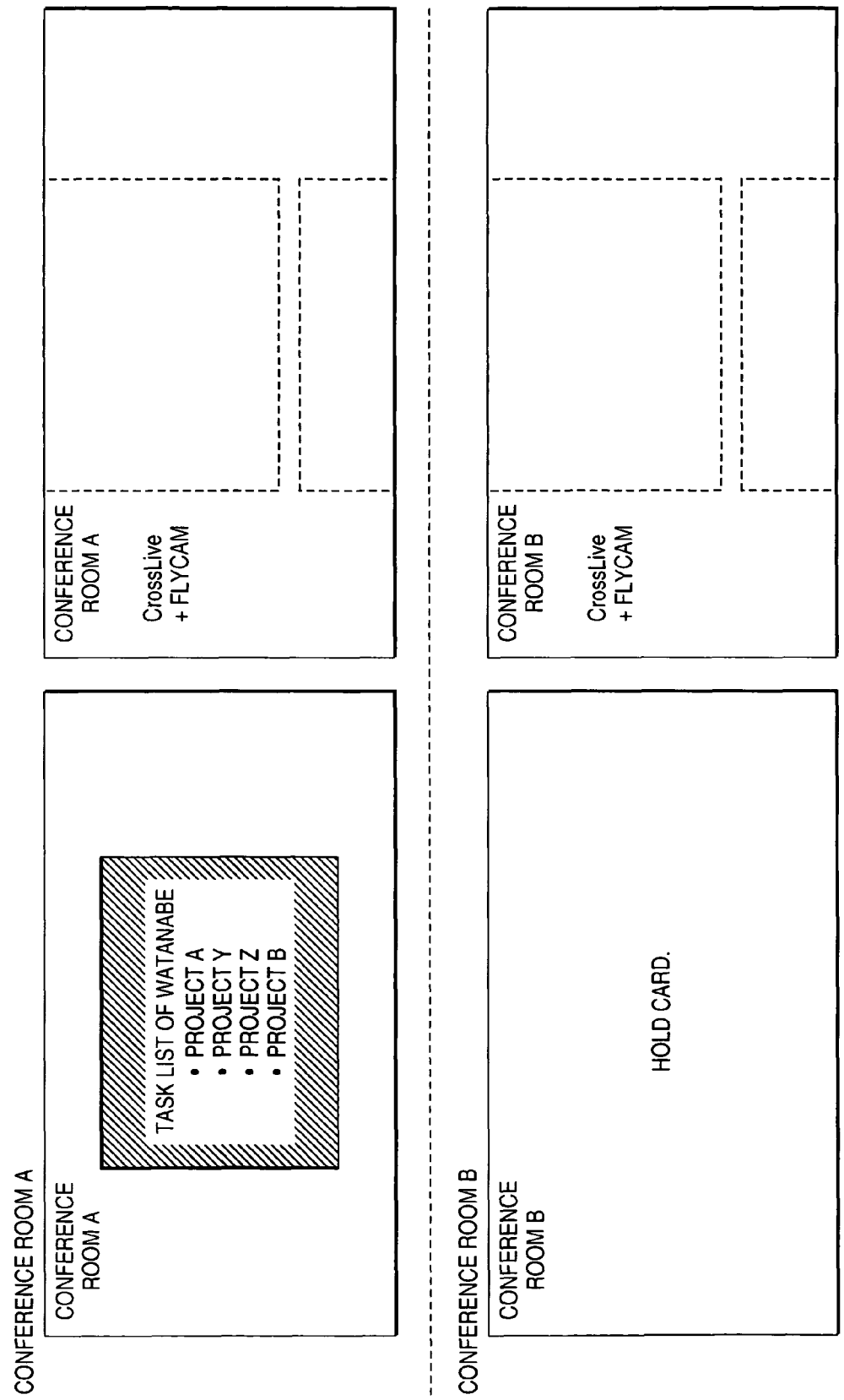
FIG. 6 is a drawing to show an example of listing a set of workspaces transmitted from the shared workspace server.

(6) The site server 100 displays the set of the workspaces transmitted from the shared workspace server 30 (in the screen, the workspace is represented as project) FIG. 6 shows an example of listing of the workspace set transmitted from the shared workspace server 30. In the example shown in the figure, a plurality of projects (workspaces) provided for Watanabe, one of the users, as a result of user authentication using the IC card are listed.

Figure 7:
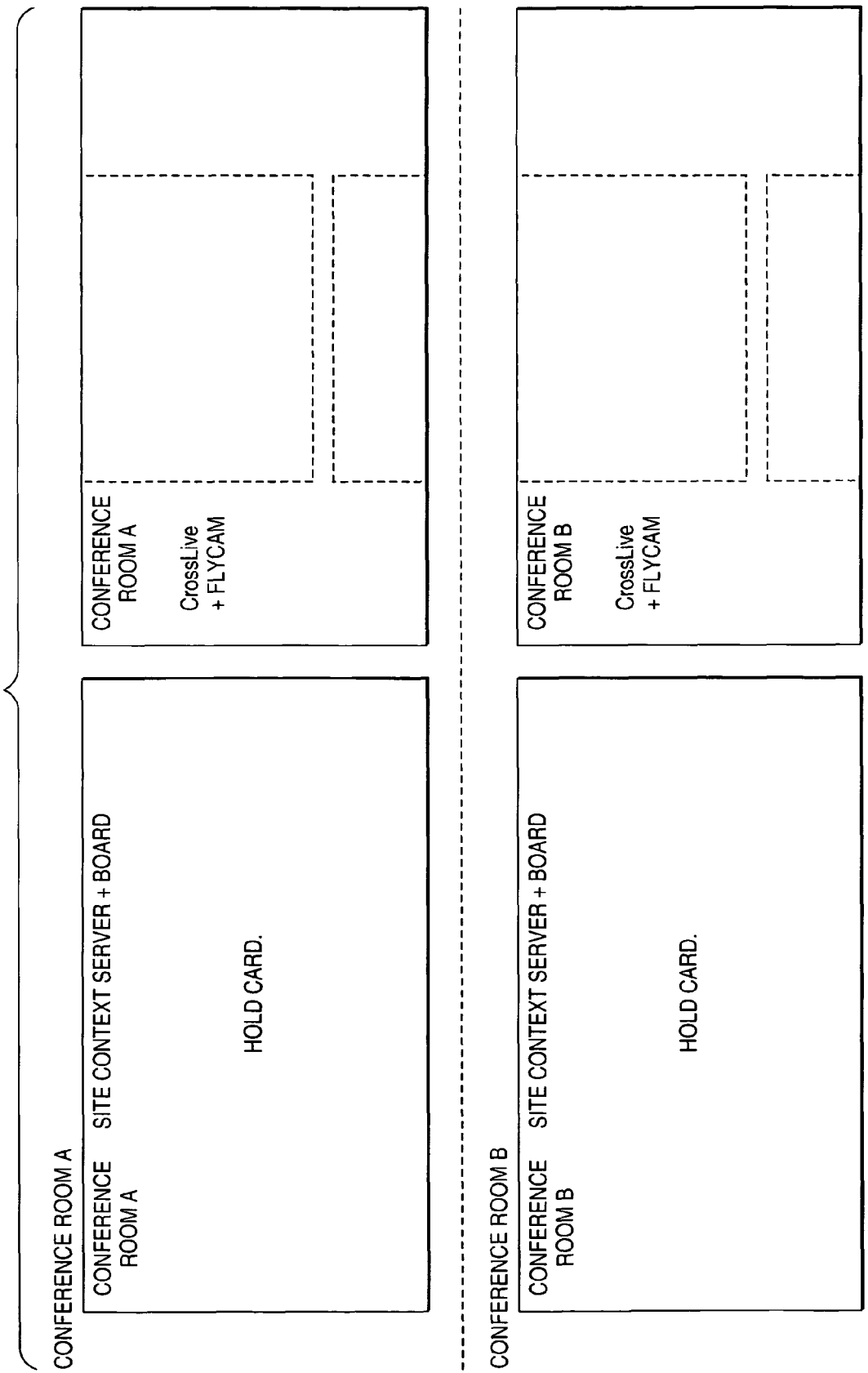
FIG. 7 is a drawing to show an example of connecting the IC card to the site server for entering a command to end the use of the system.

(7) To end the use of the system, the user can enter an end command using the GUI provided on the electronic whiteboard or the client terminal or can connect the IC card to the site system to enter an end command. FIG. 7 shows an example of connecting the IC card to the site server for entering a command to end the use of the system.

Third Example of Operation

Next, in a third example of operation which will be described hereinbelow, a plurality of IC cards are connected to the same site system, shared workspaces relevant to a plurality of users are displayed, and a file retained in the shared workspace or reference to a file is specified for starting application.

(1) In the site systems 10 and 20, screens for prompting the user to log in to the system using the IC card are displayed as initial screens on the electronic whiteboards 12 and 22 (or the client terminals of the users) (see FIG. 5).

(2) The user connects a second IC card to the site server 100 in the site system 10 for starting user authentication.

(3) The second IC card holds reference to the shared workspace server 30 used by the user. The site server 100 connects to the shared workspace server 30 based on the reference. Alternatively, only the user name may be held on the second IC card and a global directory server (not shown) may be installed for managing information concerning each user. The directory server retains reference to the shared workspace server corresponding to the user.

(4) The site server 100 performs authentication of the user using the second IC card for the shared workspace server 30 and logs in to the workspace. To do this, the information recorded on the second IC card may be read for performing authentication of the user for the shared workspace server 30 or the second IC card may calculate a part of the authentication protocol message based on the public key cryptography for the shared workspace server 30.

(5) The shared workspace server 30 retrieves a set of the shared workspaces relevant to the user based on the user information authenticated, and transmits a list of the retrieval result to the site server 100.

Figure 8:
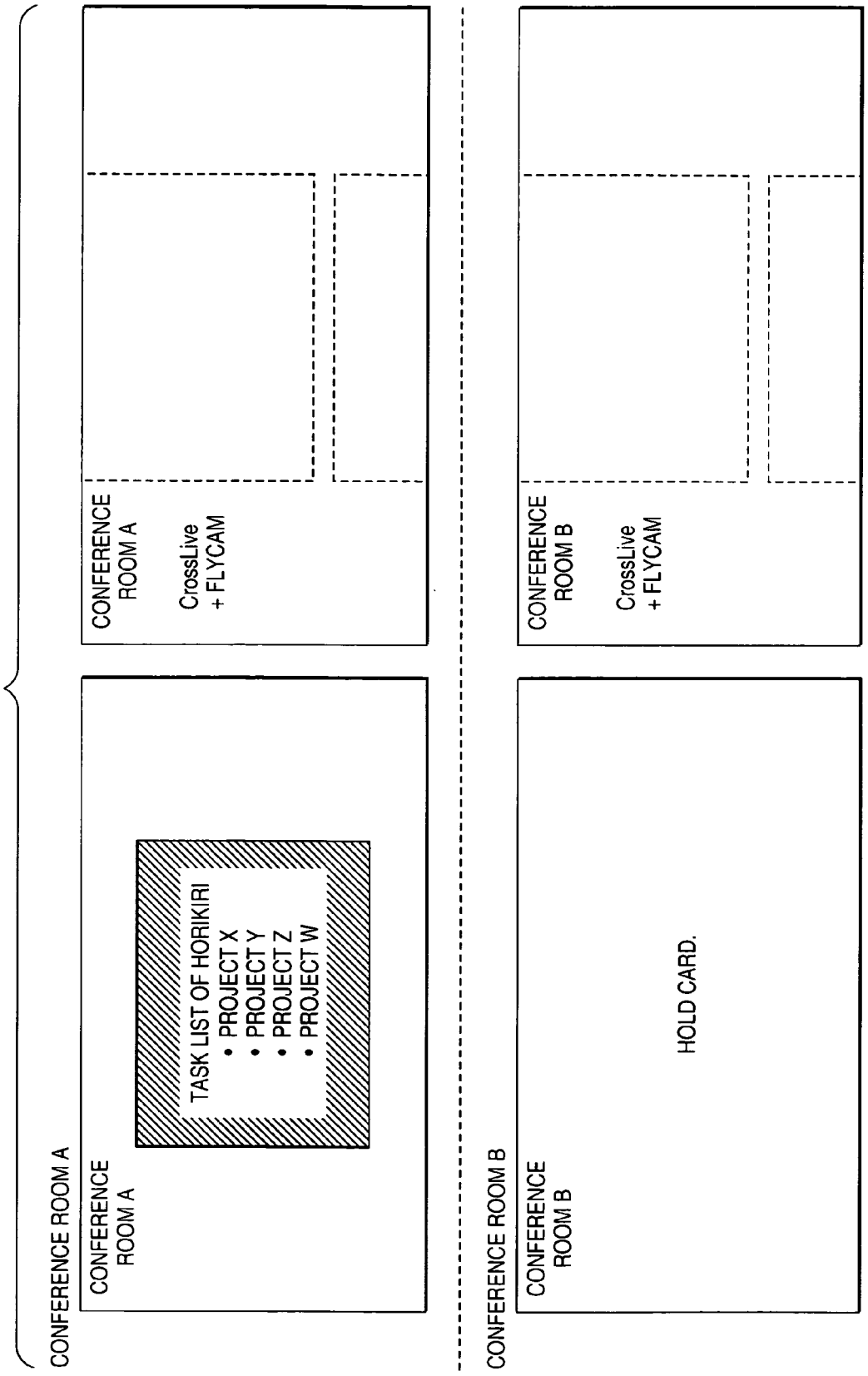
FIG. 8 is a drawing to show an example of listing a set of workspaces transmitted from the shared workspace server in the site server.

(6) The site server 100 displays the set of the workspaces transmitted from the shared workspace server 30 on the electronic whiteboard 12 (or the client terminal of the user). In FIG. 8, a plurality of projects (workspaces) provided for Mr. Horikiri, one of the users, as a result of user authentication using the IC card are listed.

(7) A different user connects a first IC card to the site server 100 in the site system 10 for starting user authentication.

(8) The first IC card holds reference to the shared workspace server 30 used by the user. The site server 100 connects to the shared workspace server 30 based on the reference. Alternatively, only the user name may be held on the first IC card and a global directory server (not shown) may be installed for managing information concerning each user.

(9) The site server 100 performs authentication of the user using the first IC card for the shared workspace server 30 and logs in.

(10) The shared workspace server 30 retrieves a set of the shared workspaces relevant to the user based on the user information authenticated, and performs operation on the set and the set retained for the site server 100 at present. The operation may contain a sum set, a product set, a difference set, a complementary set, and any combination thereof. In the embodiment, the shared workspaces relevant to the user authenticated by the first IC card is:

project A,
project Y,
project Z, and project B.

And the shared workspaces relevant to the user authenticated by the second IC card is:

project X,
project Y,
project Z, and
project W.

Therefore, in the embodiment, a product set of the above two product sets is retrieved, and the workspace set information as listed below is transmitted from the shared workspace server 30.

project Y
project Z

Figure 9:
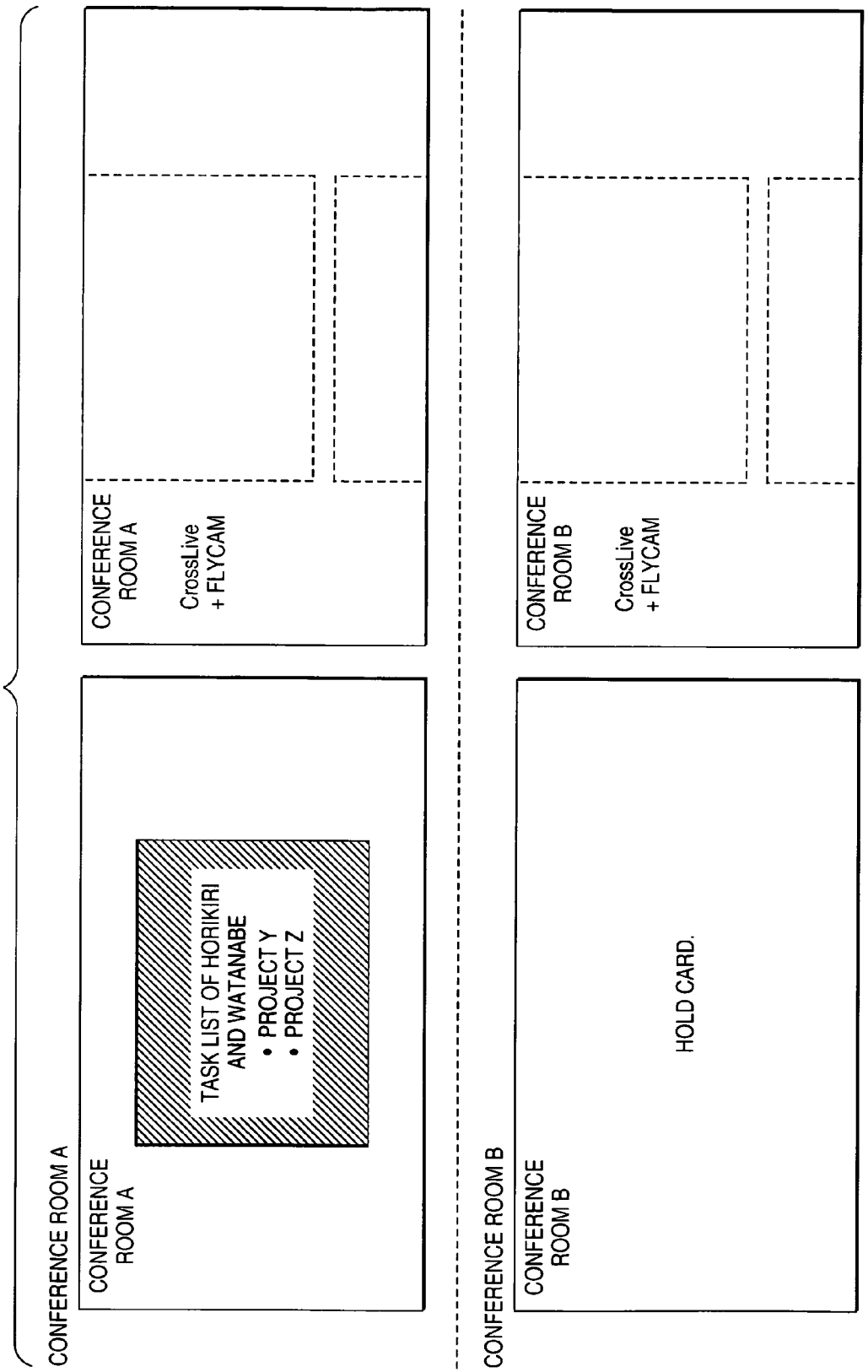
FIG. 9 is a drawing to show a screen example of listing a set of shared workspaces relevant to two users.

The site server 100 lists the received workspace set information on the electronic whiteboard 12 or the client terminal of the user. FIG. 9 shows a screen example of listing the set of the shared workspaces relevant to the two users. In the example shown in the figure, the set of the workspaces provided by the product set of the shared workspaces relevant to the users Mr. Watanabe and Mr. Horikiri.

(11) The user selects any desired shared workspace out of the listing produced by the site server 100. The site server 100 responds to the selection and requests the shared workspace server 30 to transmit information of selected shared workspace 1.

(12) The shared workspace server 30 transmits the information of selected shared workspace 1. Here, an example of transmitting a list of references to files retained in the shared workspace will be discussed. However, the shared workspace may retain sessions, references to any other shared workspace, and the like in addition to files and references to files (see FIG. 3).

Figure 10:
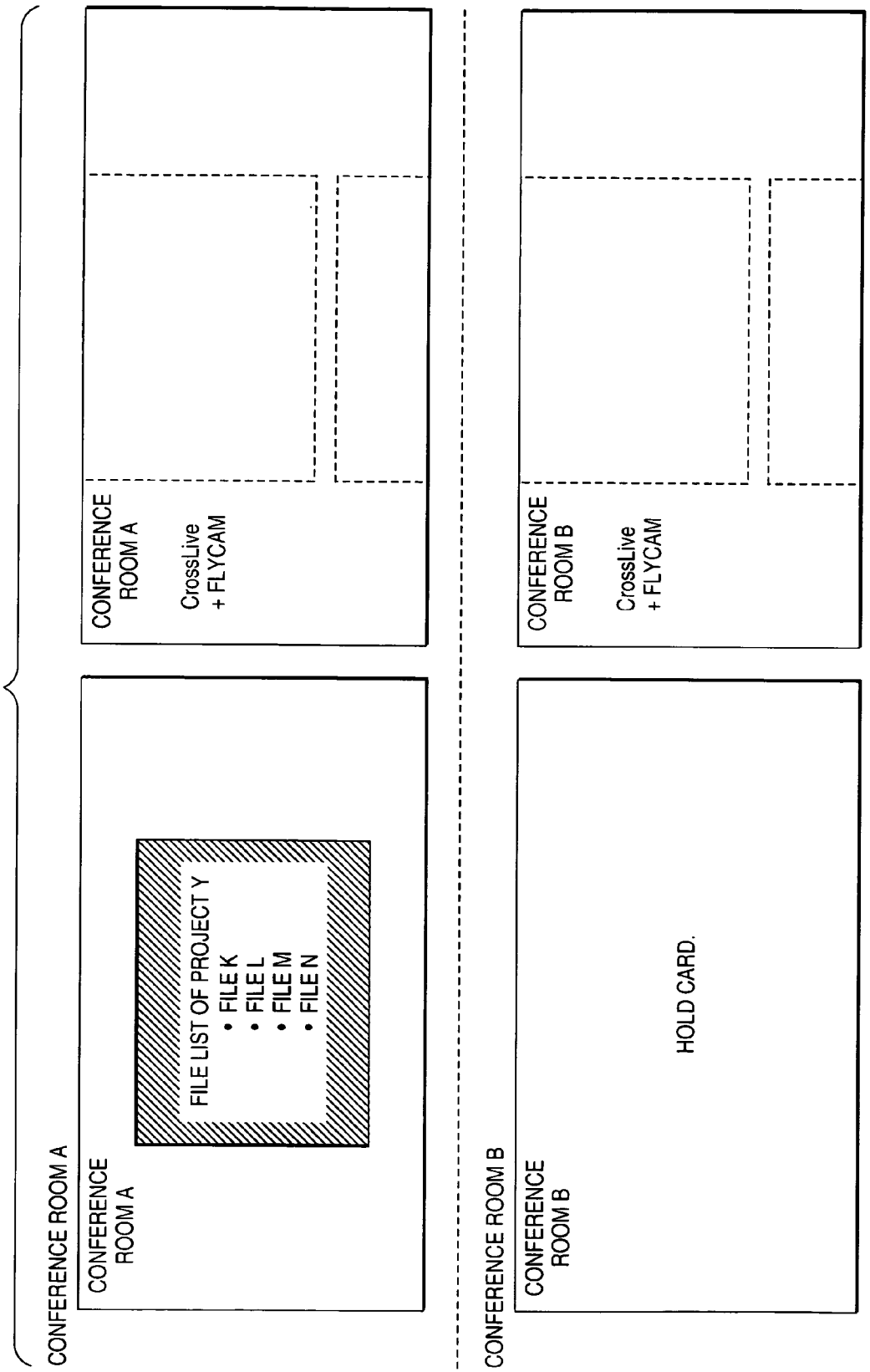
FIG. 10 is a drawing to show a screen display example of a file reference list retained in a shared workspace.

(13) Upon reception of the list of references to files as the information of shared workspace 1 from the shared workspace server 30, the site server 100 displays the list on the screen. FIG. 10 shows a screen display example of the file reference list (K to N) retained in the shared workspace (project Y).

(14) The user can select any desired file through the file reference list displayed the electronic whiteboard 12 or his or her client terminal. Here, assuming that the user selects file K, the site server 100 transmits a message indicating that the user selects file K to the shared workspace server 30.

(15) Upon reception of the message containing the reference to the file K transmitted from the site server 100, the shared workspace server 30 starts the application program associated with the file K.

Figure 11:
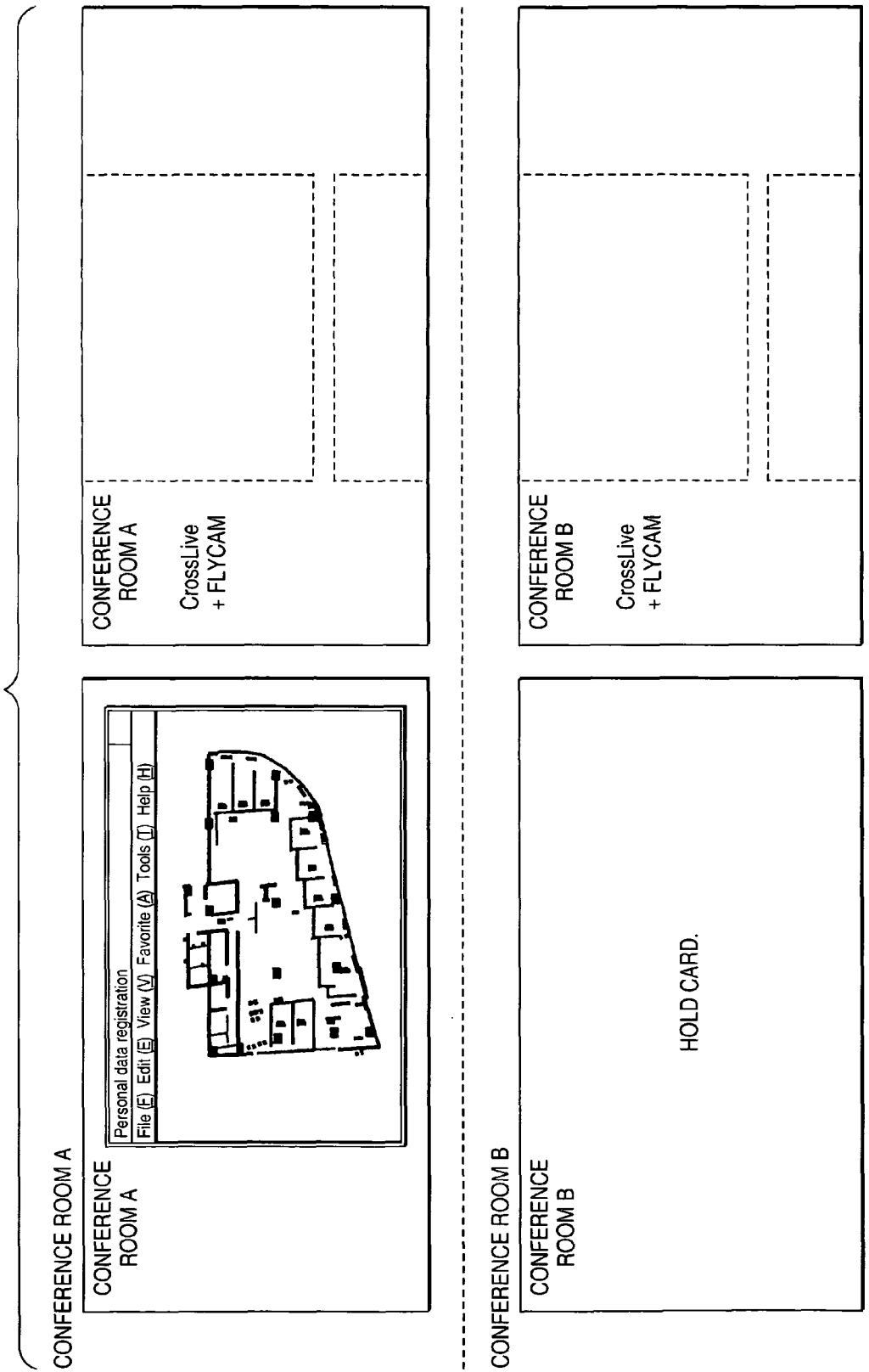
FIG. 11 is a drawing to show an example wherein an application associated with a selected file is started at a site and the file is displayed on an electronic whiteboard at the site.

(16) The shared workspace server 30 captures output of graphics performed by the started application program and transmits the output to the site server 100 as a message. The site server 100 performs graphic output on the electronic whiteboard 12 managed by the site server 100, thereby realizing application sharing in the site system 10. FIG. 11 shows an example wherein the application associated with the selected file at the site is started and the file is displayed on the electronic whiteboard at the site. In the example shown in the figure, the screen of the selected file K is displayed in conference room A.

Figure 12:
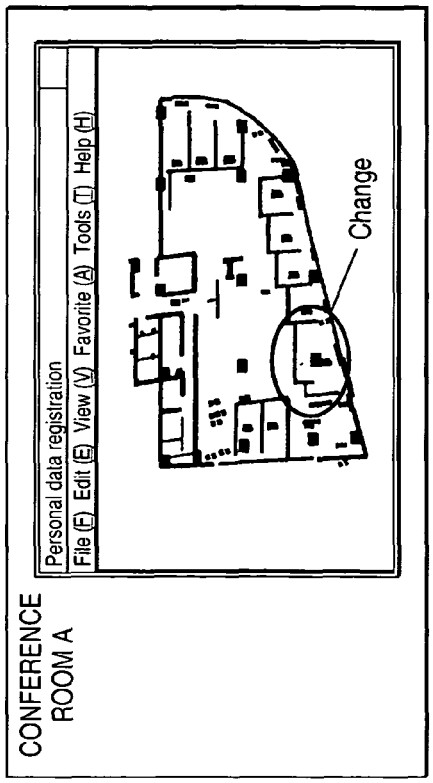
FIG. 12 is a drawing to show how a user performs screen input using a user input unit such as a pointing device or a keyboard on the electronic whiteboard (or the client terminal)

(17) The user can perform screen input using a user input unit such as a pointing device or a keyboard on the electronic whiteboard 12 (or the client terminal) (or extended user interface in the workspace of the conference room). The input performed by the user is transmitted from the site server 100 to the shared workspace server 30 as an input message, and is passed to the application operating in the shared workspace server 30. FIG. 12 shows how the user performs screen input using the user input unit such as the pointing device or the keyboard on the electronic whiteboard 12 (or the client terminal). In the example shown in the figure, an annotation is made on the display screen of the file K in conference room A.

Figure 13:
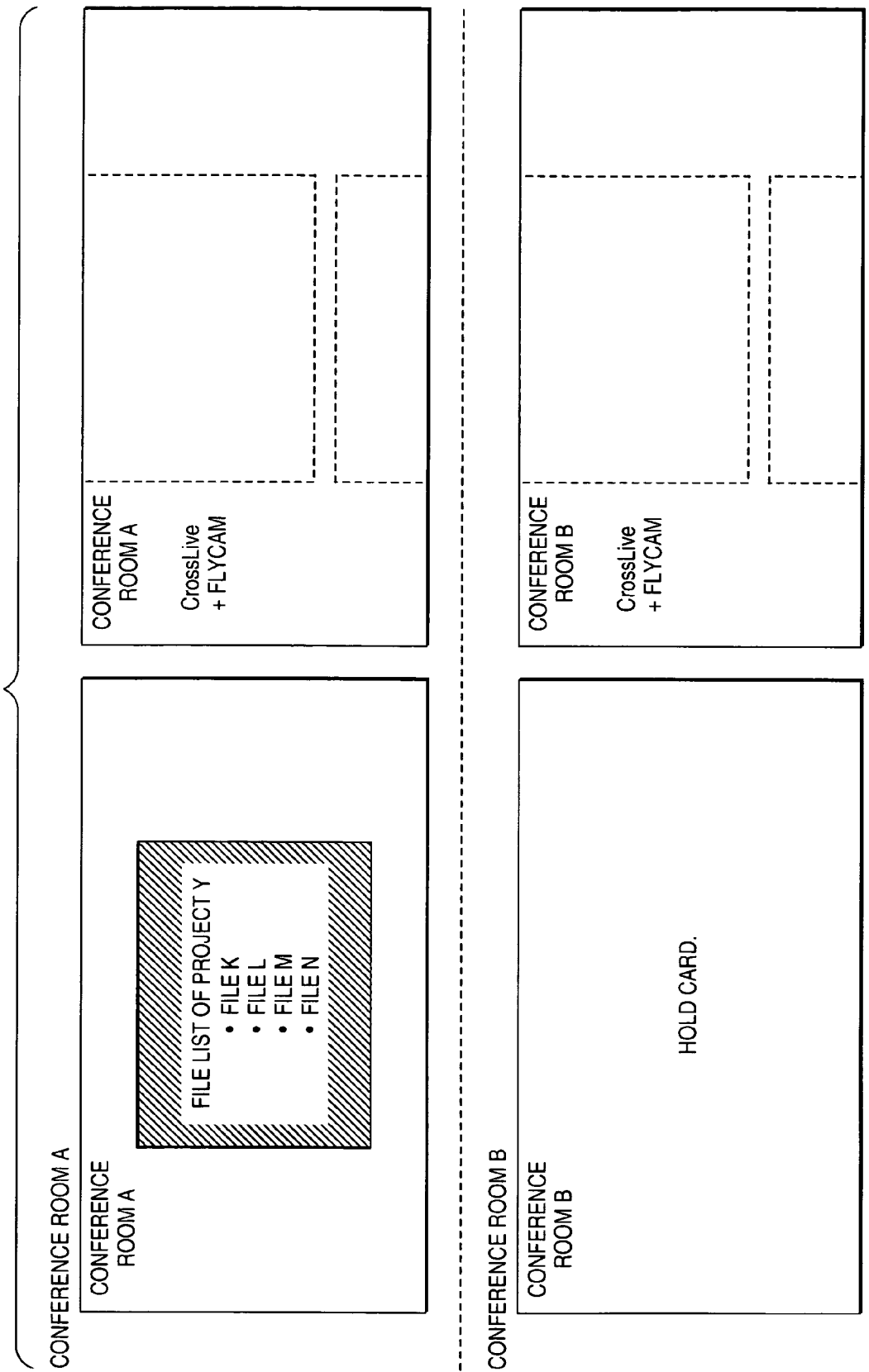
FIG. 13 is a drawing to show a display example of the electronic whiteboard as a result of terminating the operation of application in response to a user command.

(18) The user can use the user input unit on the electronic whiteboard 12 (or the client terminal) to give an end command to the application operating in the shared workspace server 30. The operation of the application operating in the shared workspace server 30 terminates in response to the end command. FIG. 13 shows a display example of the electronic whiteboard 12 as a result of terminating the operation of the application in response to the user command. In the example shown in the figure, in conference room A, the screen is returned to the screen displaying the file reference list retained in the shared workspace (project Y) as a result of giving the end command of the application associated with the file K.

Figure 14:
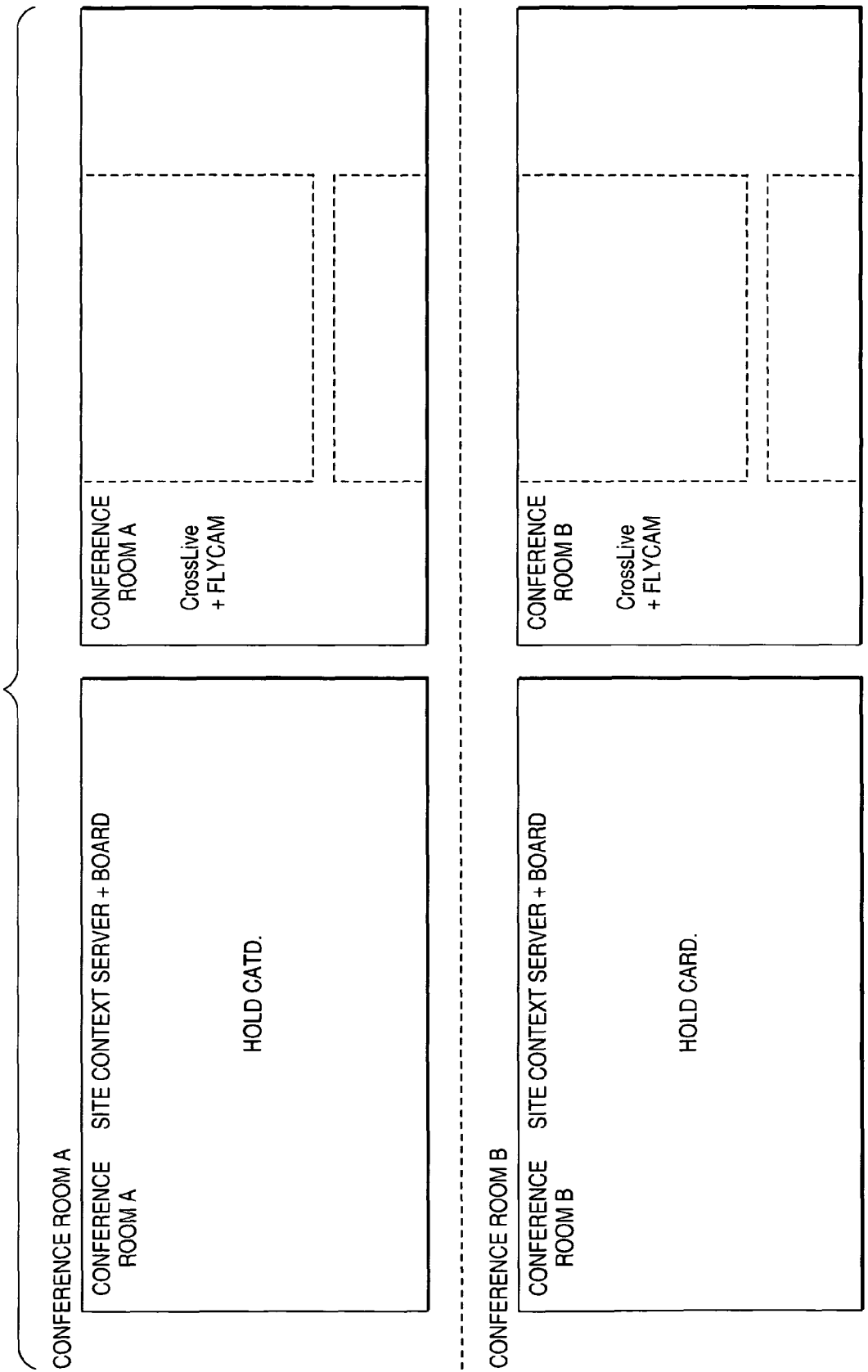
FIG. 14 is a drawing to show a screen display example of the electronic whiteboard when the user terminates the use of the system by connecting the IC card to the site server.

(19) Further, to end the use of the teleconference system, the user may enter an end command through the GUI provided on the electronic whiteboard 12 (or the client terminal) or may enter an end command by connecting the IC card to the site system. FIG. 14 shows a screen display example of the electronic whiteboard 12 when the user terminates the use of the system by connecting the IC card to the site server 100.

The case where the shared workspace is used from conference room A corresponding to the site system 10 has been described; of course, however, the shared workspace can also be accessed in a similar manner from any other site.

Figure 15:
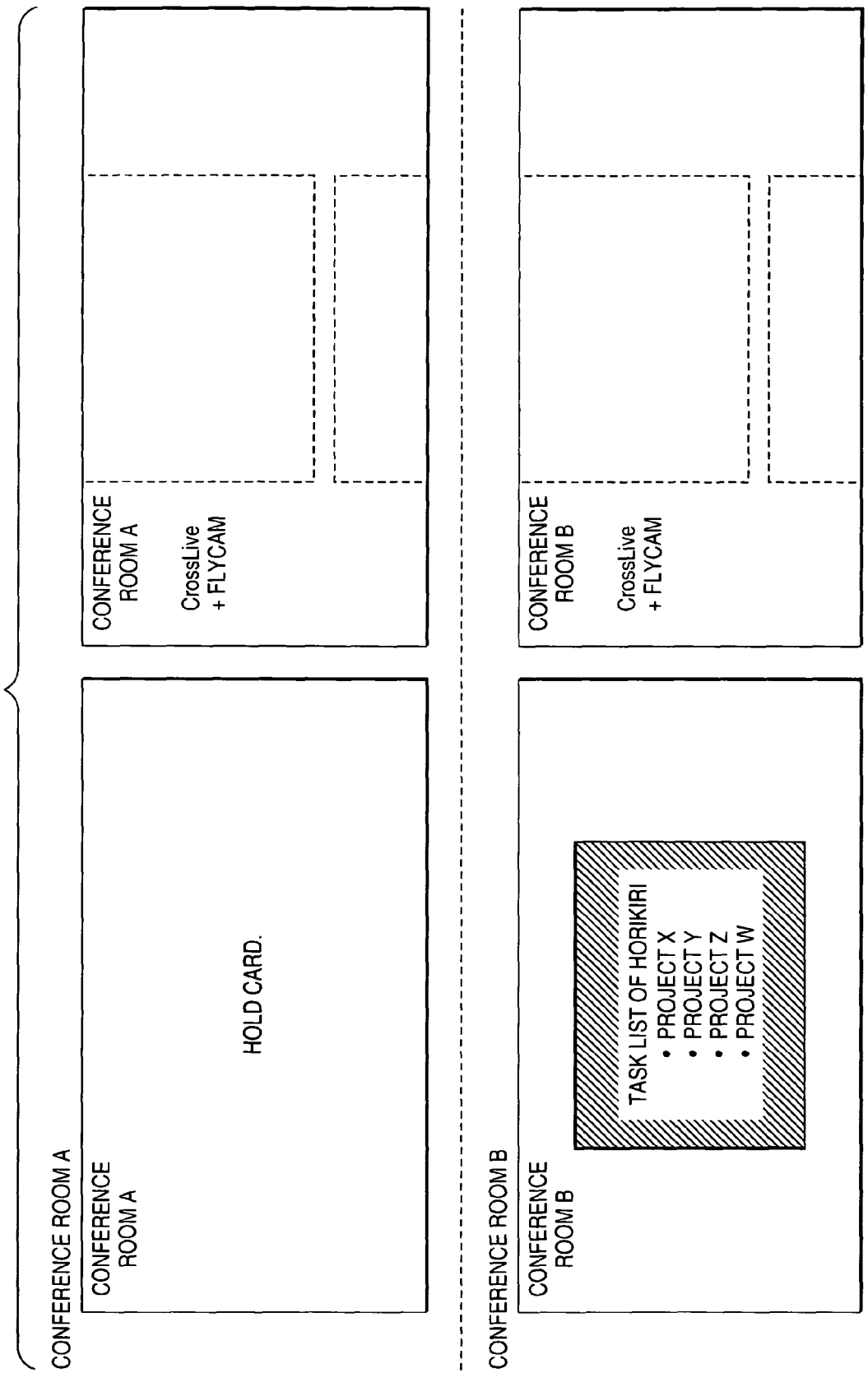
FIG. 15 is a drawing to show an example wherein the user connects the IC card to a site server, authentication processing is performed, and relevant shared workspaces (projects) are listed on an electronic whiteboard in conference room B corresponding to a site system.

FIG. 15 shows an example wherein the user connects the IC card to the site server 200, authentication processing is performed, and relevant shared workspaces (projects) are listed on the electronic whiteboard 22 in conference room B corresponding to the site system 20.

Figure 16:
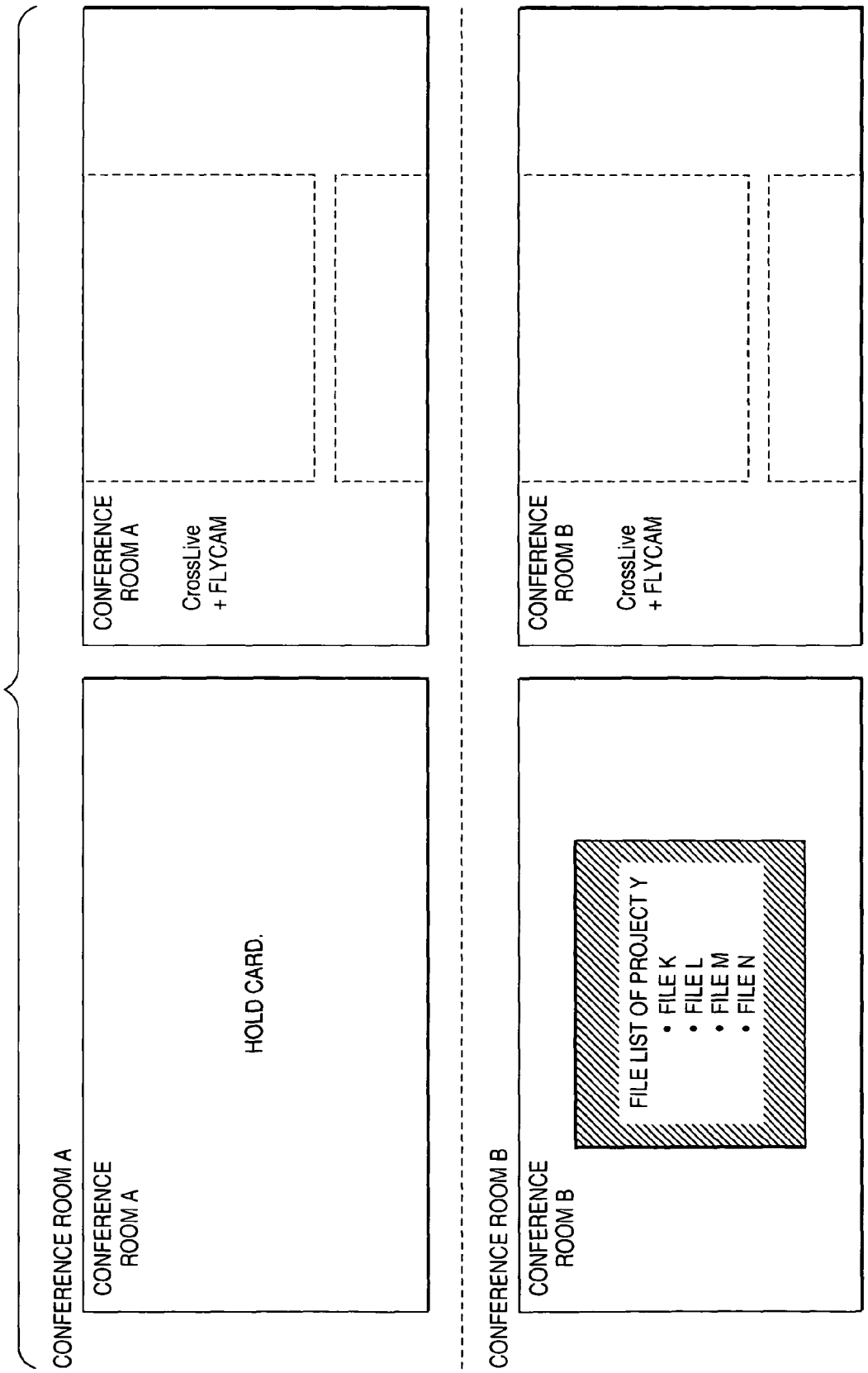
FIG. 16 is a drawing to show an example wherein references to files contained in project Y are listed as a result of the user selecting project Y on the electronic whiteboard in conference room B.

FIG. 16 shows an example wherein references to files contained in project Y are listed as a result of the user selecting project Y on the electronic whiteboard 22 in conference room B.

Figure 17:
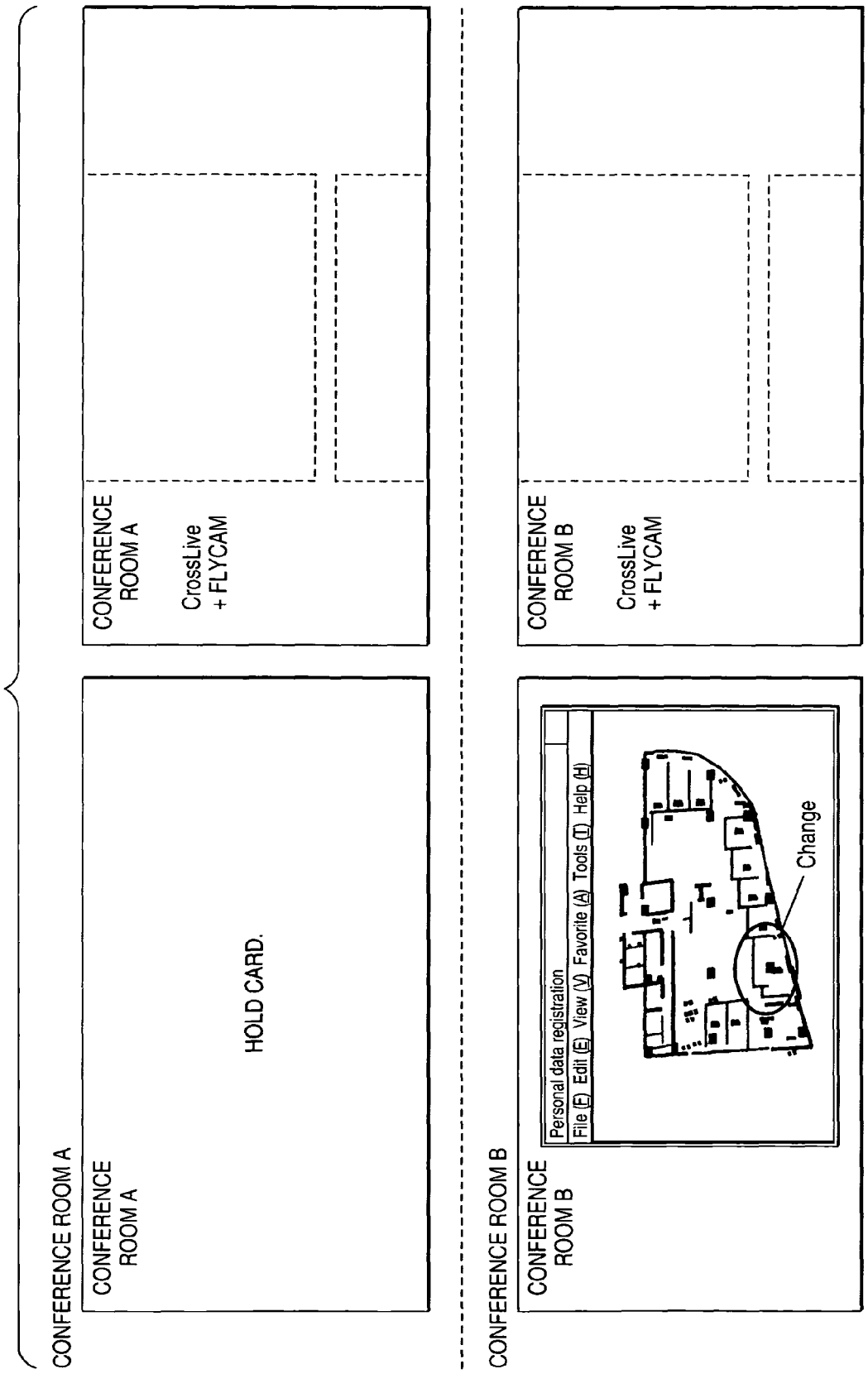
FIG. 17 is a drawing to show an example wherein the application associated with file K is started in the shared workspace server and performs graphic output on the electronic whiteboard as a result of the user selecting file K on the electronic whiteboard in conference room B.

FIG. 17 shows an example wherein the application associated with file K is started in the shared workspace server 30 and performs graphic output on the electronic whiteboard 22 as a result of the user selecting file K on the electronic whiteboard 22 in conference room B.

Figure 18:
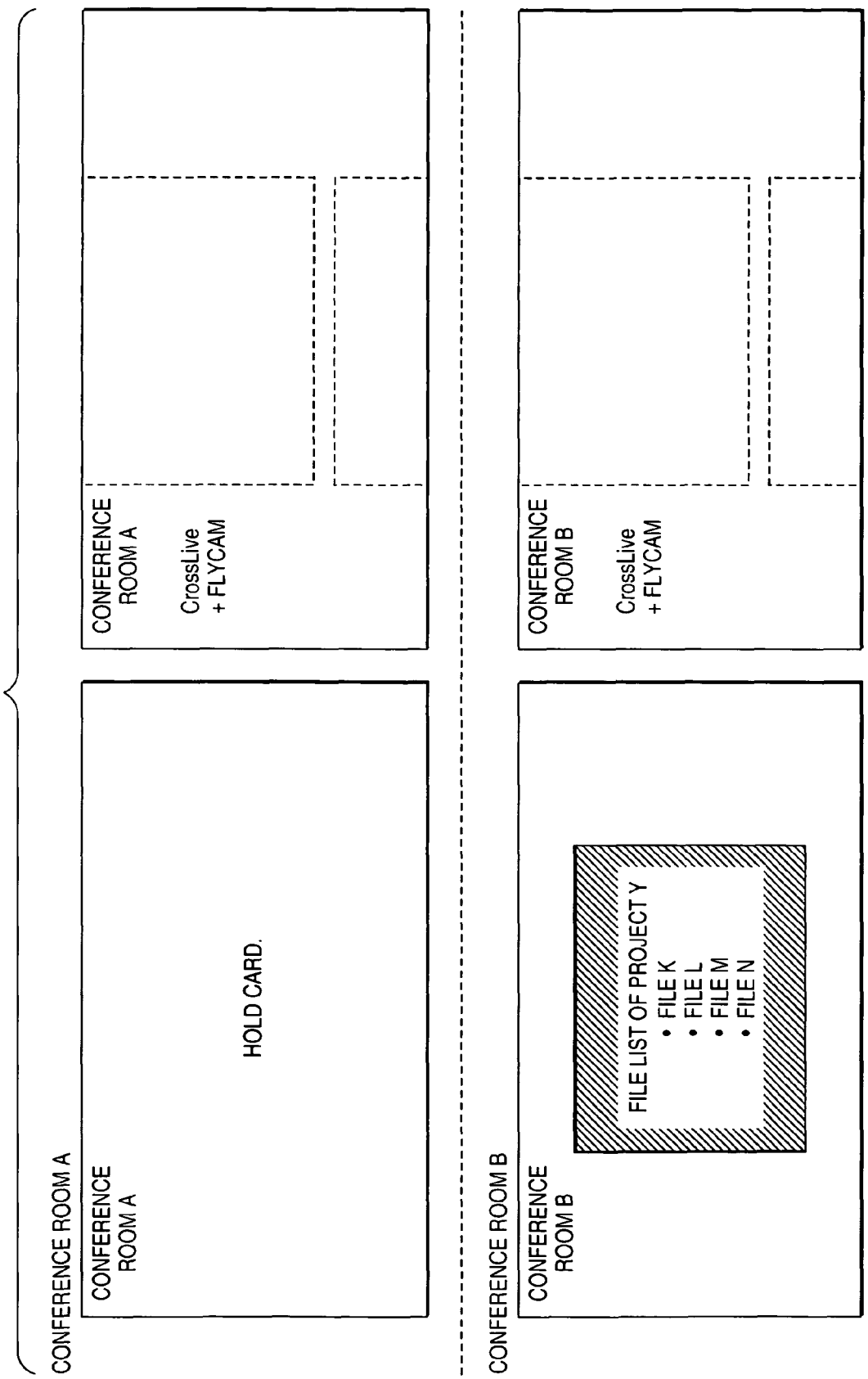
FIG. 18 is a drawing to show an example wherein the display is returned to listing of references to files contained in the project as a result of the user giving an application end command on the electronic whiteboard in conference room B.

FIG. 18 shows an example wherein the display is returned to listing of references to files contained in the project as a result of the user giving an application end command on the electronic whiteboard 22 in conference room B.

Figure 19:
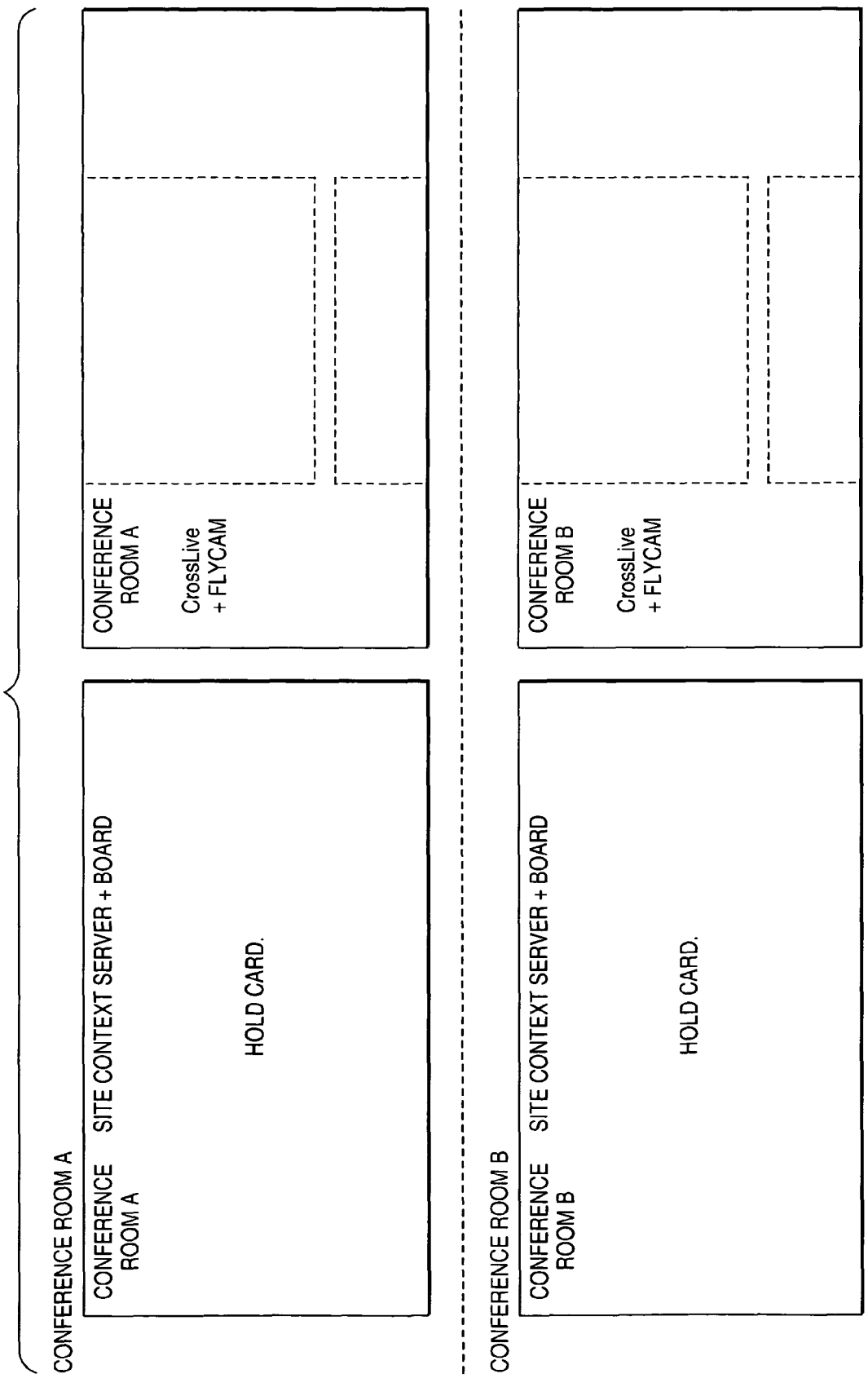
FIG. 19 is a drawing to show how the user connects the IC card in conference room B for terminating the use of the workspace.

FIG. 19 shows how the user connects the IC card in conference room B for terminating the use of the workspace.

Fourth Example of Operation

Next, in a fourth example of operation which will be described below, as the same shared workspace is specified in the site systems 10 and 20, the electronic whiteboards 12 and 22, the components of the site systems 10 and 20, are connected and the video and audio servers 11 and 21, the components of the site systems 10 and 20, are connected.

(1) In the operation example, only one session is managed in each shared workspace and a plurality of site systems select the same shared workspace, whereby the site systems are connected and the session is started.

Although not described below in detail, a scheme in which the same shared workspace is specified and then a session start command is given, whereby the site systems are connected and the session is started may be used rather than the scheme in which at the same time as the same shared workspace is selected, the site systems are connected and the session is started.

Figure 20:
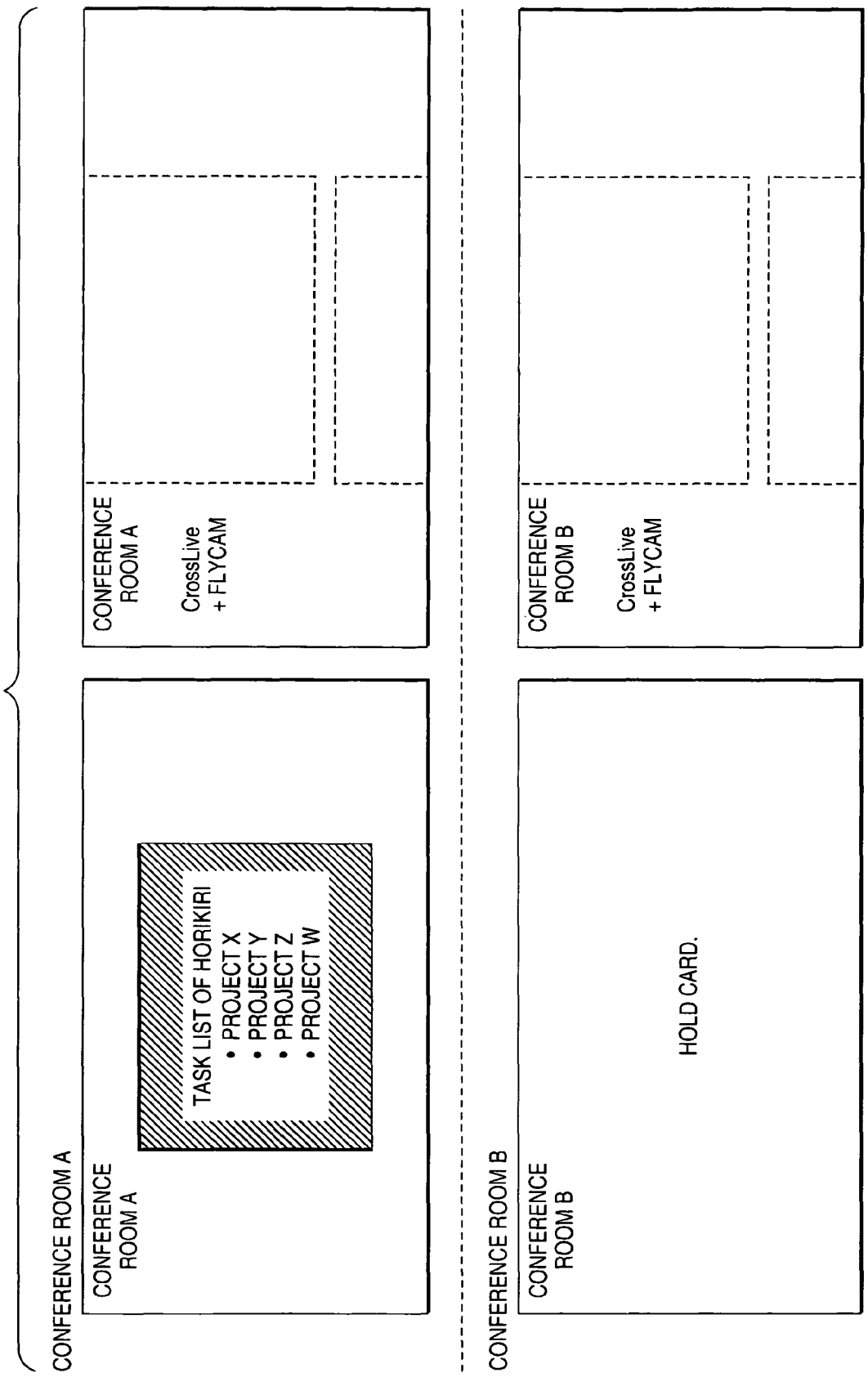
FIG. 20 is a drawing to show how as the user connects IC card to the site server in the site system, the shared workspaces relevant to the user are listed on the display in the site system.

(1) As the user connects the first IC card to the site server 100 in the site system 10, the shared workspaces relevant to the user are listed on the display (electronic whiteboard 12) in the site system 10 (see FIG. 20).

(2) Here, it is assumed that the user selects shared workspace 1 named "project X" from among the shared workspaces displayed on the electronic whiteboard 12.

(3) The site system 10 transmits the reference to the shared workspace 1 selected by the user to the shared workspace server 30.

(4) The shared workspace server 30 transmits a list of the references to the files retained in the shared workspace 1 to the site server 100. The shared workspace server 30 retains the network address of the site server 100 to make it possible to connect the site systems selecting project X of the shared workspace 1.

Figure 21:
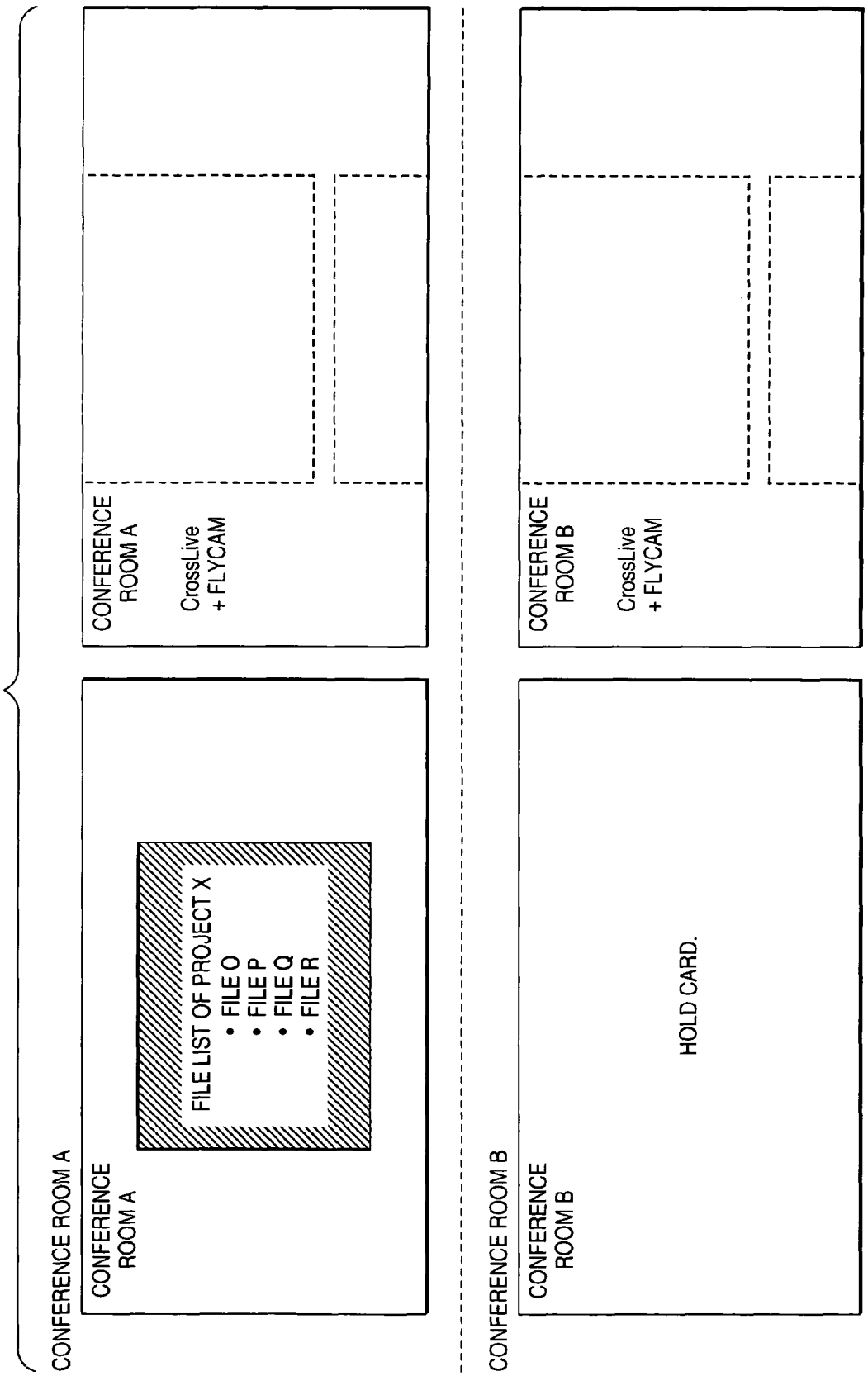
FIG. 21 is a drawing to show how a list of references to files contained in project X is displayed on the electronic whiteboard.

(5) The site server 100 displays the received file reference list on the electronic whiteboard 12 (see FIG. 21).

Figure 22:
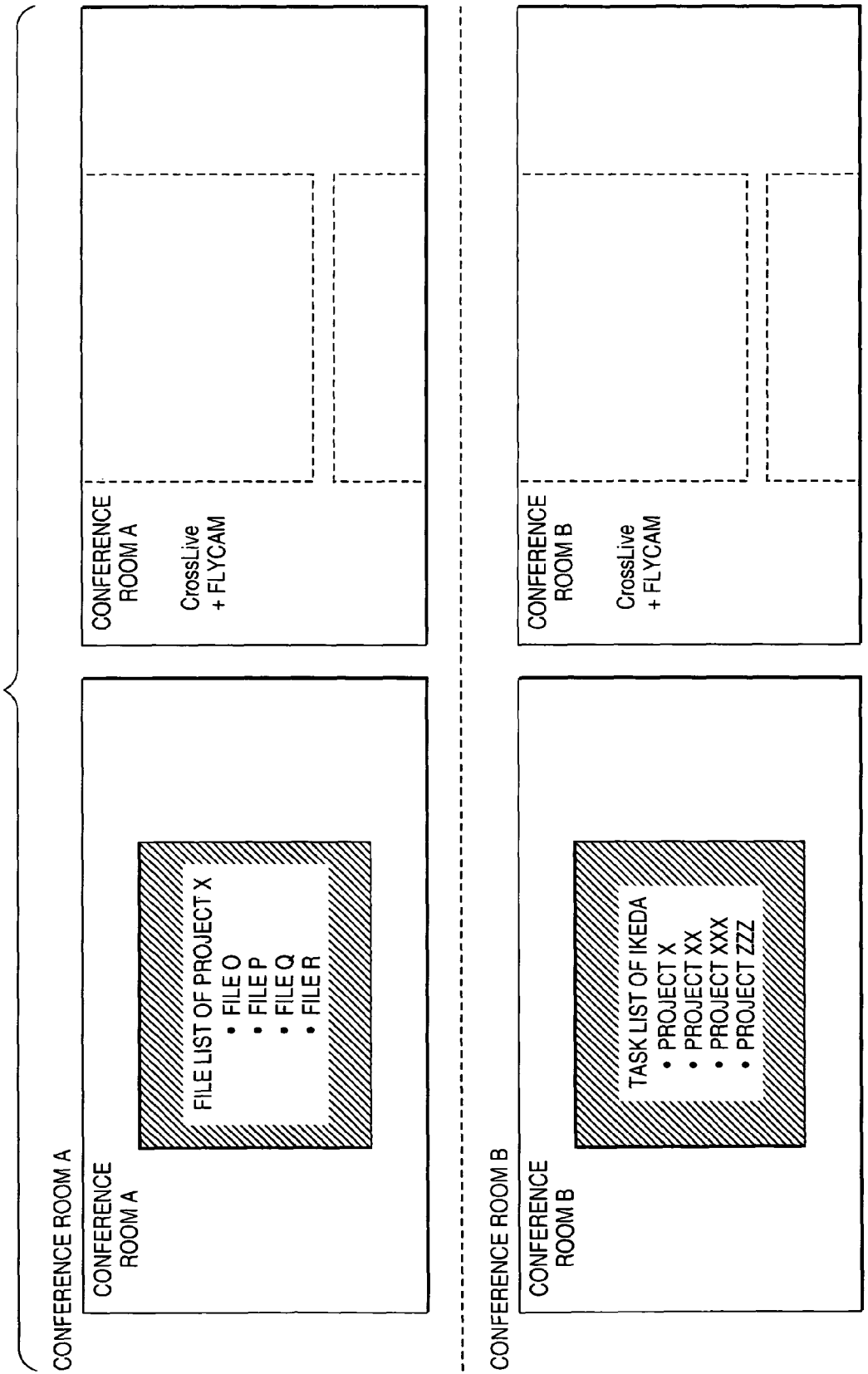
FIG. 22 is a drawing to show how as a different user connects IC card to the site server in the site system, the shared workspaces relevant to the user are listed on the display in the site system.

(6) As a different user connects the second IC card to the site server 200 in the site system 20 corresponding to conference room B, the shared workspaces relevant to the user are listed on the display (electronic whiteboard 22) in the site system 20 (see FIG. 22).

(7) Here, it is assumed that the user in conference room B selects shared workspace 2 named "project X" from among the shared workspaces displayed on the electronic whiteboard 22.

(8) The shared workspace server 30 transmits a list of the references to the files retained in the shared workspace 1 to the site server 200 in response to the selection operation. The shared workspace server 30 retains the network address of the site server 200 to make it possible to connect the site systems selecting project X of the shared workspace 1.

(9) According to the described procedure, the number of the site servers selecting the same shared workspace becomes two or more. Thus, the shared workspace server 30 requests every registered site server to connect to any other site server. More particularly, the shared workspace server 30 requests the site server 100 to connect to the site server 200 and requests the site server 200 to connect to the site server 100.

(10) The site server 100 and the site server 200 issue requests for connecting the video and audio servers to each other and connect the electronic whiteboards 12 and 22 to the shared workspace server 30 to start sharing input/output to/from application.

(11) In the embodiment, the site systems 10 and 20 hold the video and audio servers 11 and 21 respectively. The site server 100 requests the video and audio server 11 to receive video and audio from the video and audio server 21. Likewise, the site server 200 requests the video and audio server 21 to receive video and audio from the video and audio server 11.

Figure 23:
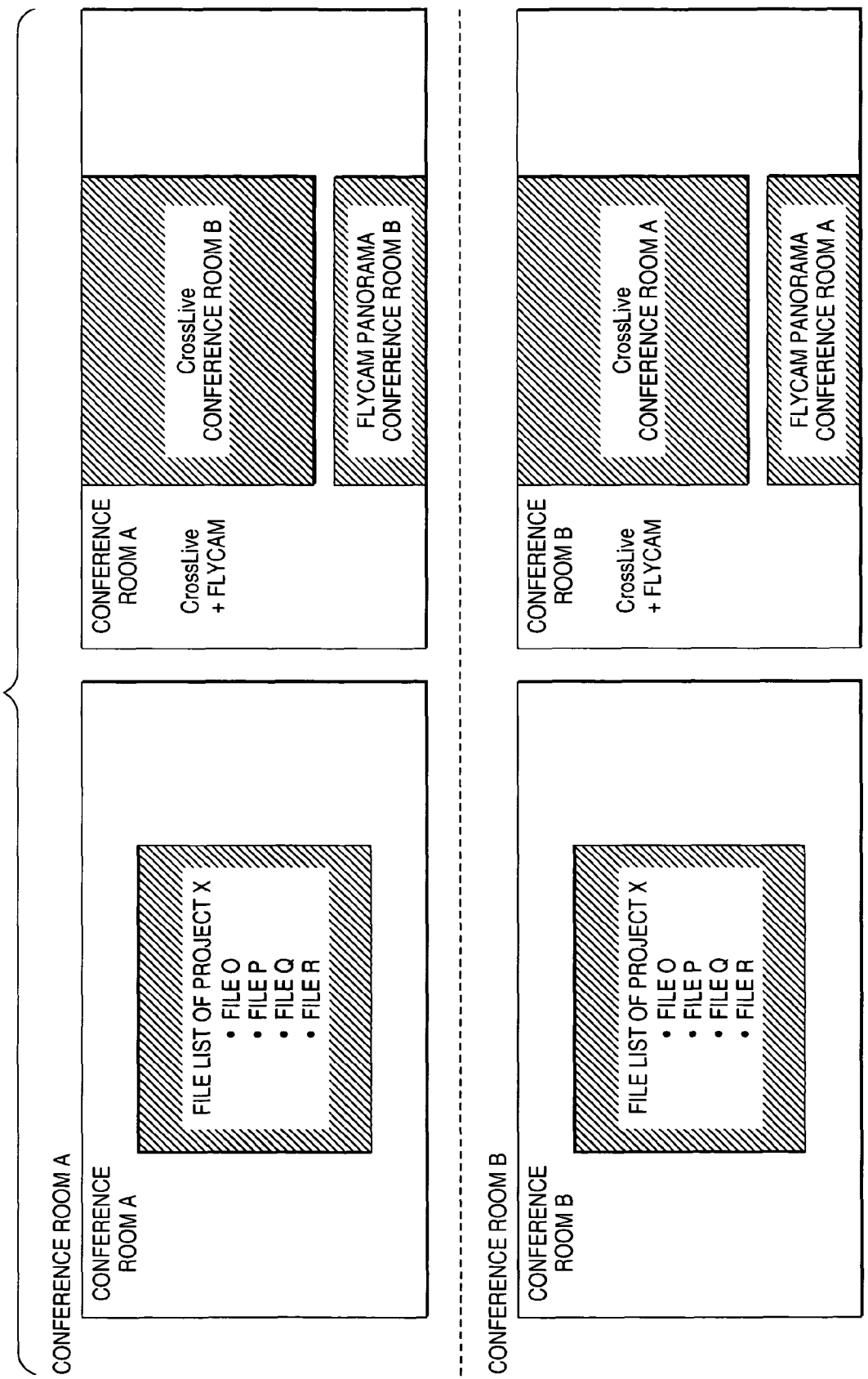
FIG. 23 is a drawing to show how the video and audio data received from the associated video and audio server is displayed on the electronic whiteboards.

(12) The video and audio server 11 starts to receive video and audio from the video and audio server 21, and the video and audio server 21 starts to receive video and audio from the video and audio server 11. FIG. 23 shows how the video and audio data received from the associated video and audio server is displayed on the electronic whiteboards 12 and 22.

(13) Here, it is assumed that the user selects file P through the graphical user interface presented on the electronic whiteboard 12 in the site system 10. The shared workspace server 30 starts the application associated with the file in response to the selection operation.

(14) The shared workspace server 30 transfers screen display performed by the application to the electronic whiteboards 12 and 22 in the site systems 10 and 20.

Figure 24:
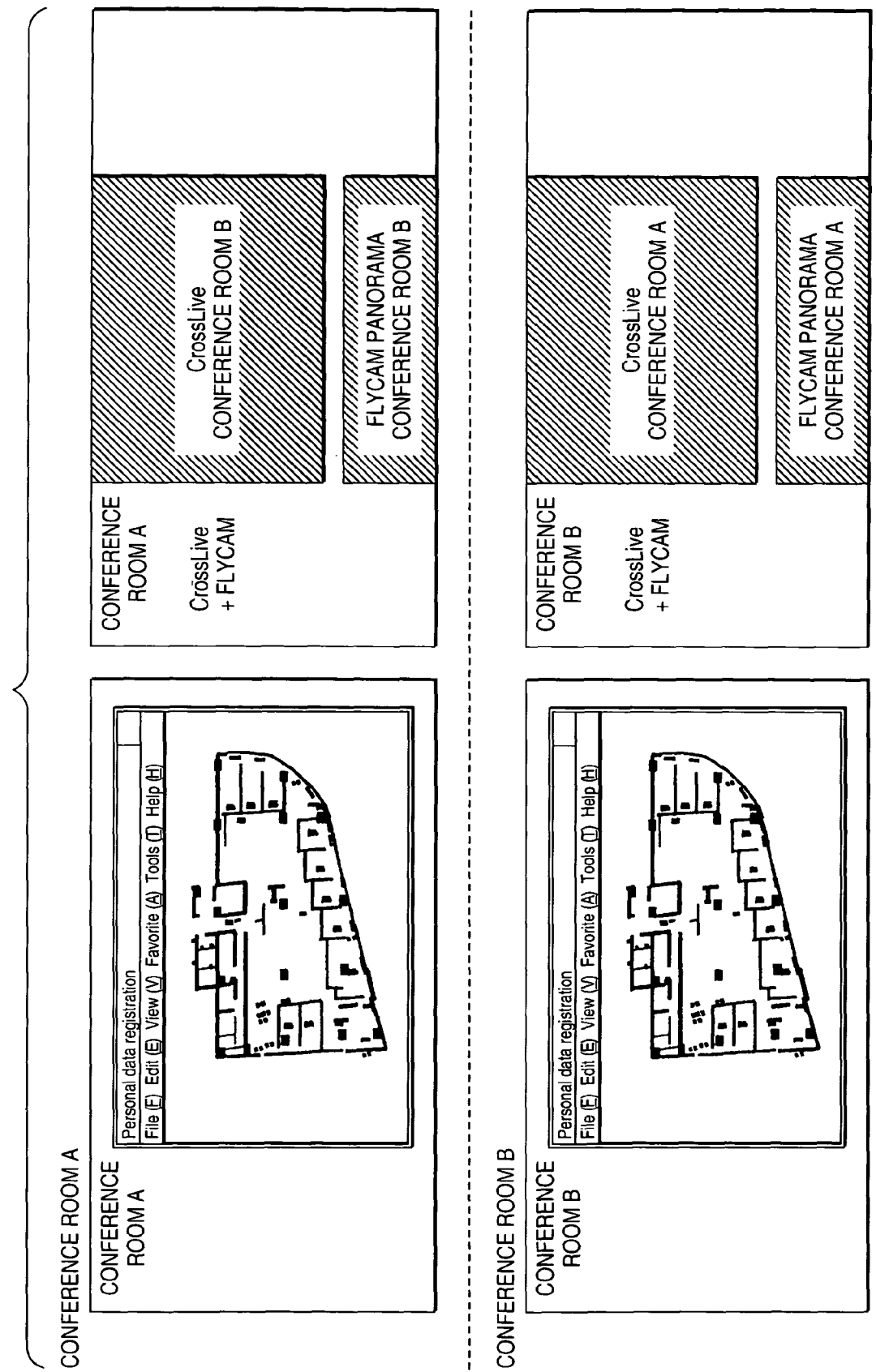
FIG. 24 is a drawing to show how information of screen display received from the shared workspace server is displayed on the electronic whiteboards in the site systems.

(15) The application screen is displayed on the electronic whiteboards 12 and 22 based on the information of the screen display transmitted from the shared workspace server 30. FIG. 24 shows how the information of the screen display received from the shared workspace server 30 is displayed on the electronic whiteboards 12 and 22 in the site systems 10 and 20.

(16) The users in the site systems 10 and 20 make entries using the user input units such as the keyboard or the pointing device on the electronic whiteboards 12 and 22 and exchange information using the video and audio servers 11 and 21 for advancing the conference.

FIGS. 25 through 28 show how the users at the sites make entries through the electronic whiteboards and exchange multimedia information using the video and audio servers for advancing the conference.

Figure 25:
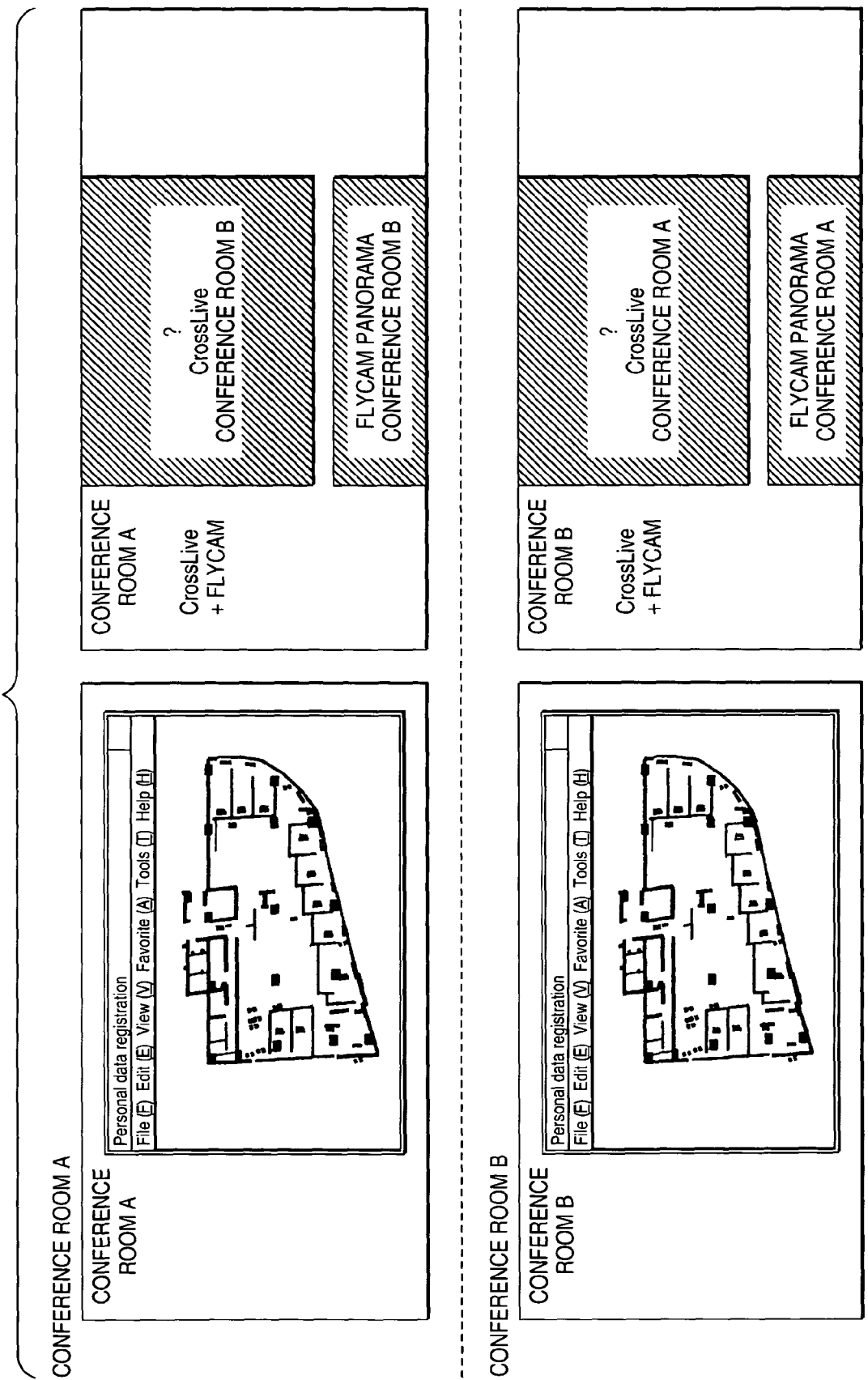
FIG. 25 is a drawing to show how the users at the sites make entries through the electronic whiteboards and exchange multimedia information using the video and audio servers for advancing the conference.

In FIG. 25, the users at the sites share the same conference environment using the application start screens displayed on the electronic whiteboards and camera images.

Figure 26:
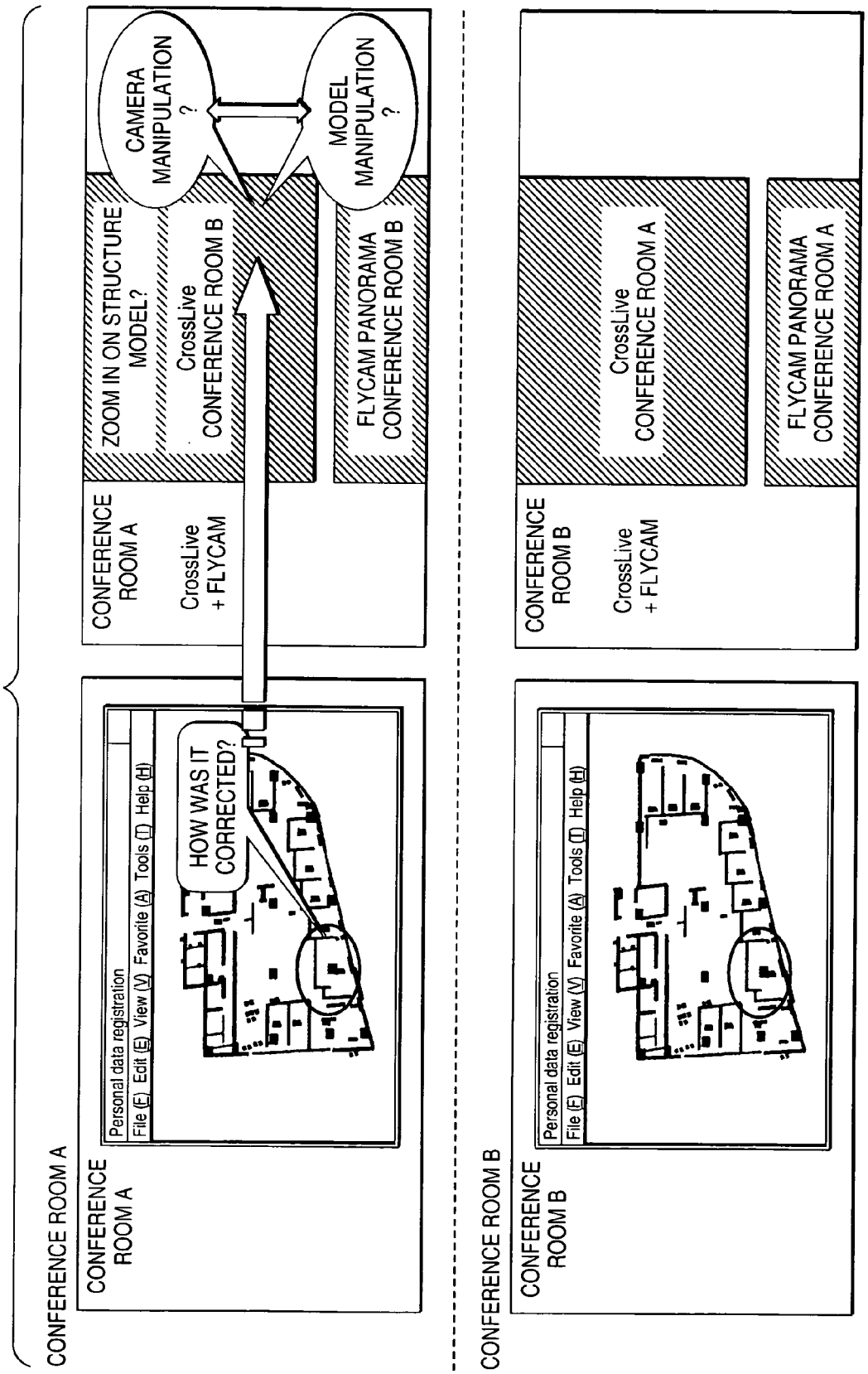
FIG. 26 is a drawing to show how the users at the sites make entries through the electronic whiteboards and exchange multimedia information using the video and audio servers for advancing the conference.

In FIG. 26, the user in conference room A indicates specific content of the file through the application screen on the electronic whiteboard and makes an inquiry of the user in conference room B by voice.

Figure 27:
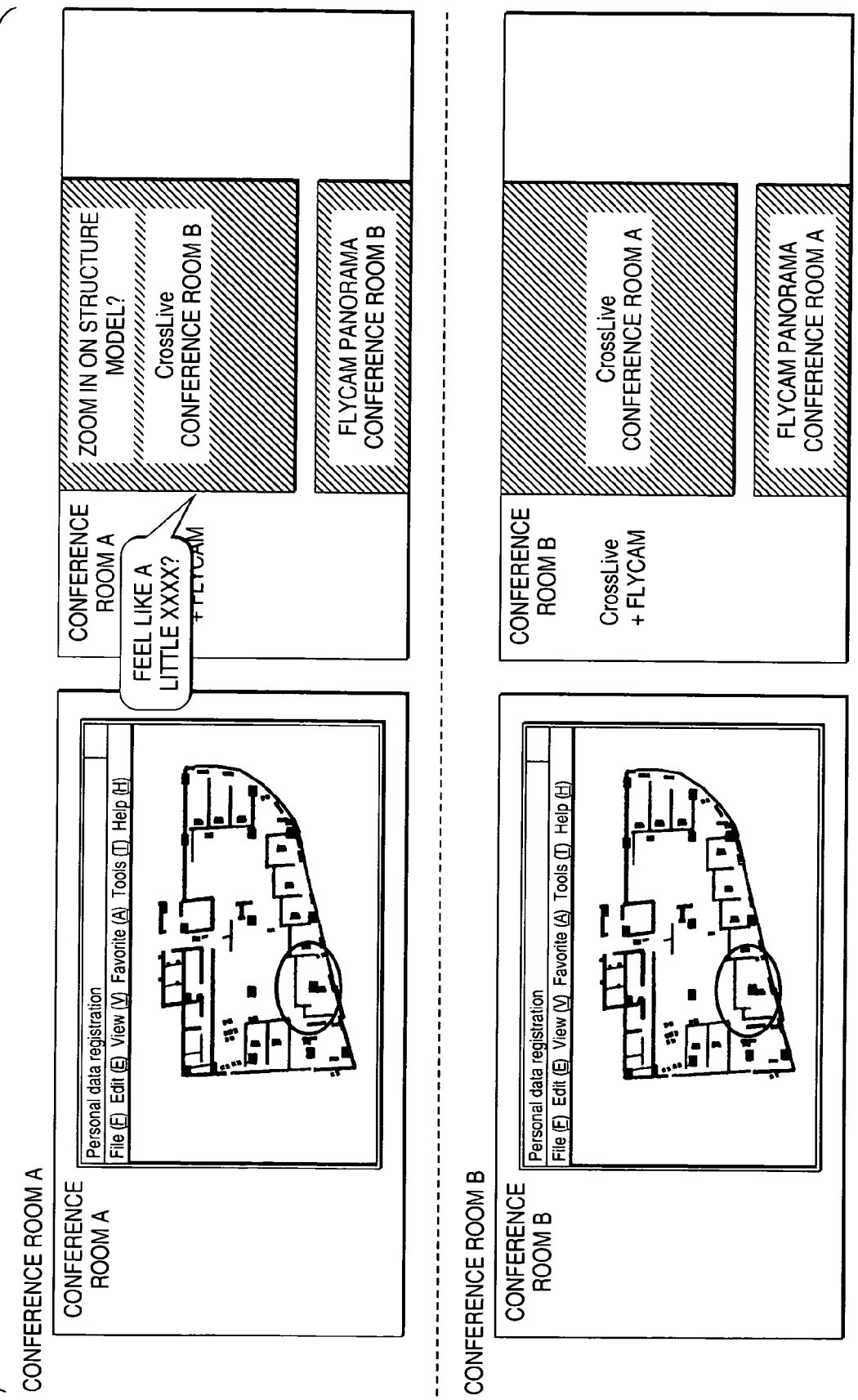
FIG. 27 is a drawing to show how the users at the sites make entries through the electronic whiteboards and exchange multimedia information using the video and audio servers for advancing the conference.

In FIG. 27, the user in conference room A receives an answer from the user in conference room B on a voice (audio) basis.

Figure 28:
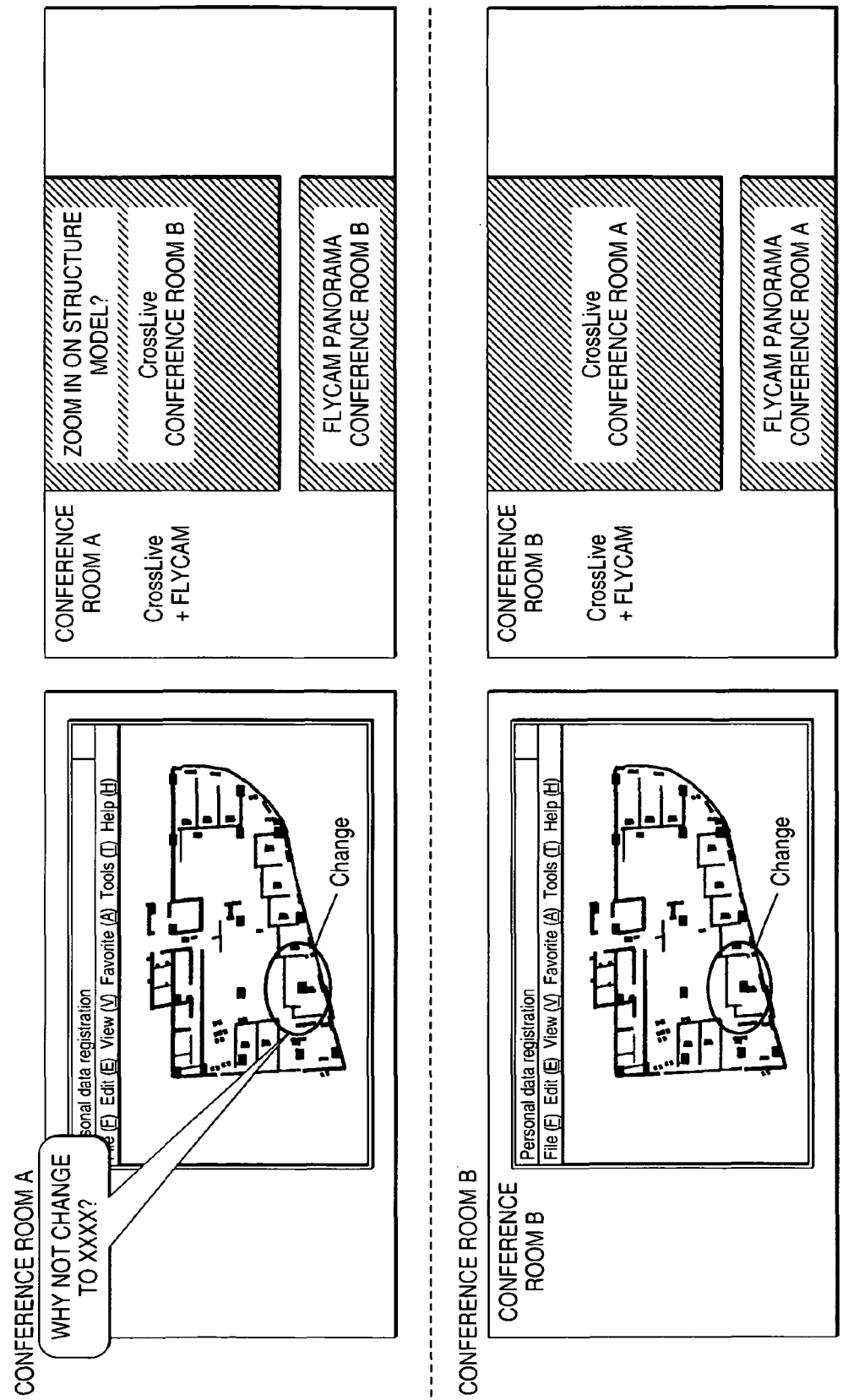
FIG. 28 is a drawing to show how the users at the sites make entries through the electronic whiteboards and exchange multimedia information using the video and audio servers for advancing the conference.

In FIG. 28, the user in conference room A corrects the file content using the graphical user interface on the application screen output onto the electronic whiteboard. The correction content is sent to the site server 200 corresponding to conference room B and is reflected on the screen display on the electronic whiteboard 22 and a history is registered in the shared workspace server 30.

Figure 29:
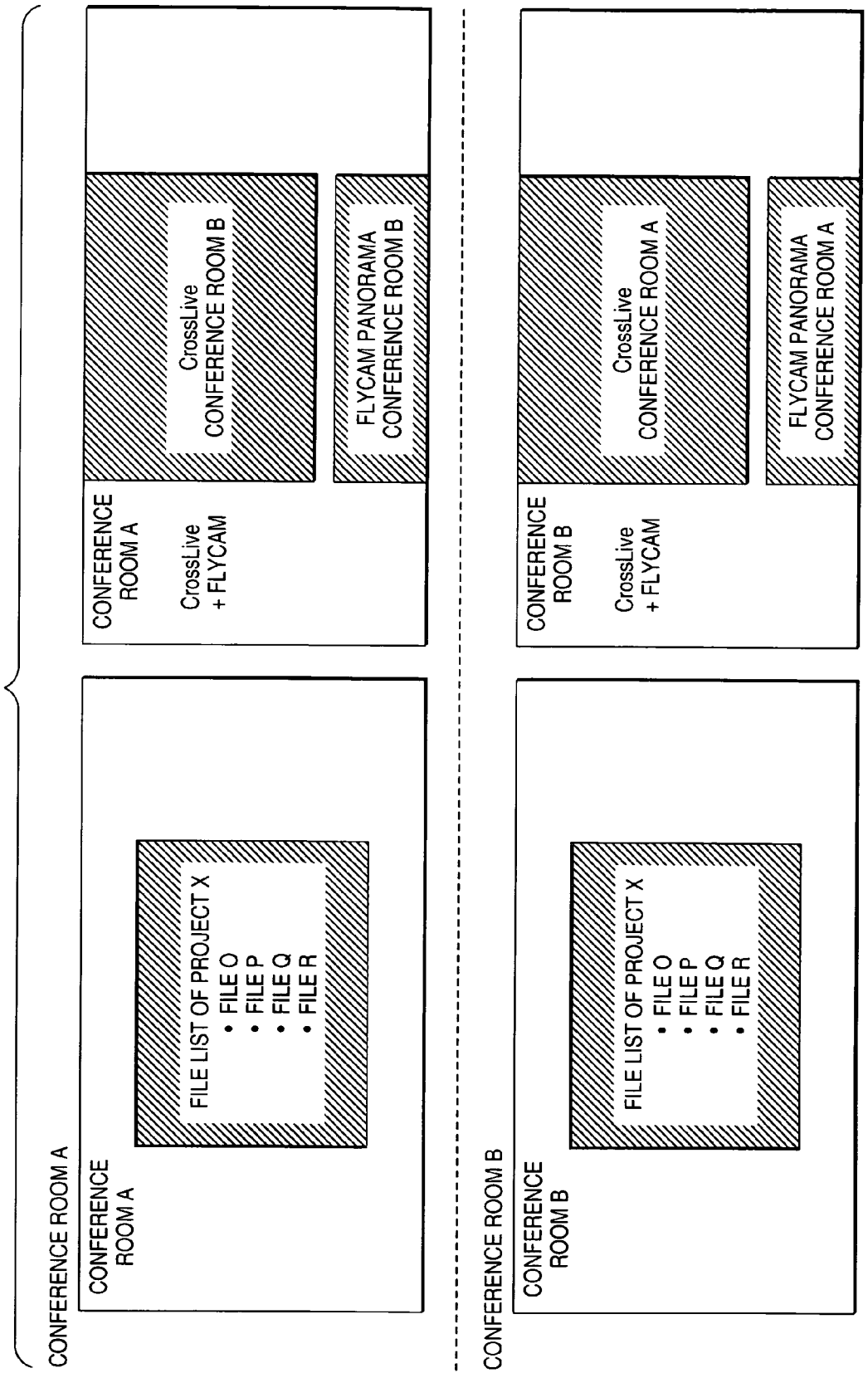
FIG. 29 is a drawing to show how the display on the electronic whiteboard in conference room A is returned to the project file list as the user enters an application end command.

(17) The user operating the electronic whiteboard 12 enters an application end command (see FIG. 29), the file used in the application is stored in a file server (not shown) specified by the reference in the shared workspace 1 or 2.

Figure 30:
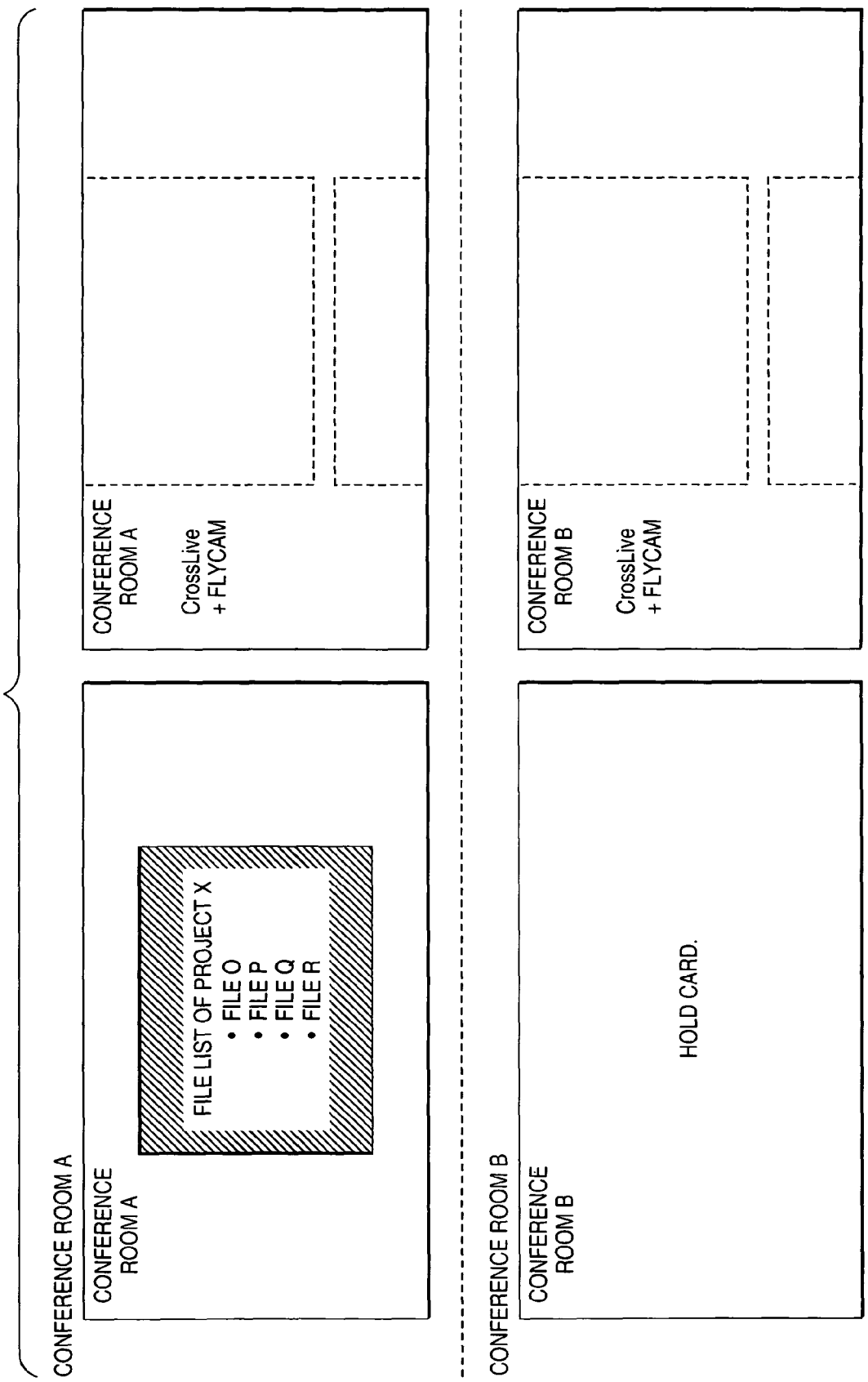
FIG. 30 is a drawing to show how the site server terminates the session as the user enters an end command.

(18) In the site server 200, the user connects the second IC card, thereby entering a command for logging out from the site server 200 and terminating the use of the system. Accordingly, the site server 200 terminates the session (see FIG. 30).

Figure 31:
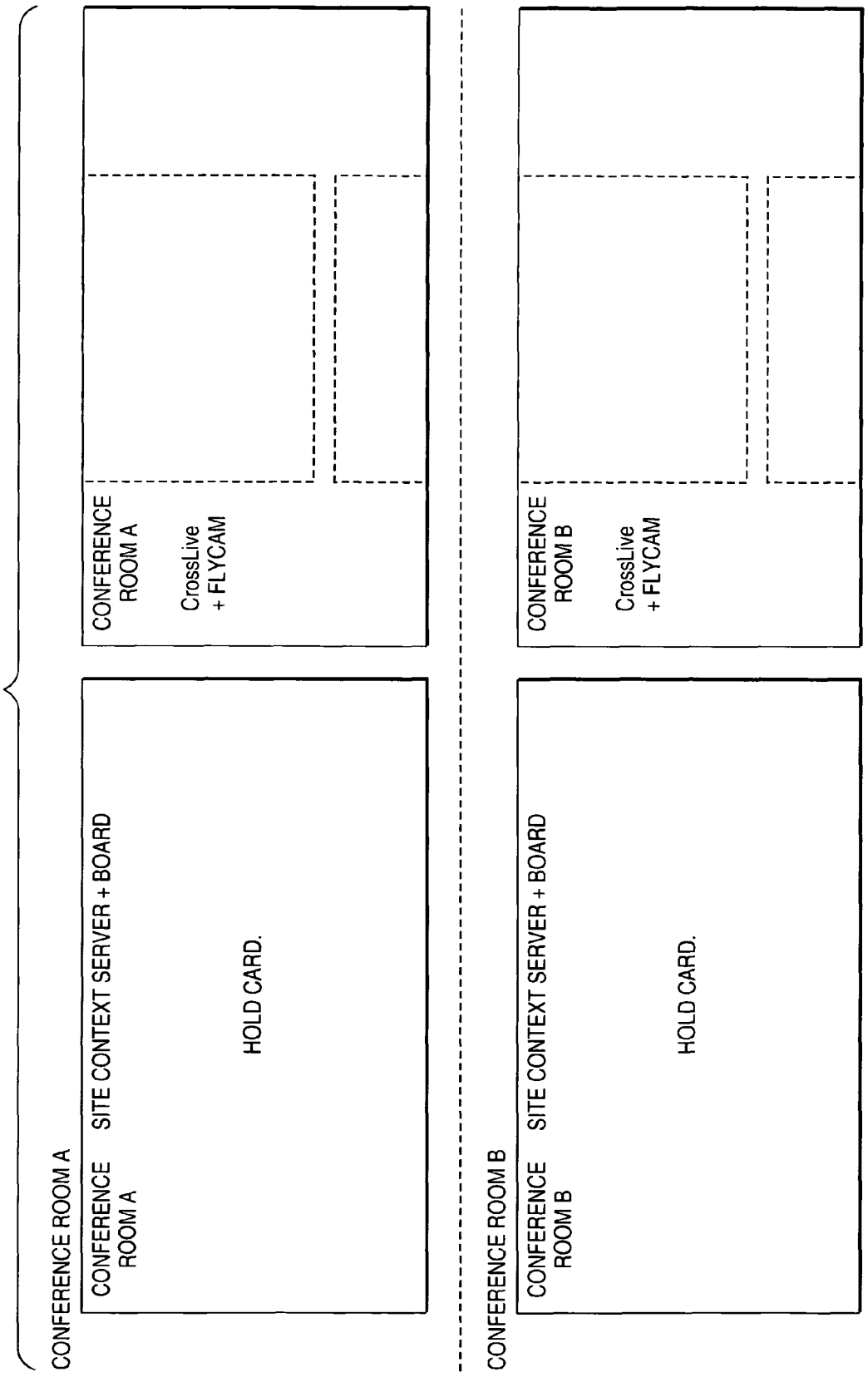
FIG. 31 is a drawing to show how the site server terminates the session as the user enters an end command.

(19) In the site server 100, the user connects the first IC card, thereby entering a command for logging out from the site server 100 and terminating the use of the system (see FIG. 31).

Fifth Example of Operation

In a fifth example operation which will be described below, the user as the presenter distributes a shared document as presentation material to other users as conference participants.

Figure 45:
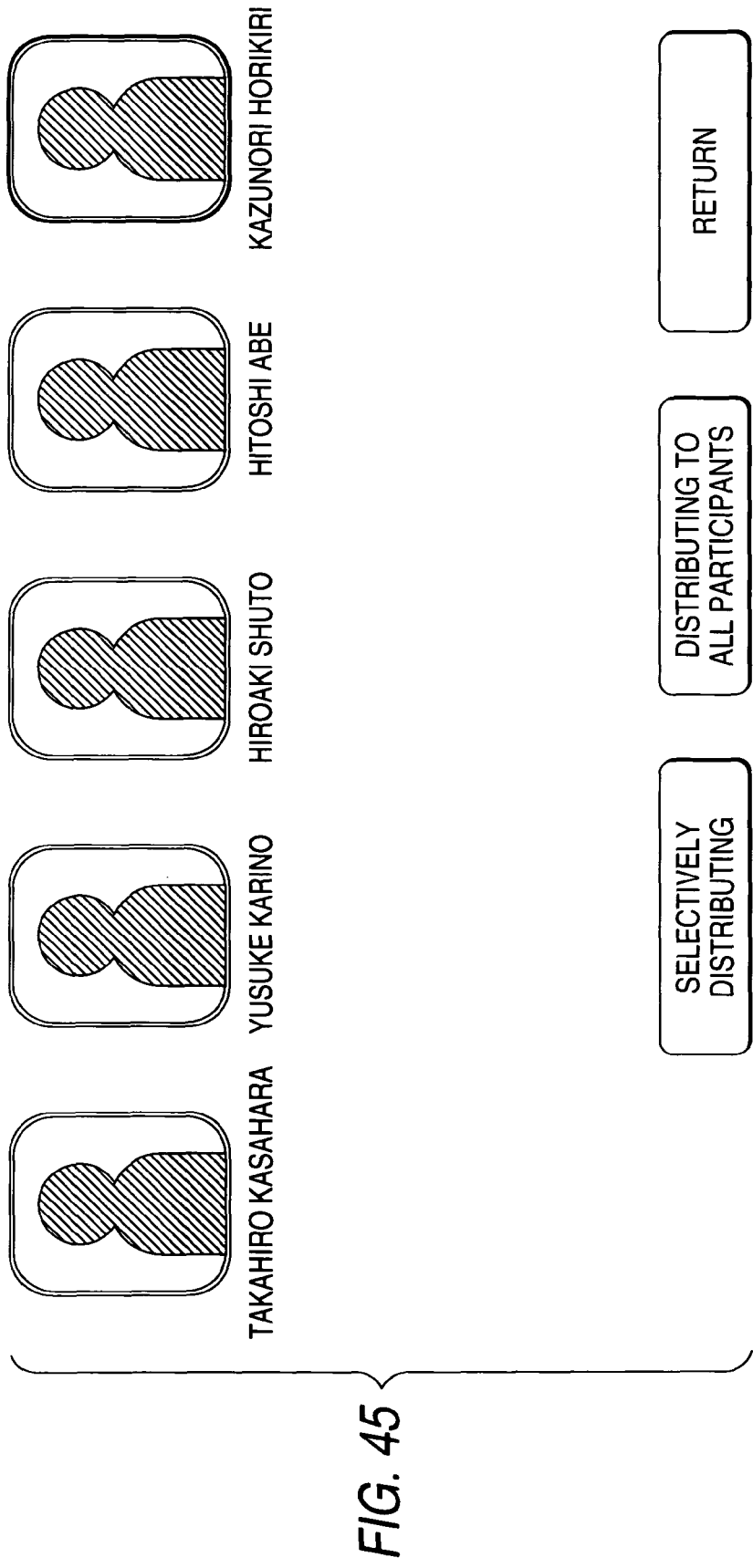
FIG. 45 is a drawing to show a configuration example of an extended user interface screen in a conference room according to the embodiment of the invention.
Figure 46:
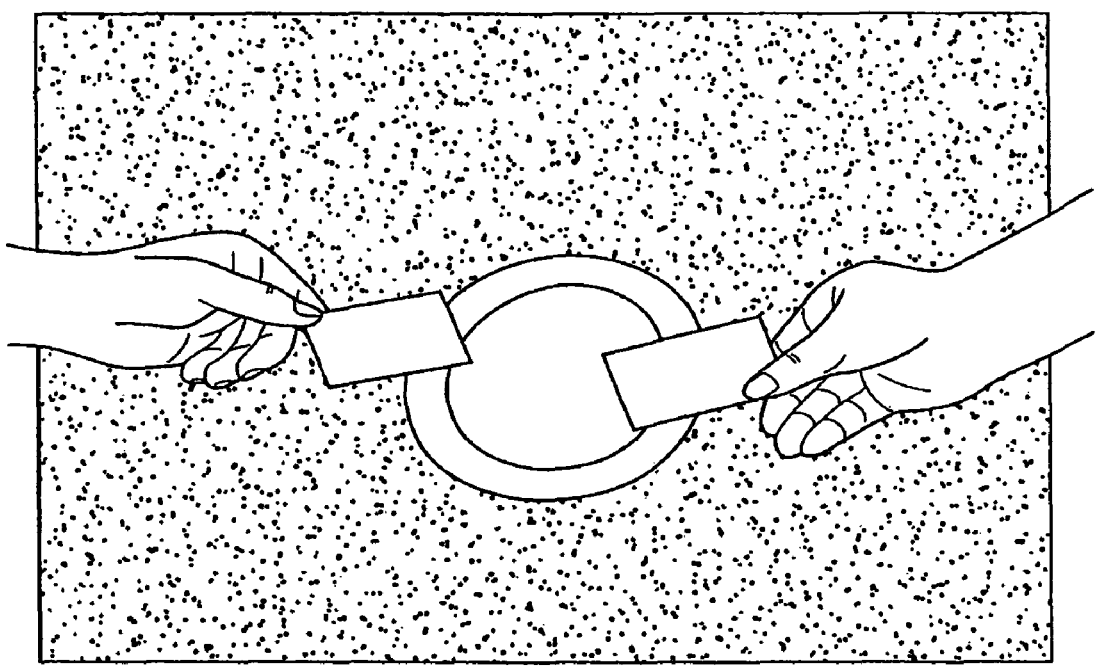
FIG. 46 is a drawing to show how two users hold their IC cards over the read face of an IC card authentication section installed on a table

In the conference room according to the embodiment, an extended user interface, such as a projection screen, is provided. FIG. 45 shows a configuration example of the user interface screen. On the screen shown in the figure, icons are displayed in a one-to-one correspondence with the users participating in the conference (logging in to the system). For example, the icon of the current presenter is highlighted. Buttons for "selectively distributing" or "distributing to all participants" the shared document used in the presentation are also provided on the screen. An operation procedure applied when "selectively distributing" is selected will be discussed below:

(1) Each participant who wants electronic distribution of information from the presenter holds his or her IC card over the IC card authentication section 1003 installed in the conference room and connects to the system via the IC card, thereby indicating his or her intention to receive distribution. FIG. 46 shows how two users hold their IC cards over the read face of the IC card authentication section 1003 installed on a table.

(2) The metadata manager 1005 manages the object for managing conference participation members. As the participant holds the IC card, the user ID is added to the conference member list.

(3) The right of adding to the file directory held by each user is given.

(4) As the presenter enters a material distribution command, the presenter can check the users registered as the participants at present on the screen (see FIG. 45).

(5) As the presenter supports execution of material distribution, the information concerning each registered user is acquired and a file is uploaded into the server ID and the object ID of the object retaining the information on the user from the user information.

(6) The metadata manager 1005 records the file ID, transmitter, receiver list, and time in a database.

Figure 47:
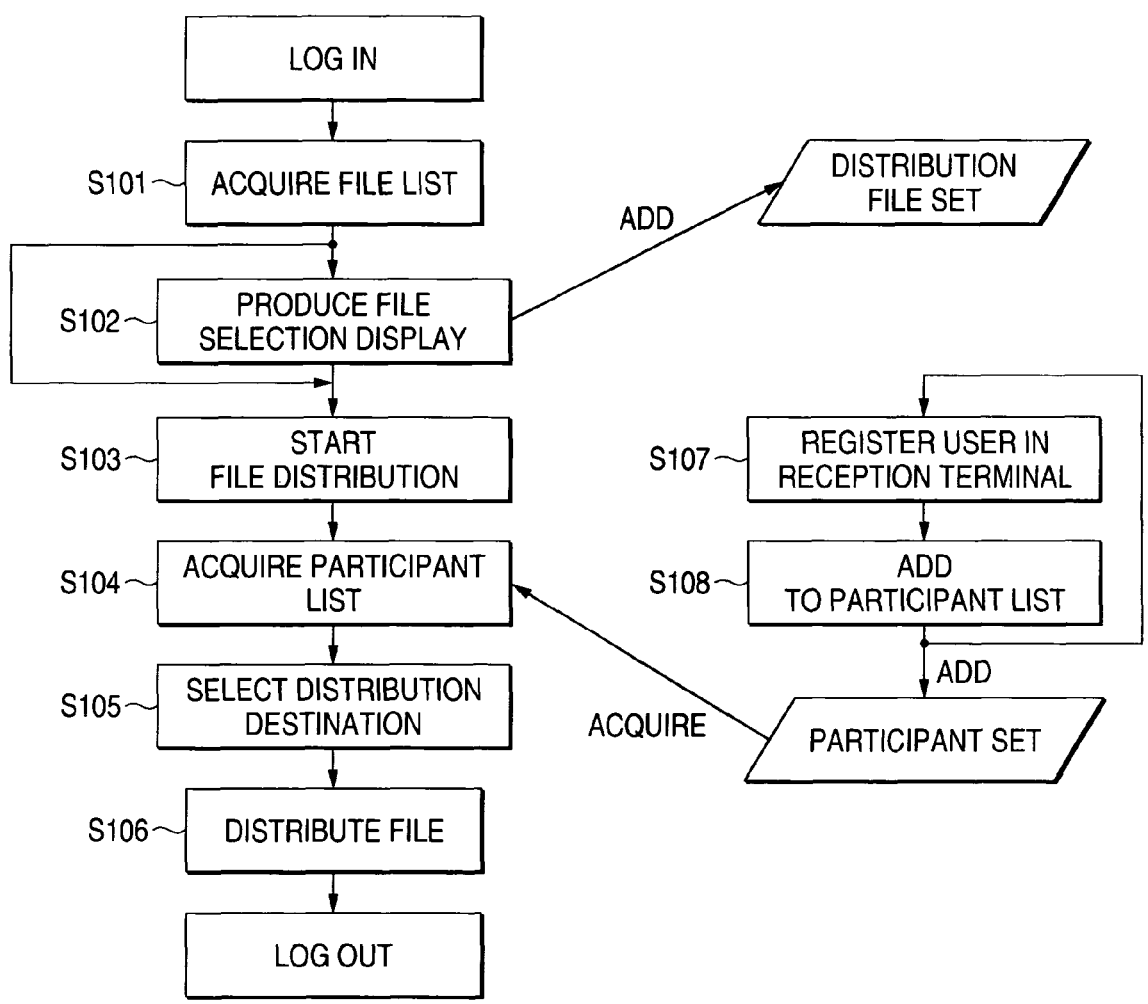
FIG. 47 is a flowchart to show a file distribution processing procedure applied when one user displays a plurality of files.

FIG. 47 is a flowchart to show a file distribution processing procedure applied when one user displays a plurality of files.

To begin with, when a file list is acquired (step S101) file selection display is produced based on the set of the distribution files (step S102). File distribution is started (step S103).

Here, a participant list is acquired from the set of the conference participants (step S104). As each user is registered, namely, the user holds the IC card over the read face of the IC card authentication section 1003 (step S107), the participant is additionally registered in the participant set (step S108).

Distribution destinations are selected out of the participant list (step S105) and the file is distributed (step S106).

Figure 48:
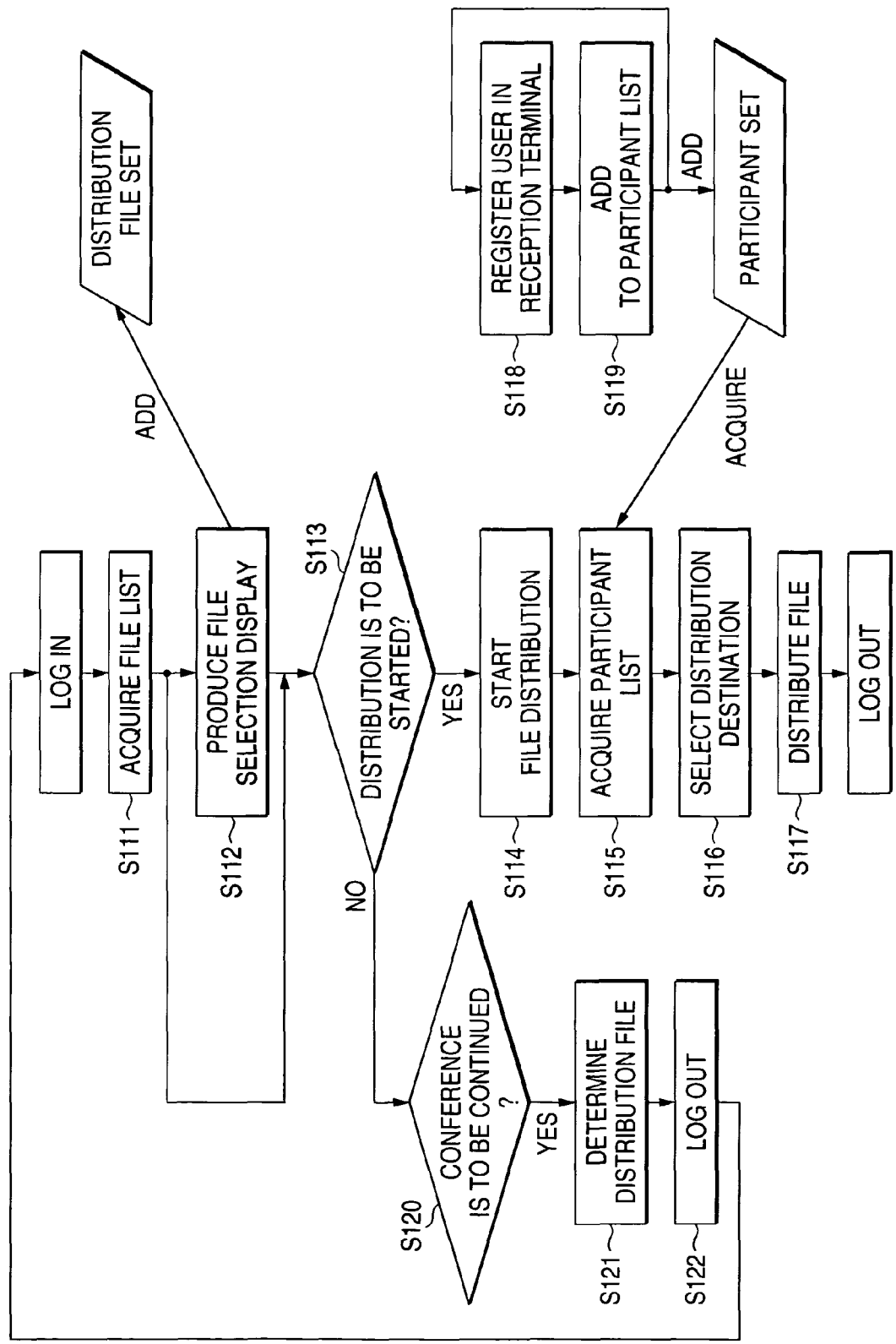
FIG. 48 is a flowchart to show a file distribution processing procedure applied when a plurality of users display a plurality of files.

FIG. 48 is a flowchart to show a file distribution processing procedure applied when a plurality of users display a plurality of files.

To begin with, when a file list is acquired (step S111) file selection display is produced based on the set of the distribution files (step S112). Whether or not file distribution is to be executed is determined (step S113).

If file distribution is to be executed, file distribution is started (step S114).

Here, a participant list is acquired from the set of the conference participants (step S115). As each user is registered, namely, the user holds the IC card over the read face of the IC card authentication section 1003 (see FIG. 46) (step S118), the participant is additionally registered in the participant set (step S119).

Distribution destinations are selected out of the participant list (step S116) and the file is distributed (step S117).

On the other hand, if it is determined that file distribution is not started (step S113), whether or not the conference is to be continued is further determined (step S120). To continue the conference, the distribution file is determined (step S121) and log-out is conducted. Here, the files to be distributed include not only the files previously registered in the workspace, but also the temporary files brought into the conference by the user and temporarily registered in the workspace.

The file distribution processing is performed as shown in FIGS. 47 and 48, whereby a document can be presented for each participant in the conference without the need for each user to possess a machine storing the document file required as reference information in the process of the conference. Likewise, each participant receiving disclosure of the document can also take the document home without the need for possessing a machine storing the document file. Further, the server records the fact that the document is passed, whereby information retrieval with the conference situation or context as a key can be conducted.

Operation of Shared Workspace Server

In the teleconference system 1 according to the invention, the conference system is operated at a plurality of sites and the shared workspace server 30 connects the sites to each other.

The shared workspace server 30 is placed for sharing the workspace of the object for managing and using tasks (cooperation units) among the sites, and manages sessions for managing connection of the conference systems, files used in conferences and created as records of conferences, reference information to resources relevant to conferences, and history information of file access, etc., made by conference participants.

The conference participant can operate the graphical user interface provided by the shared workspace, thereby connecting to the multimedia communication conference system without being aware of the call address of each multimedia communication conference system and easily accessing information in the files relevant to the conference and the like from the conference system.

A shared workspace flow realized through the mediation of the shared workspace server 30 will be discussed.

Figure 32:
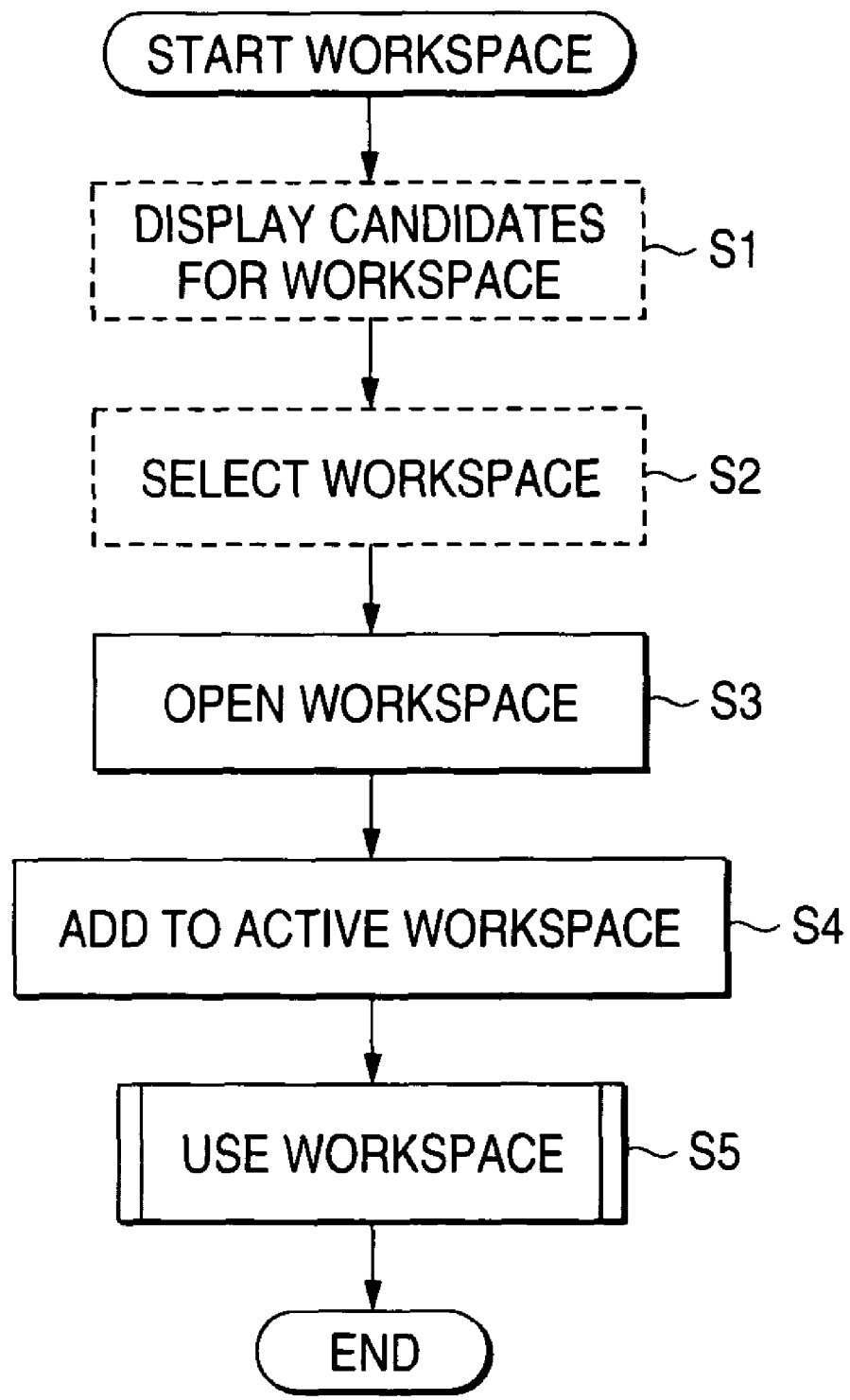
FIG. 32 is a drawing to schematically show a general shared workspace flow.

FIG. 32 schematically shows a general shared workspace flow.

When workspace is started, first, candidates for the workspace are displayed on the electronic whiteboard in the site system (step S1).

The user selects any desired workspace through the workspace candidate display (step S2).

The shared workspace server 30 opens the selected workspace (step S3) in response to the selection operation and adds the workspace as an active workspace for use of the workspace (step S5).

Figure 33:
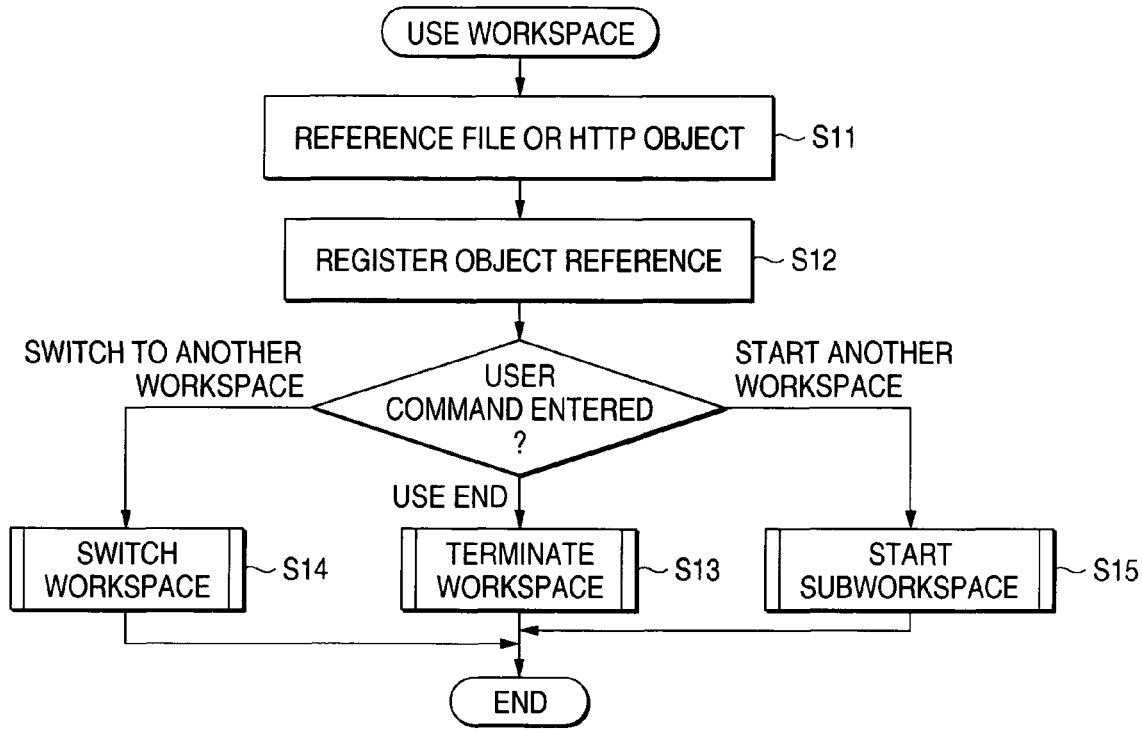
FIG. 33 is a flowchart to show a processing procedure for use of workspace.

FIG. 33 is a flowchart to show a processing procedure for use of the workspace.

The workspace selected by the user is opened and the files and HTTP objects contained therein are referenced through the electronic whiteboard (step S11).

When the file or object is referenced, object reference registration processing is performed (step S12).

As the conference proceeds, creation of a new file, change of a file, reference to an object (such as external resource), and the like are performed, and a history of such conference activities is retained in sequence. The retained history is later referenced, whereby the result of the cooperative work can be immediately utilized in the next step.

Then, if the user enters a workspace use end command, workspace termination processing is performed (step S13).

If the user enters a command for switching to another workspace, workspace switching processing is performed (step S14).

If the user enters a command for starting another workspace, a subworkspace is started (step S15).

Figure 34:
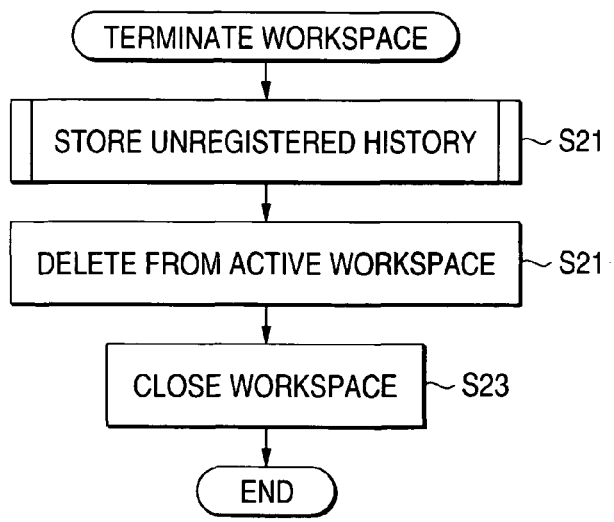
FIG. 34 is a flowchart to show the workspace termination processing procedure in the flowchart of FIG. 33 in more detail.

FIG. 34 shows the workspace termination processing procedure in the flowchart of FIG. 33 in more detail.

To begin with, processing of saving (storing) unregistered history is performed (step S21).

Next, the workspace being used is deleted from the active workspaces (step S22) and processing of closing workspace is performed (step S23).

Figure 35:
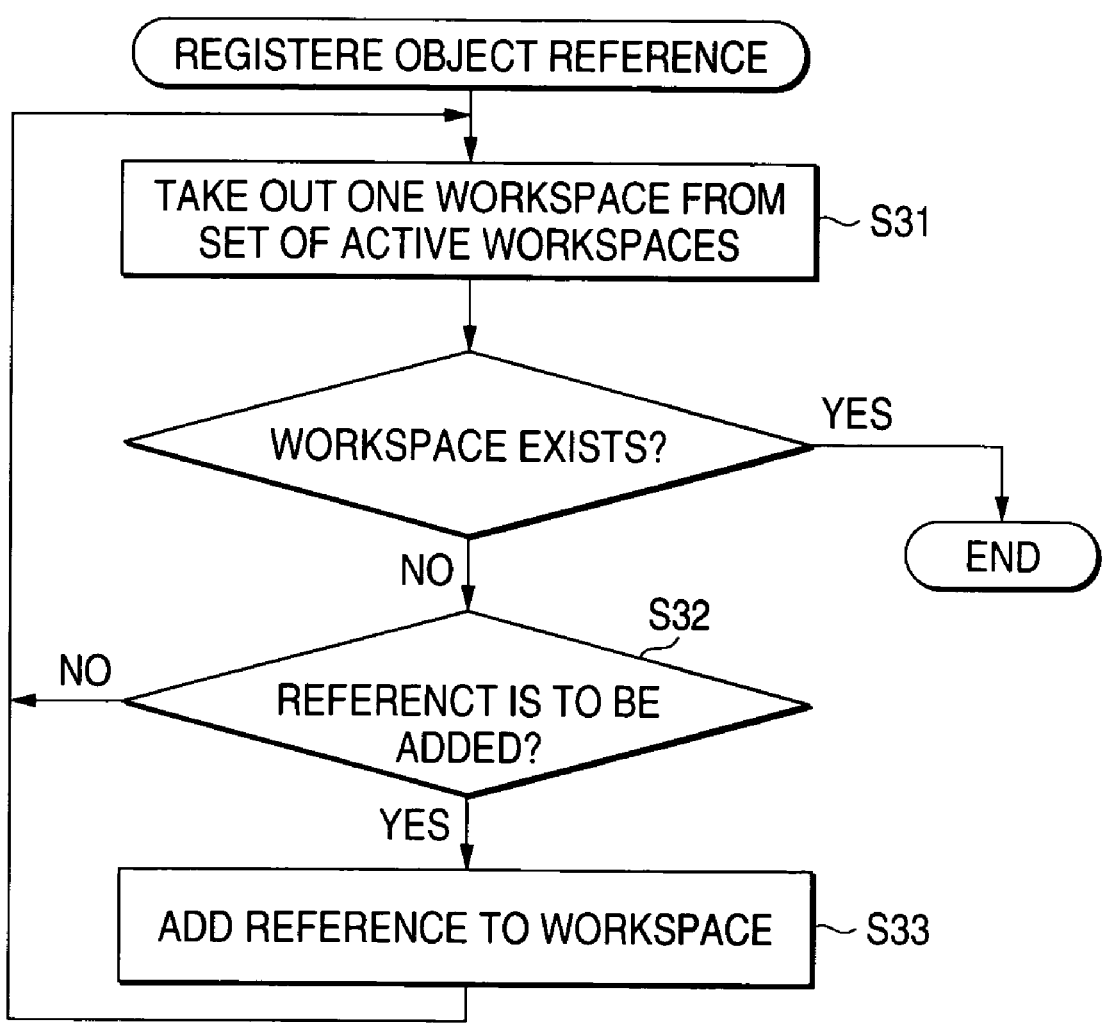
FIG. 35 is a flowchart to show the object reference registration processing procedure in the flowchart of FIG. 33 in more detail.

FIG. 35 shows the object reference registration processing procedure in the flowchart of FIG. 33 in more detail.

To begin with, only one workspace is taken out from the set of the active workspaces (step S31). At this time, if no workspaces exist, the processing routine is terminated.

On the other hand, if a workspace exists, whether or not reference is to be added is determined (step S32).

If there is no reference to be added, the process returns to step S31 and another workspace in the active workspace set is processed.

If the reference to be added exists, the reference is added to the workspace (step S33) and then the process returns to step S31 and another workspace in the active workspace set is processed.

Figure 36:
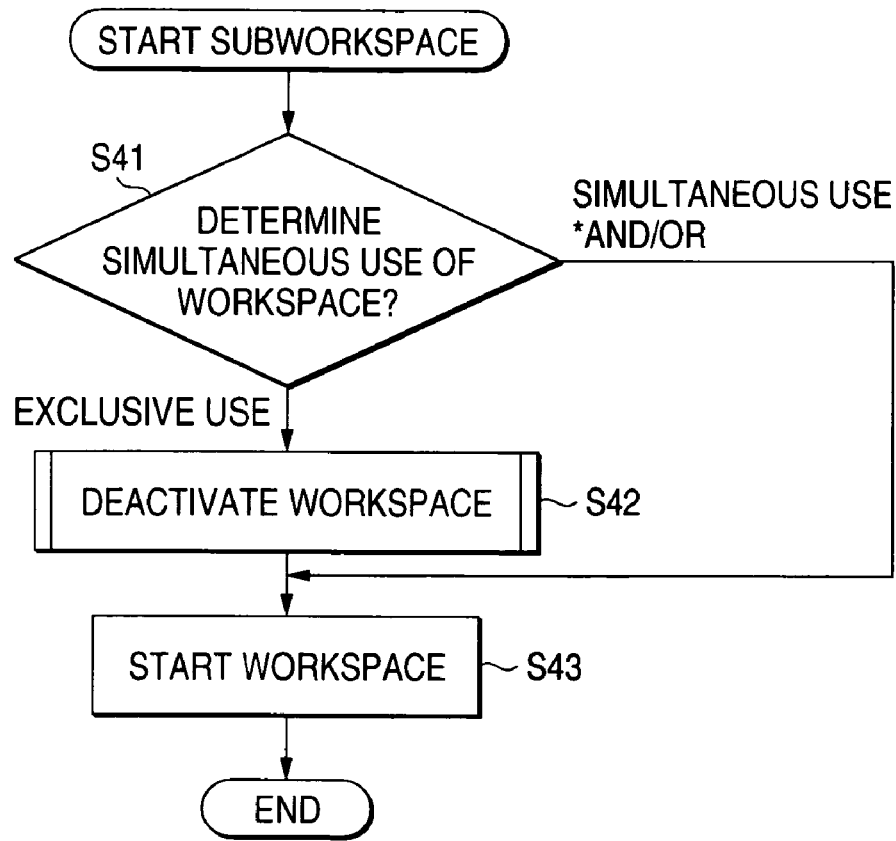
FIG. 36 is a flowchart to show the subworkspace starting processing procedure at step S15 in the flowchart of FIG. 33 in more detail.

FIG. 36 shows the subworkspace starting processing procedure at step S15 in the flowchart of FIG. 33 in more detail.

To begin with, whether or not simultaneous use of workspace is made is determined (step S41).

To make exclusive use, workspace deactivation processing is performed (step S42) and then workspace start processing is performed (step S43).

To make simultaneous use, step S42 is skipped and workspace start processing is performed (step S43).

Figure 37:
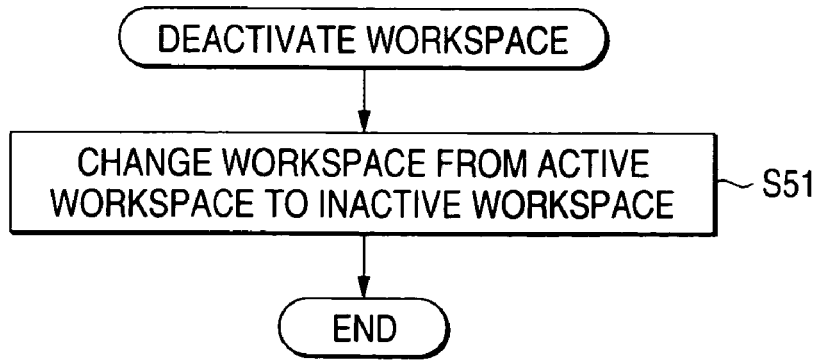
FIG. 37 is a flowchart to show the workspace deactivating processing procedure at step S42 in the flowchart of FIG. 36 in more detail.

FIG. 37 shows the workspace deactivating processing procedure at step S42 in the flowchart of FIG. 36 in more detail.

In this case, the workspace is changed from active workspace to inactive workspace (step S51) and then the workspace is deactivated.

Figure 38:
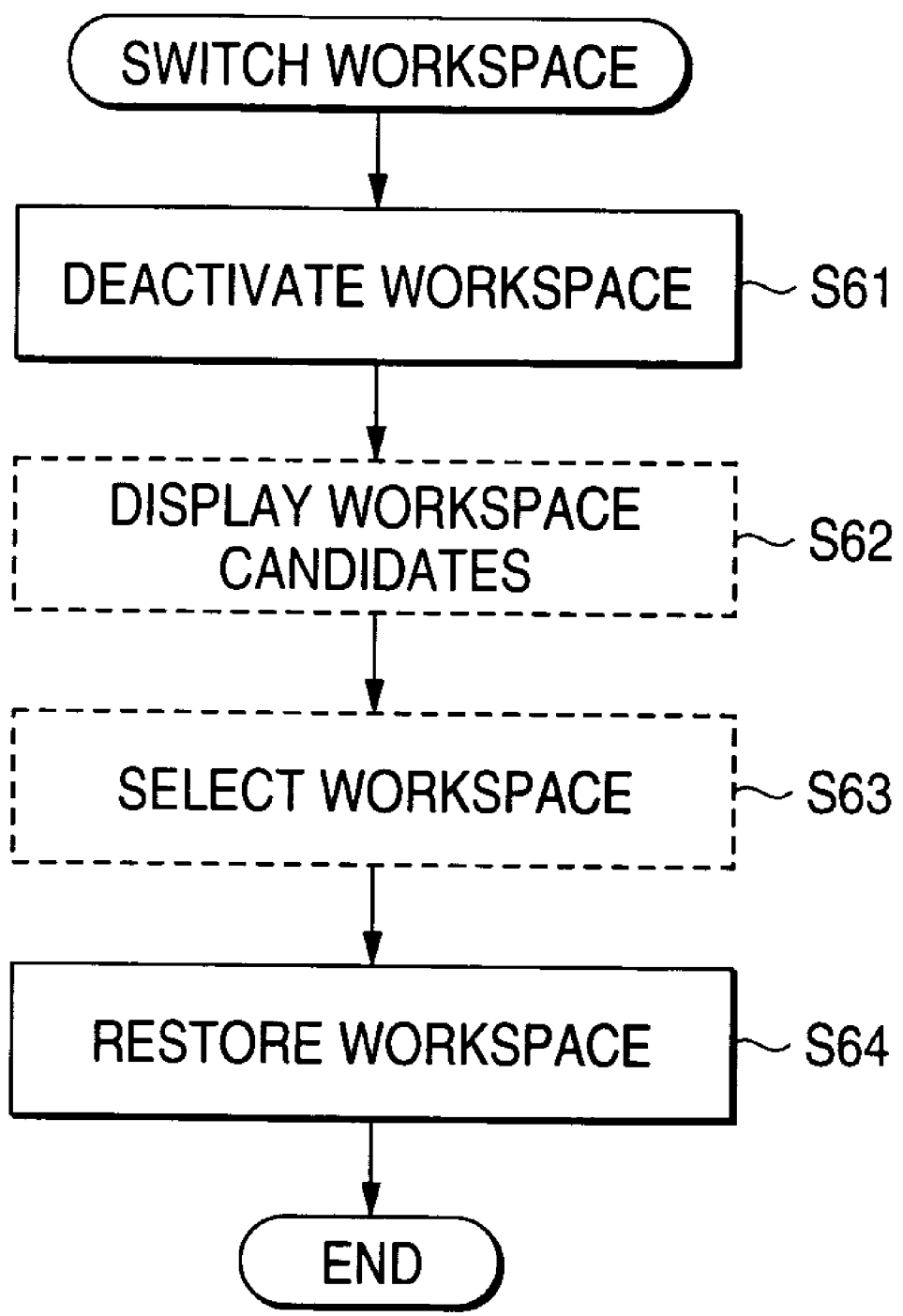
FIG. 38 is a flowchart to show the workspace switching processing procedure at step S14 in the flowchart of FIG. 33 in more detail.

FIG. 38 shows the workspace switching processing procedure at step S14 in the flowchart of FIG. 33 in more detail.

To begin with, the current workspace is deactivated (step S61). The workspace is deactivated according to the procedure shown in FIG. 37.

Next, workspace candidates are displayed on the electronic whiteboard or any other display (step S62) and the user uses the graphical user interface on the display screen to select the workspace to switch to (step S63).

Then, the process is returned to the deactivated workspace (step S64).

Figure 39:
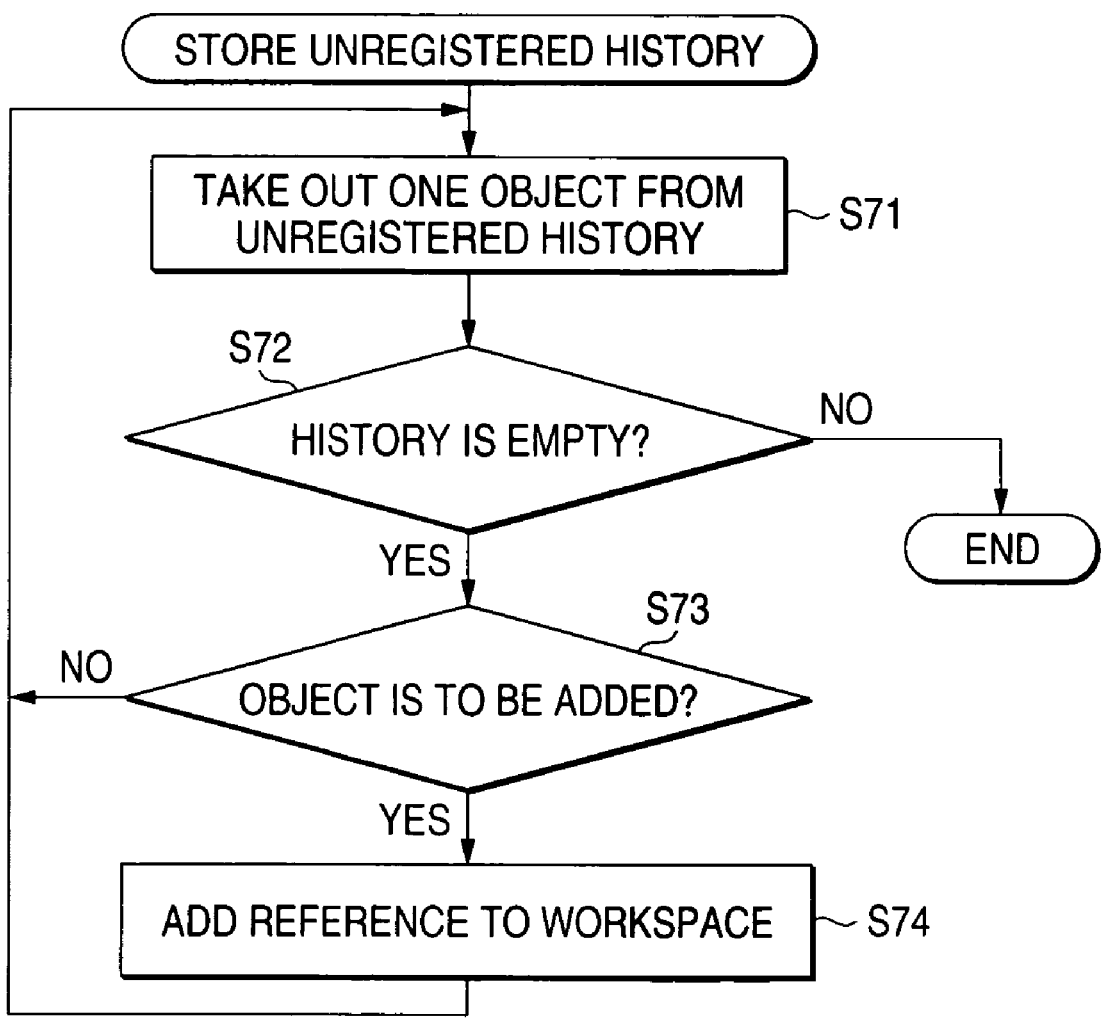
FIG. 39 is a flowchart to show the unregistered history save processing procedure at step S21 in the flowchart of FIG. 34 in more detail.

FIG. 39 shows the unregistered history save processing procedure at step S21 in the flowchart of FIG. 34 in more detail.

To begin with, one object is taken out from the unregistered history (step S71). At this time, if the history is empty (step S72), the processing routine is terminated.

On the other hand, if unregistered history exists (step S72), whether or not object is to be added is determined (step S73). If no object is to be added, the process returns to step S71 and another unregistered history processing is performed.

If object is to be added, the reference is added to the workspace (step S74). Then, the process returns to step S71 and another unregistered history processing is performed.

Figure 40:
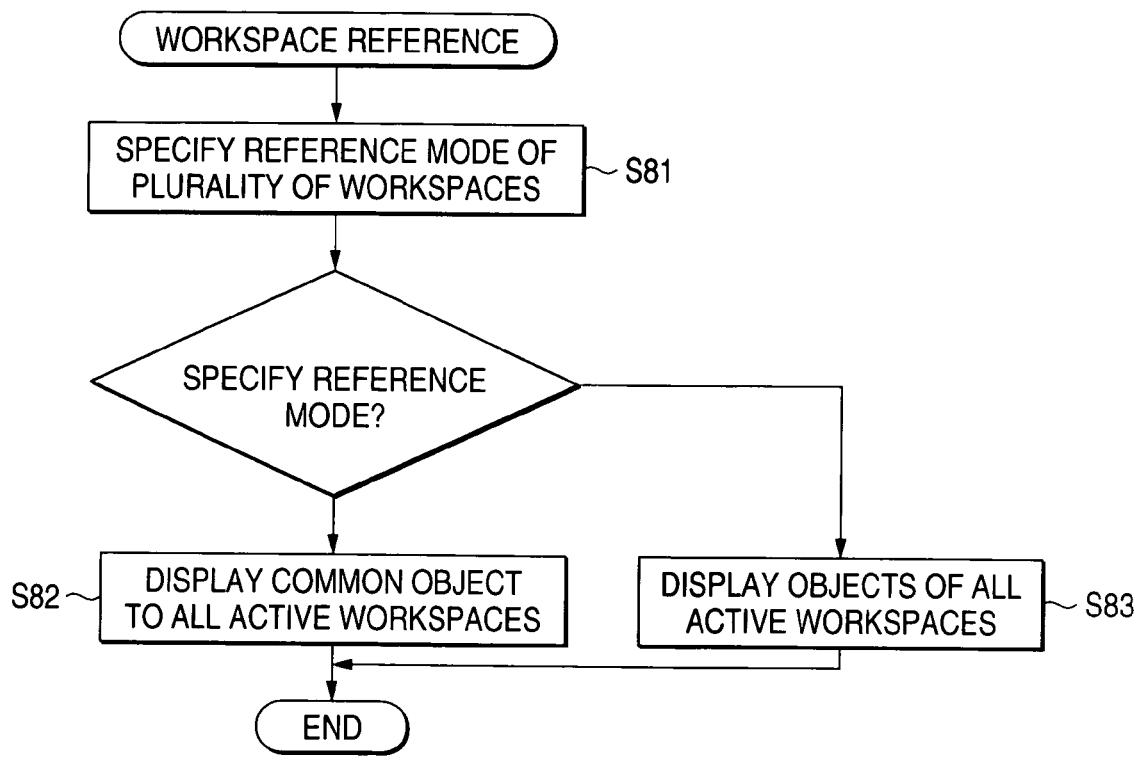
FIG. 40 is a flowchart to show a workspace reference processing procedure.

FIG. 40 is a flowchart to show a workspace reference processing procedure.

To begin with, the reference mode of a plurality of workspaces is specified (step S81).

A common object to all active workspaces is displayed (step S82) or the objects of all active workspaces are displayed (step S83) in response to the specified reference mode.

Figure 41:
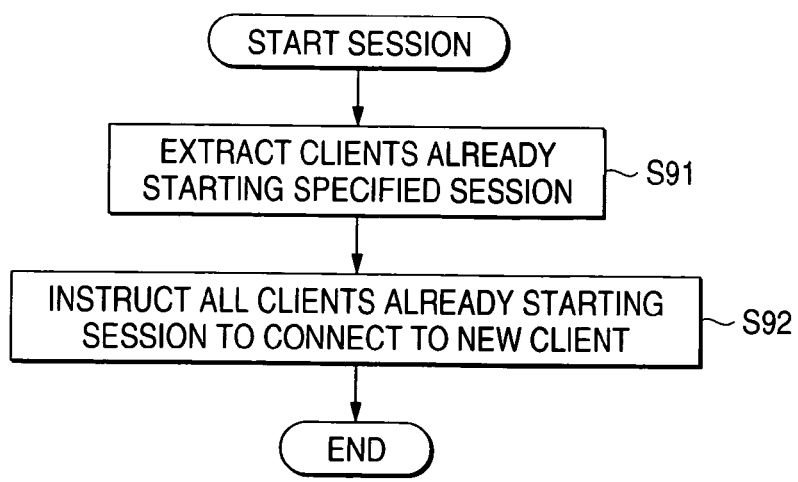
FIG. 41 is a flowchart to show a session start processing procedure.

FIG. 41 is a flowchart to show a session start processing procedure.

To begin with, the clients already starting the specified session are extracted (step S91).

A request for connecting to a new client is transmitted to all clients already starting the session (step S92).

While the specific embodiment of the invention has been described in detail, it is to be understood that the modifications will be apparent to those skilled in the art without departing from the spirit of the invention. That is, the disclosure of the invention is for illustrative purposes only, and it is to be understood that the description of the invention is not restrictive. The scope of the invention is therefore to be determined solely by the appended claims.

According to the shared workspace server manages a session for managing connection of the site systems, a file used in a conference and created as a record of the conference, reference information to a resource relevant to the conference, and history information of file access made by conference participants.

Therefore, according to the teleconference system according of the invention, the conference participant can operate the graphical user interface provided by the shared workspace, thereby connecting to the multimedia communication conference system without being aware of the call address of each multimedia communication conference system and easily accessing information in the files relevant to the conference and the like from the conference system.

The shared workspace server provides a user interface for connecting a session and making reference to a file and/or a resource.

When a client starts a session, the shared workspace server instructs all other clients already starting the session to connect to the client.

The site systems correspond to separately operating conference systems and a conference is operated for each site. Each of the site systems includes an electronic whiteboard for providing a graphical user interface provided by a shared workspace, a video and audio server for coding and decoding video and audio and then transmitting and receiving video and audio to and from any other site system for sharing motion and behavior of the participants at the sites, an authentication unit for authenticating identification of the conference participants, and a site server for managing a session in the site system, a file used in a conference and created as a record of the conference, reference information to a resource relevant to the conference, and history information of file access made by the conference participants.

The site system provides an interface for enabling the conference participating users to collaborate, and controls presentation. The presentation control is implemented in various manners. For example, user interfaces of a general computer, such as a display, a keyboard, a mouse, and a tablet may be installed in a conference room as they are. Alternatively, a projection screen onto a wall through a projector, a camera for capturing user operation on the projection screen, and a whiteboard are used in combination to make up a user interface. Application operation buttons such as print, display, and listing of shared documents are disposed on the wall. Of course, a probe for detecting a user command without user's consciousness may be disposed in the conference room.

Information can be accessed irrespective of whether or not the conference participating user possesses a computer machine such as a PC or a PDA device depending on how the presentation control is implemented. That is, computers can be introduced as joined together with the workspace, and the computer capabilities of information collection, management, analysis, any other computation processing, information display, information distribution, etc., can be provided for the user who is unaware of them. Not only formatted information such as information in a computer file, but also individual implicit information, namely, the flexibility of workspace is enhanced, collaboration exceeding the frames of offices, enterprises and nationalities is realized, and the possibility of business is widened.

According to the teleconference support method according to the invention, the conference participant can operate the graphical user interface provided by the shared workspace, thereby connecting to the multimedia communication conference system without being aware of the call address of each multimedia communication conference system and easily accessing information in the files relevant to the conference and the like from the conference system.

The teleconference support method according to the invention may further include the step of providing a user interface for displaying workspace candidates required for the user to select a workspace.

The step of managing use of the workspace may include the step of providing a user interface for making reference to a file and/or a resource.

The step of managing use of the workspace may include the step of registering reference to a file and/or a resource.

The step of managing use of the workspace may include the steps of switching a workspace, starting a subworkspace, and terminating the workspace.

In the step of managing use of the workspace, the original workspace may be deactivated in the step of switching a workspace and/or the step of starting a subworkspace.

In the step of managing use of the workspace, when a client starts a session, all other clients already starting the session may be instructed to connect to the client.

The computer program according to the invention is a computer program described in a computer-readable format so as to realize predetermined processing in a computer system. In other words, the computer program according to the invention is installed in a computer system, whereby the cooperative effect is demonstrated in the computer system and similar advantages to those of the teleconference support method according to the invention can be provided.

As described in detail, according to the invention, there can be provided the advantageous teleconference system and the advantageous teleconference support method for making it possible to connect a plurality of sites and realize remote cooperative work.

According to the invention, there can be provided the advantageous teleconference system, the advantageous teleconference support method, and the advantageous computer program for making it possible to provide a shared workspace for one conference participant to easily connect conference systems with any other conference participant and share information among them.

According to the invention, there can be provided the advantageous teleconference system, the advantageous teleconference support method, and the advantageous computer program for making it possible to realize cooperation call setting and information sharing from a plurality of conference systems using multimedia.

According to the invention, there can be provided the advantageous teleconference system, the advantageous teleconference support method, and the advantageous computer program for making it possible to smoothly collect, manage, analyze, display and distribute information used in a conference based on easy user operation.

According to the invention, a document can be presented for each participant in the conference without the need for each user to possess a machine storing the document file required as reference information in the process of the conference. Likewise, each participant receiving disclosure of the document can also take the document home without the need for possessing a machine storing the document file. Further, the server records the fact that the document is passed, whereby information retrieval with the conference situation or context as a key can be conducted.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A teleconference system for supporting realization of cooperative work among a plurality of conference systems, the teleconference system comprising:
   site systems each being installed at a plurality of sites, each site system being configured to generate a workspace of an object for managing and using cooperation units corresponding to respective conferences,
   and each site system comprising:
      an electronic whiteboard configured to provide a graphical user interface provided by a shared workspace;
      an authentication unit configured to authenticate identifications of conference participants; and
      a site server manager configured to manage a workspace for managing (1) a session in the site systems, (2) a file used in a conference and created as a record of the conference, (3) reference information to a resource relevant to the conference, and (4) history information of file access made by conference participants; and a shared workspace server configured to manage all the workspaces generated at all the site systems including managing the sessions, the files, the reference information and the history information, which are generated in the workspaces, wherein each site system provides a conference participant with a display of a set of workspaces to choose from when the conference participant logs into the site system, the set of workspaces are those workspaces that the conference participant is permitted to participate in based on the identification of the conference participant, one site system provides a first logged in conference participant with a display of a set of workspaces relevant to the first logged in conference participant, and provides a subsequent logged in conference participant a display of a set of common workspaces that are common to both the first logged in conference participant and the subsequent logged in conference participants and excluding other workspaces that the subsequent logged in user is permitted to participate, and a display of reference information managed in a workspace selected by the first logged in conference participant and the subsequent logged in conference participant on the condition that the first logged in conference participant and the subsequent logged in conference participant log into the one site system, wherein the subsequent logged in conference participant is permitted to select any workspace in the set of common workspaces, the shared workspace server established a session between different site systems on the condition that a plurality of conference participants log into different site systems and the plurality of conference participants selects the same workspace, the different site systems share input/output interfaces with application software by connecting electronic whiteboards of the different site systems to the shared workspace server, and as a response to a file reference request from one of the different site systems, the shared workspace server starts the application software to reference a file specified in the file reference request, and to provide the input/output interfaces with the application software to the different site systems with the session established.

2. The teleconference system as claimed in claim 1, wherein the shared workspace server is further configured to provide a user interface for connecting a session and making reference to a file or a resource.

3. The teleconference system as claimed in claim 1, wherein the shared workspace server is further configured to instruct, when a client starts a session, all other clients already having started the session to connect to the client.

4. The teleconference system as claimed in claim 1, wherein the shared workspace server is further configured to select a workspace based on user identification information transmitted from the site system.

5. The teleconference system as claimed in claim 4, wherein the shared workspace server is further configured to select the workspace based on the user identification information transmitted using an IC card by the site system.

6. The teleconference system as claimed in claim 1, wherein the shared workspace server is further configured to select a workspace based on workspace specification information transmitted from the site system.

7. The teleconference system as claimed in claim 6, wherein the shared workspace server is further configured to select the workspace based on workspace specification information transmitted by the site system based on information retained on an IC card.

8. The teleconference system as claimed in claim 1, wherein as the response to the file reference request received from the site system, the shared workspace server is configured to start the application software to reference the file specified in the file reference request, and to provide input/output interfaces with the application software to each site system with the session established.

9. The teleconference system as claimed in claim 8, wherein the shared workspace server is further configured to, in a case where the file specified in the file reference request is not previously registered in the workspace, temporarily register the file specified in the file reference request.

10. The teleconference system as claimed in claim 1, wherein the site system is configured to start the application software to reference the file specified in the file reference request, and to provide the input/output interfaces with the application software to any other site systems with the session established.

11. The teleconference system as claimed in claim 10, wherein the site system is further configured to receive the file specified in the file reference request from any other site system to start the application software to reference the file specified in the file reference request, and to provide the input/output interfaces with the application software for any other site systems with the session established.

12. A teleconference support method for supporting realization of cooperative work among a plurality of conference systems, the teleconference support method comprising:

generating workspaces in a plurality of site systems, each of the workspaces being an object for managing and using cooperation units corresponding to respective conferences;

providing an electronic whiteboard at each of the plurality of site systems, the electronic whiteboard providing a graphical user interface provided by a shared workspace;

authenticating identifications of the conference participants;

managing a workspace at each of the plurality of site systems for managing (1) a session in the site systems, (2) a file used in a conference and created as a record of the conference, (3) reference information to a resource relevant to the conference, and (4) history information of file access made by the conference participants;

managing all the workspaces at a workspace server for managing the sessions, the files, the reference information and the history information, which are generated in the plurality of the workspaces;

providing at each of the plurality of site systems, a conference participant with a display of a set of workspaces to choose when the conference participant logs into the site system, the set of workspaces are those workspaces that the conference participant is permitted to participate in based on the identification of the conference participant, on condition that a first logged in conference participant and then a subsequent logged in conference participant log into one site system, providing the subsequent logged in conference participant a display of a set of common workspaces that are common to both the first logged in conference participant and the subsequent logged in conference participant and excluding other workspaces that the subsequent logged in user is permitted to participate, and a display of reference information managed in a workspace selected by the first logged in conference participant and the subsequent logged in conference participant, wherein the subsequent logged in conference participant selects any workspace in the set of common workspaces;

on condition that a plurality of conference participants log into different site systems and the plurality of conference participants select the same workspace, sharing input/output for application software between the different site systems by connecting electronic whiteboards of the different site systems to the shared workspace server; and when a file reference request from one of the different site systems is transmitted to the shared workspace server, starting at the shared workspace server, application software to reference a file specified in the file reference request, and providing input/output interfaces with application software to the different site systems with a session established.

13. The teleconference support method as claimed in claim 12, further comprising:

providing by the shared work space server, a user interface for connecting a session and making reference to a file or a resource.

14. The teleconference support method as claimed in claim 12, further comprising:

instructing by the shared workspace server, when a client starts a session, all other clients already having started the session to connect to the client.

15. The teleconference support method as claimed in claim 12, further comprising:

selecting by the shared workspace server, a workspace based on user identification information transmitted from the site system.

16. The teleconference support method as claimed in claim 15, wherein selecting the workspace includes selecting the workspace based on the user identification information transmitted using an IC card by the site system.

17. The teleconference support method as claimed in claim 12, further comprising:

selecting by the shared workspace server, a workspace based on workspace specification information transmitted from the site system.

18. The teleconference support method as claimed in claim 17, wherein selecting the workspace includes selecting the workspace based on workspace specification information transmitted by the site system based on information retained on an IC card.

19. The teleconference support method as claimed in claim 12, wherein when the file reference request is transmitted from the site system to the shared workspace server, starting application software to reference the file specified in the file reference request, and providing input/output interfaces with the application software to each site system with the session established.

20. The teleconference support method as claimed in claim 19, further comprising:

temporarily registering at the shared workspace server in a case where the file specified in the file reference request is not previously registered in the workspace, the file specified in the file reference request.

21. The teleconference support method as claimed in claim 12, further comprising:

starting at the site system, the application software to reference the file specified in the file reference request; and providing by the site system, the input/output interfaces with the application software to any other site systems with the session established.

22. The teleconference support method as claimed in claim 21, further comprising:

receiving by the site system, the file specified in the file reference request from any other site system so as to start at the site system, the application software to reference the file specified in the file reference request and provide by the site system, the input/output interfaces with the application software for any other site systems with the session established.

23. A non-transitory computer readable medium storing a program causing a computer to execute processing for supporting realization of cooperative work among a plurality of conference systems, the processing comprising:

generating workspaces in a plurality of site systems, each of the workspaces being an object for managing and using cooperation units corresponding to respective conferences, providing an electronic whiteboard at each of the plurality of site systems, the electronic whiteboard providing a graphical user interface provided by a shared workspace;

authenticating identifications of the conference participants;

managing a workspace at each of the plurality of site systems for managing (1) a session in the site systems, (2) a file used in a conference and created as a record of the conference, (3) reference information to a resource relevant to the conference, and (4) history information of file access made by the conference participants;

managing all the workspaces at a workspace server configured to manage all the workspaces at all site systems including managing the sessions, the files, the reference information and the history information, which are generated in the plurality of the workspaces;

providing at each of the plurality of site systems, a conference participant with a display of a set of workspaces to choose when the conference participant logs into the site system, the set of workspaces are those workspaces that the conference participant is permitted to participate in based on the identification of the conference participant, on condition that a first logged in conference participant and then a subsequent logged in conference participant log into one site system, providing the subsequent logged in conference participant a display of a set of common workspaces that are common to both the first logged in conference participant and the subsequent logged in conference participant and excluding other workspaces that the subsequent logged in user is permitted to participate, and a display of reference information managed in a workspace selected by the first logged in conference participant and the subsequent logged in conference participant, wherein the subsequent logged in conference participant selects any workspace in the set of common workspaces;

on condition that a plurality of conference participants log into different site systems and the plurality of conference participants select the same workspace, sharing input/output for application software between the different site systems by connecting electronic whiteboards of the different site systems to the shared workspace server; and when a file reference request from one of the different site systems is transmitted to the shared workspace server, starting at the shared workspace server, application software to reference a file specified in the file reference request, and providing input/output interfaces with application software to the different site systems with a session established.

24. The teleconference system as claimed in claim 1, wherein each site system comprises a metadata manager and a presentation controller, and each metadata manager is configured to use terminal information transmitted from the presentation controller and to record a terminal ID, a user ID and a use start time in association with each other.

* * * * *